(12) United States Patent
Yerramalli et al.

(10) Patent No.: US 10,419,157 B2
(45) Date of Patent: Sep. 17, 2019

(54) TECHNIQUES FOR MANAGING A PLURALITY OF RADIO ACCESS TECHNOLOGIES ACCESSING A SHARED RADIO FREQUENCY SPECTRUM BAND

(71) Applicant: QUALCOMM Incorporated, San Diego, CA (US)

(72) Inventors: Srinivas Yerramalli, San Diego, CA (US); Tao Luo, San Diego, CA (US); Aleksandar Damnjanovic, Del Mar, CA (US); Marco Papaleo, Bologna (IT); Rahul Malik, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/913,739

(22) Filed: Mar. 6, 2018

(65) Prior Publication Data
US 2018/0198556 A1  Jul. 12, 2018

Related U.S. Application Data

(63) Continuation of application No. 15/019,767, filed on Feb. 9, 2016, now Pat. No. 9,912,438.
(Continued)

(51) Int. Cl.
*H04L 1/00* (2006.01)
*H04W 16/14* (2009.01)
(Continued)

(52) U.S. Cl.
CPC .......... *H04L 1/0009* (2013.01); *H04W 16/14* (2013.01); *H04W 74/0808* (2013.01);
(Continued)

(58) Field of Classification Search
CPC .............. H04L 1/0009; H04L 1/1812; H04W 74/0808; H04W 16/14; H04W 72/1215; H04W 88/06
See application file for complete search history.

(56) References Cited

U.S. PATENT DOCUMENTS 9,912,438 B2 * 3/2018 Yerramalli ............ H04L 1/0009
2013/0198383 A1   8/2013 Tseng et al.
(Continued)

OTHER PUBLICATIONS

Broadcom Corporation, "Enhancements for ETSI LBE Listen-Before-Talk for LAA," 3GPP TSG-RAN WG1 Meeting #80, R1-150553, Athens, Greece, Feb. 9-13, 2015, 11 pgs., XP_50933761 A, 3rd Generation Partnership Project.
(Continued)

*Primary Examiner* — Duc C Ho
(74) *Attorney, Agent, or Firm* — Dalei Dong; Holland & Hart LLP

(57) ABSTRACT

Techniques are described for wireless communication. A first method includes sensing an indication of first radio access technology (RAT) communications occupying a shared radio frequency spectrum band; and configuring, in response to the sensing, at least one parameter of a second RAT used by a device to contend for access to the band. A second method includes randomly selecting a number from a range of numbers extending between a lower bound and an upper bound; contending for access to a shared radio frequency spectrum band by performing an extended clear channel assessment (ECCA) procedure over a plurality of CCA slots, the plurality of CCA slots including a first number of CCA slots equal to the upper bound; and winning contention for access to the band after determining, while performing the ECCA procedure, that the band is available for a second number of CCA slots equal to the randomly selected number.

28 Claims, 23 Drawing Sheets

Related U.S. Application Data

(60) Provisional application No. 62/114,912, filed on Feb. 11, 2015.

(51) Int. Cl.
  *H04W 74/08* (2009.01)
  *H04W 88/06* (2009.01)
  *H04L 1/18* (2006.01)
  *H04W 72/12* (2009.01)

(52) U.S. Cl.
  CPC ....... *H04L 1/1812* (2013.01); *H04W 72/1215* (2013.01); *H04W 88/06* (2013.01)

(56) References Cited

U.S. PATENT DOCUMENTS

| | | | |
|---|---|---|---|
| 2013/0203458 A1* | 8/2013 | Charbit | H04W 52/34 455/522 |
| 2013/0208587 A1* | 8/2013 | Bala | H04W 16/14 370/230 |
| 2014/0349584 A1* | 11/2014 | Clevorn | H04B 7/0689 455/67.13 |
| 2015/0023315 A1* | 1/2015 | Yerramalli | H04W 74/002 370/330 |
| 2015/0334675 A1* | 11/2015 | Cho | H04W 24/02 455/435.1 |
| 2016/0095110 A1* | 3/2016 | Li | H04W 72/1215 370/329 |
| 2016/0127098 A1 | 5/2016 | Ng et al. | |
| 2016/0135189 A1* | 5/2016 | Chandrasekhar | H04W 72/0453 370/329 |
| 2016/0143014 A1* | 5/2016 | Mukherjee | H04W 74/0816 370/330 |
| 2016/0212767 A1 | 7/2016 | Yin et al. | |
| 2018/0160473 A1* | 6/2018 | Di Girolamo | H04W 88/10 |

OTHER PUBLICATIONS

Intel Corporation, "LBT Design for LAA Downlink," 3GPP TSG RAN WG1 Meeting #80, R1-150089, Athens, Greece, Feb. 9-13, 2015, 8 pgs., XP_50933303A, 3rd Generation Partnership Project.
International Search Report and Written Opinion—PCT/US2016/017359—ISA/EPO—dated Jul. 8, 2016.
ISA/EPO, Partial International Search Report of the International Searching Authority, Int'l. App. No. PCT/US2016/017359, dated Apr. 29, 2016, European Patent Office, Rijswijk, NL, 7 pgs.
Orfanos G., et al., "A New Distributed Coordination Function for W-LANs with Multiple Channel Structure", Proceedings of 14th 1st Mobile & Wireless Communications Summit, Dresden, Jun. 19-23, 2005, 5 pgs, XP002756497, URL: www.eurasip.org/Proceedings/Ext/IST05/papers/275.pdf.
Qualcomm Incorporated: "Coexistence Mechanisms", 3GPP DRAFT; R1-150476, 3rd Generation Partnership Project (3GPP), Mobile Competence Centre; 650, Route Des Lucioles; F-06921 Sophia-Anti Polls Cedex; France, vol. RAN WG1, No. Athens, Greece, Feb. 9-13, 2015, 4 pages, XP050933684A, Retrieved from the Internet: URL:http://www.3gpp.org/ftp/Meetings_3GPP_SYNC/RAN1/Docs/ [retrieved on Feb. 8, 2015].
Qualcomm Incorporated, "Solutions for Required Functionalities and Design Targets," 3GPP TSG RAN WG1 #78bis, R1-144000, Ljubljana, Slovenia, Oct. 6-10, 2014, 5 pgs., XP_50869665A, 3rd Generation Partnership Project.

\* cited by examiner

TECHNIQUES FOR MANAGING A PLURALITY OF RADIO ACCESS TECHNOLOGIES ACCESSING A SHARED RADIO FREQUENCY SPECTRUM BAND

CROSS REFERENCES

The present application is a continuation application of U.S. Non-Provisional patent application Ser. No. 15/019,767 by Yerramalli et al., entitled "Techniques For Managing A Plurality Of Radio Access Technologies Accessing A Shared Radio Frequency Spectrum Band," filed Feb. 9, 2016 which claims priority to U.S. Provisional Patent Application No. 62/114,912 by Yerramalli et al., entitled "Techniques For Managing A Plurality Of Radio Access Technologies Accessing A Shared Radio Frequency Spectrum Band," filed Feb. 11, 2015, assigned to the assignee hereof, and expressly incorporated by reference herein in its entirety.

BACKGROUND

Field of the Disclosure

The present disclosure, for example, relates to wireless communication systems, and more particularly to techniques for managing a plurality of radio access technologies (RATs) accessing a shared radio frequency spectrum band.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

Some modes of communication may enable communication between a base station and a UE over a shared radio frequency spectrum band (e.g., a radio frequency spectrum band shared with Wi-Fi nodes), or over different radio frequency spectrum bands (e.g., a dedicated radio frequency spectrum band and a shared radio frequency spectrum band) of a cellular network. With increasing data traffic in cellular networks that use a dedicated (e.g., licensed) radio frequency spectrum band, offloading of at least some data traffic to a shared radio frequency spectrum band may provide a cellular operator with opportunities for enhanced data transmission capacity. A shared radio frequency spectrum band may also provide service in areas where access to a dedicated radio frequency spectrum band is unavailable.

Prior to gaining access to, and communicating over, a shared radio frequency spectrum band, a base station or UE may perform a listen before talk (LBT) procedure to contend for access to the shared radio frequency spectrum band. An LBT procedure may include performing a clear channel assessment (CCA) procedure or extended CCA (ECCA) procedure to determine whether a channel of the shared radio frequency spectrum band is available. When it is determined that the channel of the shared radio frequency spectrum band is available, the base station or UE may transmit one or more channel reservation signals (e.g., one or more channel usage beacon signals (CUBS)) over the channel, to reserve the channel. In some examples, the channel reservation signal(s) may be transmitted over the channel until a next subframe boundary, at which time a data or control transmission may be made over the channel.

SUMMARY

The present disclosure, for example, relates to one or more techniques for managing a plurality of RATs accessing a shared radio frequency spectrum band. In some examples, the techniques may pertain to managing a co-existence of base stations and UEs communicating over a shared radio frequency spectrum band using a wireless wide area network (WWAN) RAT (e.g., a cellular RAT), and Wi-Fi access points and Wi-Fi stations communicating over the shared radio frequency spectrum band using a wireless local area network (WLAN) RAT (e.g., a Wi-Fi RAT). Co-existence management may be necessary because the nodes using the Wi-Fi RAT may use different techniques than the nodes using the cellular RAT to contend for access to the shared radio frequency spectrum band. For example, the Wi-Fi nodes (e.g., the Wi-Fi access points and Wi-Fi stations) may use Carrier Sense Multiple Access with Collision Avoidance (CSMA/CA) techniques to contend for access to the shared radio frequency spectrum band, while the cellular nodes (e.g., the base stations and UEs) may use LBT procedures for load-based equipment (LBE) to contend for access to the shared radio frequency spectrum band. Depending on access conditions, the use of these different access techniques may give an access advantage to the Wi-Fi nodes or the cellular nodes. One advantage that cellular nodes may have over Wi-Fi nodes is their non-use of an exponential backoff mechanism. That is, when a Wi-Fi node fails to successfully contend for access to the shared radio frequency spectrum band, or when in-process communications of the Wi-Fi node are interrupted, an exponential backoff mechanism (e.g., a mechanism that causes the Wi-Fi node to increase the length of a wait time before contending for access to the shared radio frequency spectrum band again) may be triggered at the Wi-Fi node. Techniques described in the present disclosure may enable cellular nodes to avoid triggering the exponential backoff mechanisms of Wi-Fi nodes under some conditions.

In one example, a method for wireless communication is described. The method may include sensing an indication of first RAT communications occupying a shared radio frequency spectrum band, and configuring, in response to the sensing, at least one parameter of a second RAT used by a device to contend for access to the shared radio frequency spectrum band.

In some examples of the method, the first RAT may include a Wi-Fi RAT and the second RAT may include a cellular RAT. In some examples of the method, configuring the at least one parameter of the second RAT may include configuring a range of numbers from which a random number is selected, where the random number determines a number of CCA slots over which the device performs an extended CCA procedure. In some examples, configuring the range of numbers may include at least one of: increasing a lower bound of the range of numbers, or increasing an upper bound of the range of numbers, or a combination thereof.

In some examples of the method, configuring the at least one parameter of the second RAT may include identifying a number of consecutive CCA slots for which the shared radio frequency spectrum band is available before the device wins contention for access to the shared radio frequency spectrum band. In some of these examples, the identified number of CCA slots may be a last number of CCA slots in which an extended CCA procedure is performed when the device has not won contention for access to the shared radio frequency spectrum band.

In some examples of the method, configuring the at least one parameter of the second RAT may include configuring a CCA energy detection threshold for at least one CCA slot in which at least one CCA procedure is performed. In some examples, the method may include configuring the device to sense an energy level of the shared radio frequency spectrum band following a period in which the shared radio frequency spectrum band is occupied. In these latter examples, configuring the at least one parameter of the second RAT may include configuring a CCA energy detection threshold based at least in part on the sensed energy; configuring the device to perform a number of CCA procedures based at least in part on the CCA energy detection threshold, where the number of CCA procedures may be performed in a set of CCA slots; and configuring the device to win contention for access to the shared radio frequency spectrum band when the shared radio frequency spectrum band is determined to be available for a subset of CCA slots included in the set of CCA slots.

In some examples of the method, configuring the at least one parameter of the second RAT may include increasing a duration of a last CCA slot in which an extended CCA procedure is performed. In some examples of the method, configuring the at least one parameter of the second RAT may include configuring the device to perform a plurality of extended CCA procedures to contend for access to the shared radio frequency spectrum band. In some examples of the method, the plurality of extended CCA procedures may include a first extended CCA procedure followed by a second extended CCA procedure. In some examples, the first extended CCA procedure may be configured to be performed over a first number of CCA slots and the second extended CCA procedure may be configured to be performed over a second number of CCA slots.

In some examples of the method, configuring the at least one parameter of the second RAT may include configuring a deferment period for the device to wait, upon determining the shared radio frequency spectrum band is unavailable, before performing an additional number of CCA procedures, and configuring the device to win contention for access to the shared radio frequency spectrum band upon determining the shared radio frequency spectrum band is available for each of the additional number of CCA procedures.

In some examples of the method, the indication of first RAT communications may be based at least in part on a number of transmitters detected within an energy detection range of the device. In some examples, the indication of first RAT communications may be based at least in part on a failure rate of transmissions for which feedback is reported. In some examples, the indication of first RAT communications may be based at least in part on an erasure rate for transmissions for which an error is not reported. In some examples, the indication of first RAT communications may be based at least in part on a variance between a supported modulation and coding scheme (MCS) and an MCS actually used. In some examples of the method, the device may include one of a base station or a UE, and the identifying and configuring may be performed by the one of the base station or the UE.

In an example, an apparatus for wireless communication is described. In one configuration, the apparatus may include means for sensing an indication of first RAT communications occupying a shared radio frequency spectrum band, and means for configuring, in response to the sensing, at least one parameter of a second RAT used by a device to contend for access to the shared radio frequency spectrum band. In some examples, the apparatus may further include means for implementing one or more aspects of the method for wireless communication described above with respect to the first set of illustrative examples.

In an example, an apparatus for wireless communication is described. In one configuration, the apparatus may include a processor, memory in electronic communication with the processor, and instructions stored in the memory. The instructions may be executable by the processor to sense an indication of first RAT communications occupying a shared radio frequency spectrum band, and configure, in response to the sensing, at least one parameter of a second RAT used by a device to contend for access to the shared radio frequency spectrum band. In some examples, the instructions may also be executable by the processor to implement one or more aspects of the method for wireless communication described above with respect to the first set of illustrative examples.

In an example, a non-transitory computer-readable medium storing computer-executable code for wireless communication is described. In one configuration, the code may be executable by a processor to sense an indication of first RAT communications occupying a shared radio frequency spectrum band, and configure, in response to the sensing, at least one parameter of a second RAT used by a device to contend for access to the shared radio frequency spectrum band. In some examples, the non-transitory computer-readable medium may also include code to implement one or more aspects of the method for wireless communication described above with respect to the first set of illustrative examples.

In an example, a method for wireless communication is described. In one configuration, the method may include randomly selecting a number from a range of numbers extending between a lower bound and an upper bound; contending for access to a shared radio frequency spectrum band by performing an extended CCA procedure over a plurality of CCA slots, where the plurality of CCA slots include a first number of CCA slots equal to the upper bound; and winning contention for access to the shared radio frequency spectrum band after determining, while performing the extended CCA procedure, that the shared radio frequency spectrum band is available for a second number of CCA slots equal to the randomly selected number.

In some examples, the method may include discontinuing the extended CCA procedure and failing to win contention for access to the shared radio frequency spectrum band after determining, while performing the extended CCA procedure, that the shared radio frequency spectrum band is unavailable for a third number of CCA slots equal to the first number of CCA slots, less the randomly selected number, plus one.

In an example, another apparatus for wireless communication is described. In one configuration, the apparatus may include means for randomly selecting a number from a range of numbers extending between a lower bound and an upper bound; means for contending for access to a shared radio frequency spectrum band by performing an extended CCA procedure over a plurality of CCA slots, where the plurality of CCA slots include a first number of CCA slots equal to the upper bound; and means for winning contention for access to the shared radio frequency spectrum band after determining, while performing the extended CCA procedure, that the shared radio frequency spectrum band is available for a second number of CCA slots equal to the randomly selected number. In some examples, the apparatus may further include means for implementing one or more aspects of the method for wireless communication described above with respect to the fifth set of illustrative examples.

In an example, another apparatus for wireless communication is described. In one configuration, the apparatus may include a processor, memory in electronic communication with the processor, and instructions stored in the memory. The instructions may be executable by the processor to randomly select a number from a range of numbers extending between a lower bound and an upper bound; to contend for access to a shared radio frequency spectrum band by performing an extended CCA procedure over a plurality of CCA slots, where the plurality of CCA slots include a first number of CCA slots equal to the upper bound; and to win contention for access to the shared radio frequency spectrum band after determining, while performing the extended CCA procedure, that the shared radio frequency spectrum band is available for a second number of CCA slots equal to the randomly selected number. In some examples, the instructions may also be executable by the processor to implement one or more aspects of the method for wireless communication described above with respect to the fifth set of illustrative examples.

In an example, another non-transitory computer-readable medium storing computer-executable code for wireless communication is described. In one configuration, the code may be executable by a processor to randomly select a number from a range of numbers extending between a lower bound and an upper bound; contend for access to a shared radio frequency spectrum band by performing an extended CCA procedure over a plurality of CCA slots, where the plurality of CCA slots include a first number of CCA slots equal to the upper bound; and win contention for access to the shared radio frequency spectrum band after determining, while performing the extended CCA procedure, that the shared radio frequency spectrum band is available for a second number of CCA slots equal to the randomly selected number. In some examples, the non-transitory computer-readable medium may also include code to implement one or more aspects of the method for wireless communication described above with respect to the first set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Figure 12:
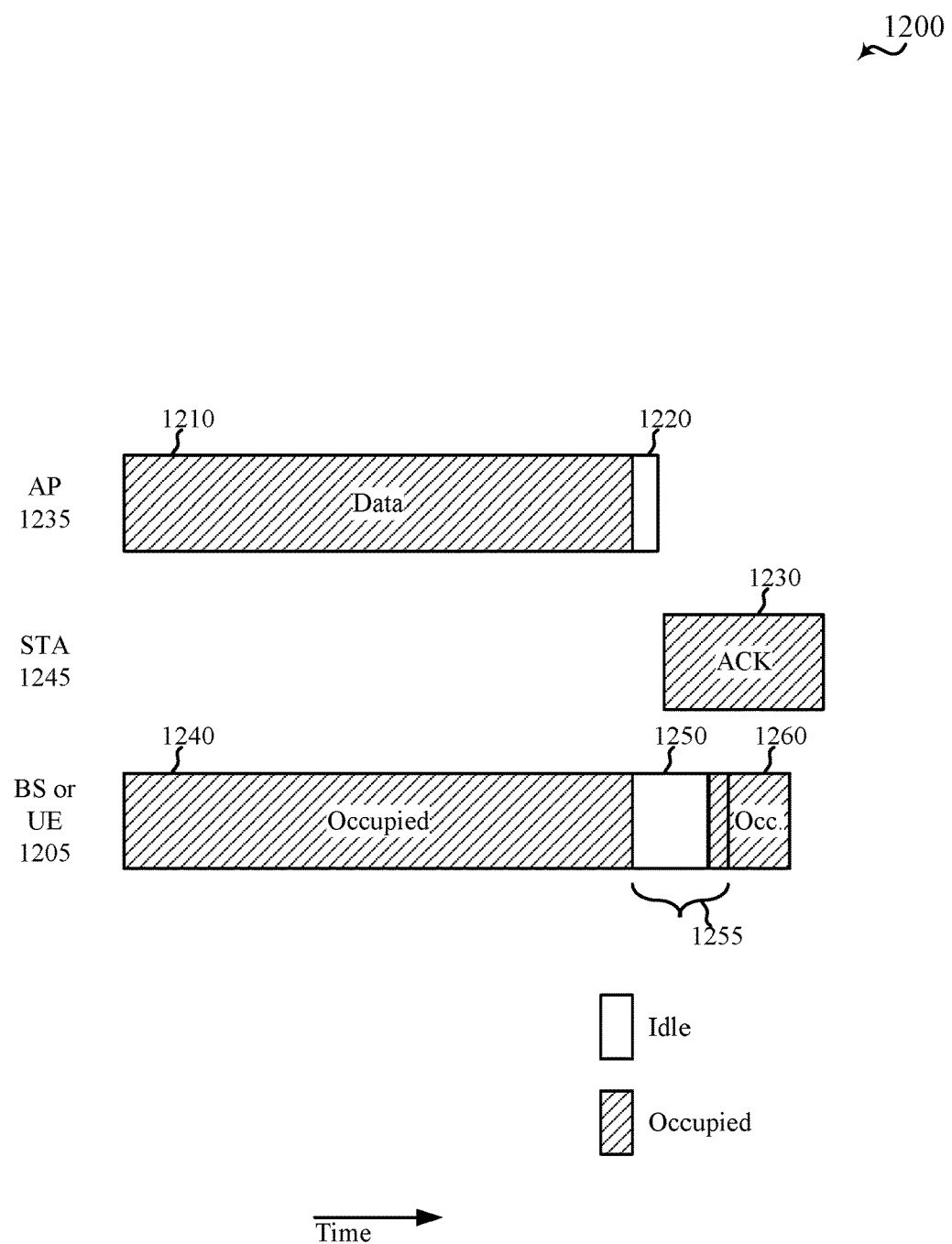
Figure 13:
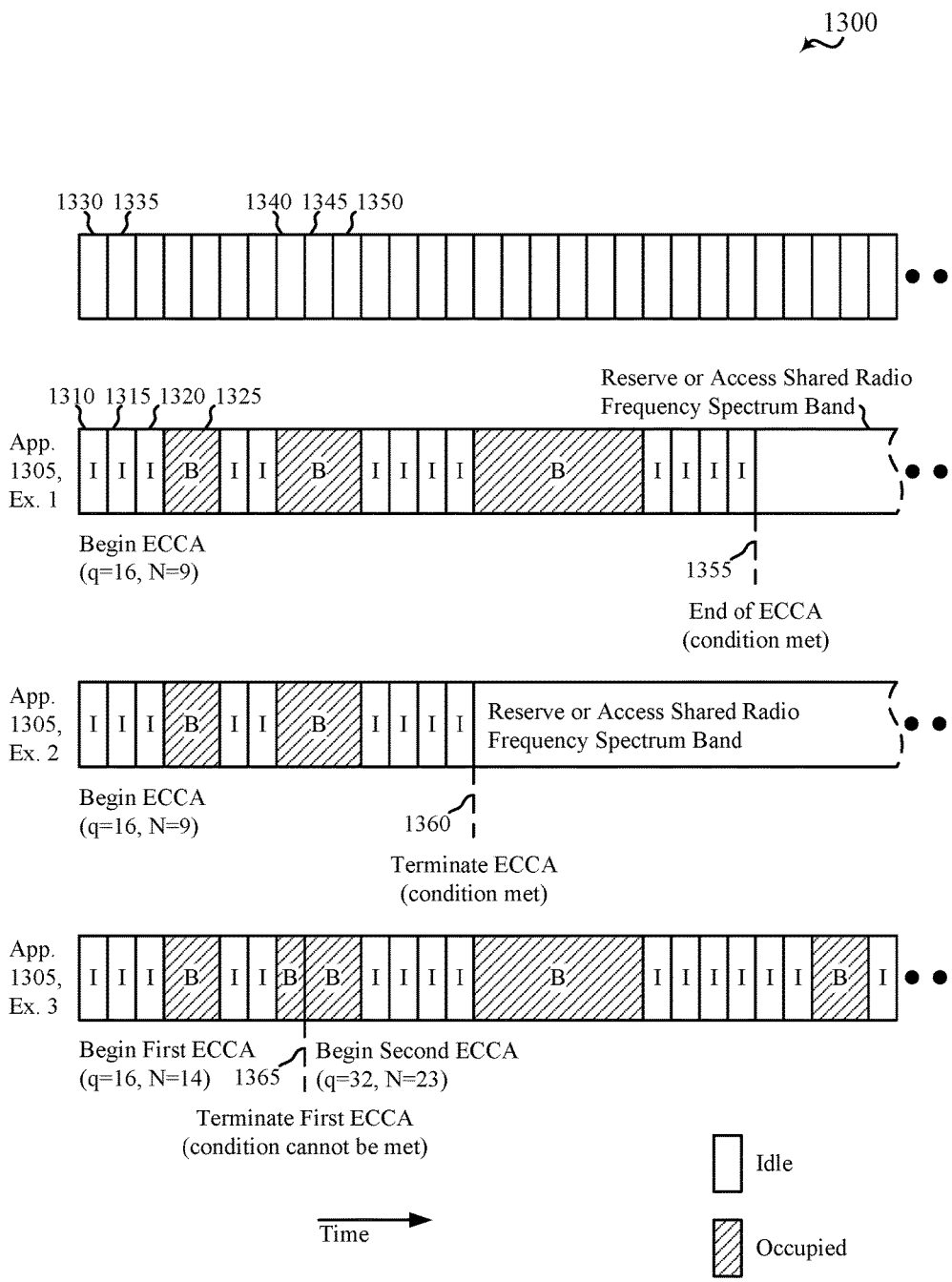
Figure 14:
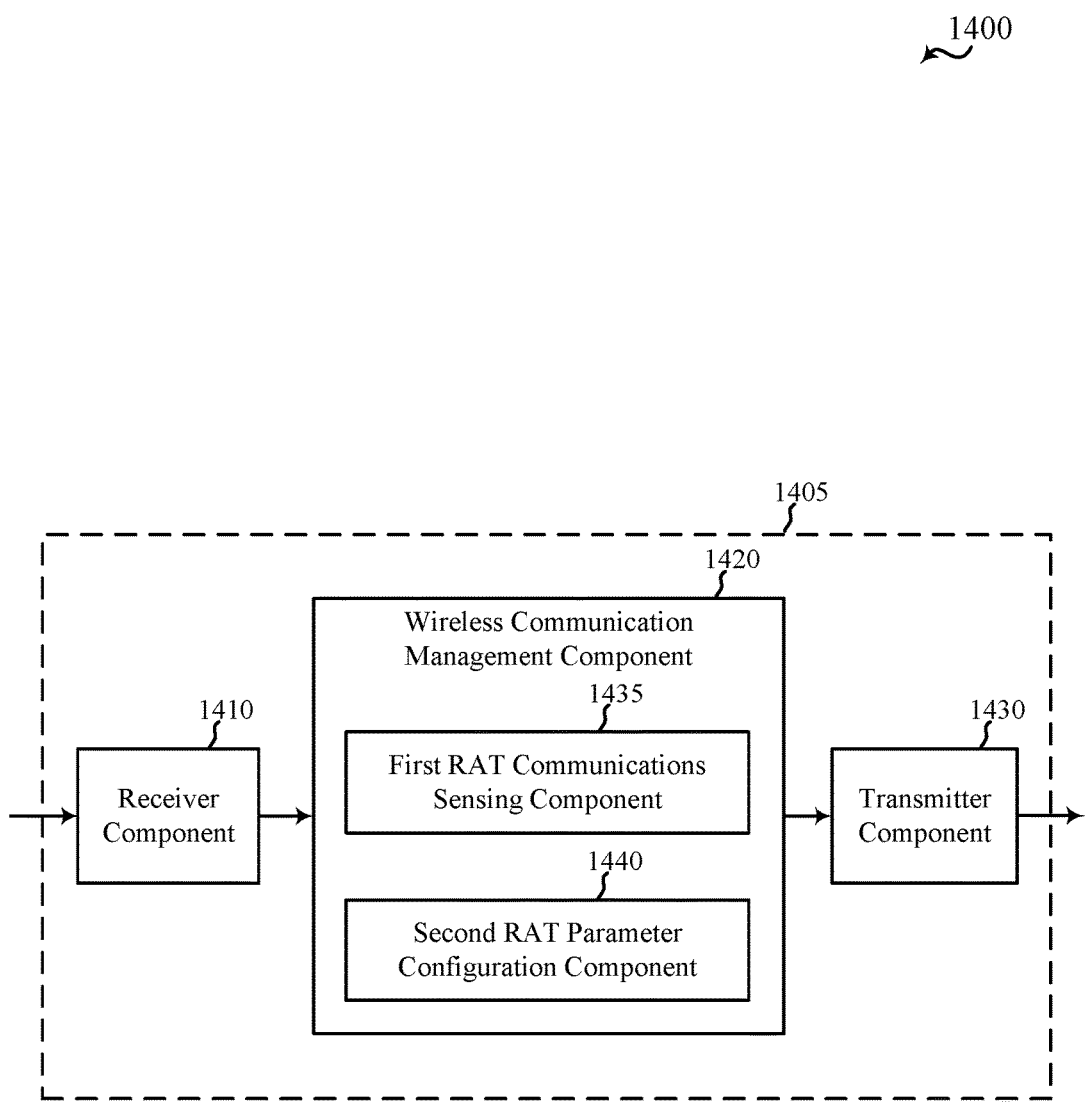
Figure 15:
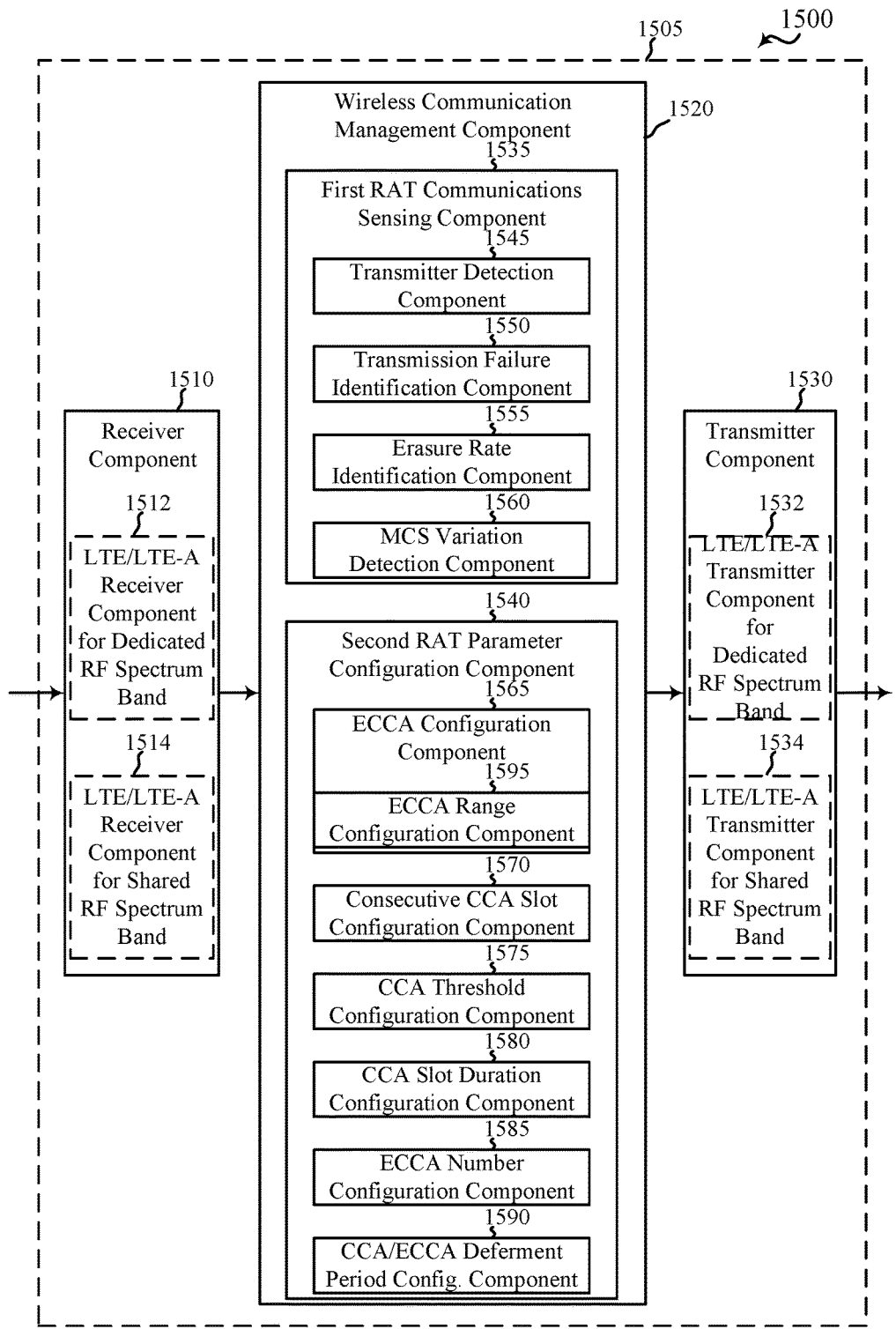
Figure 16:
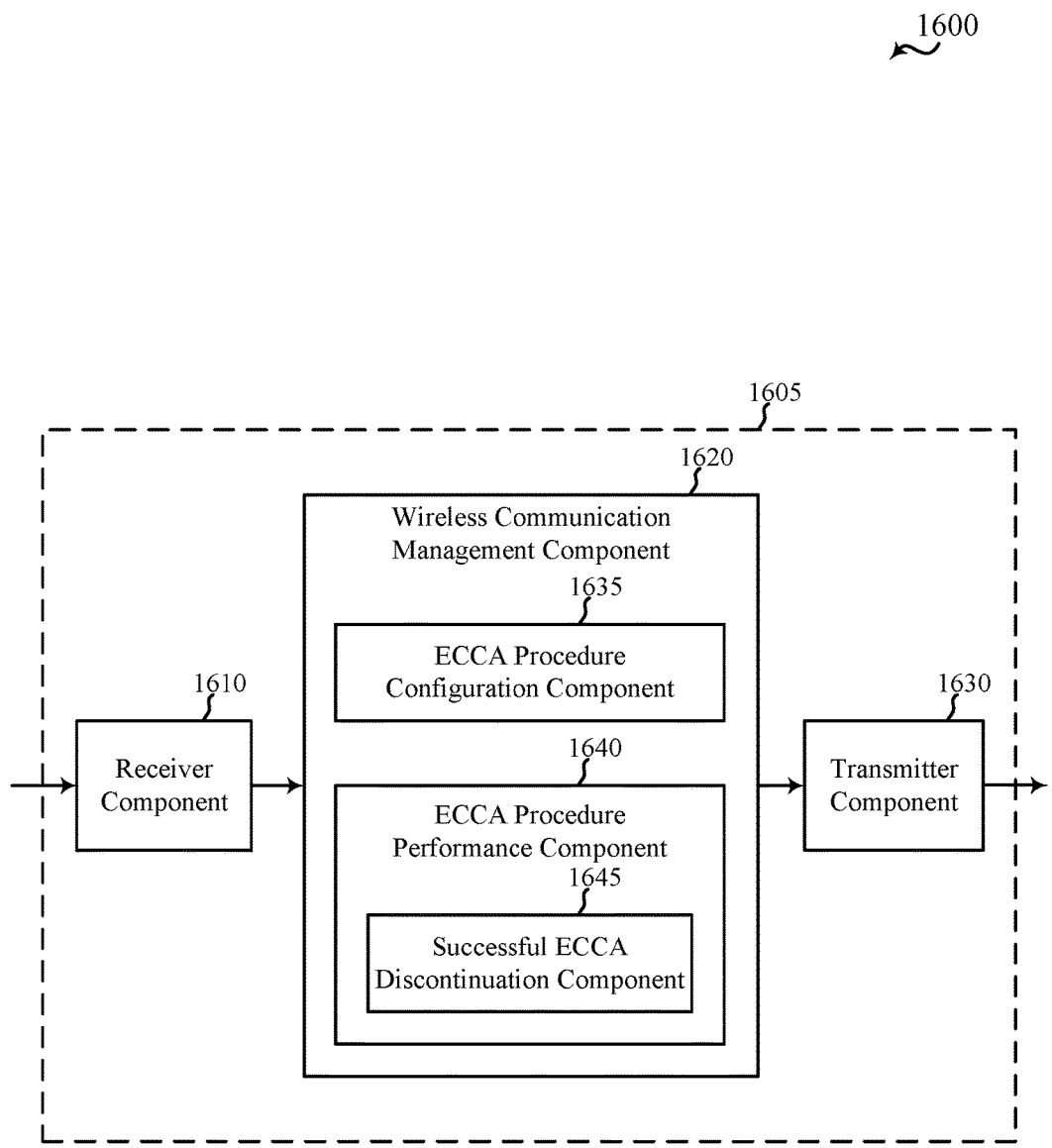
Figure 17:
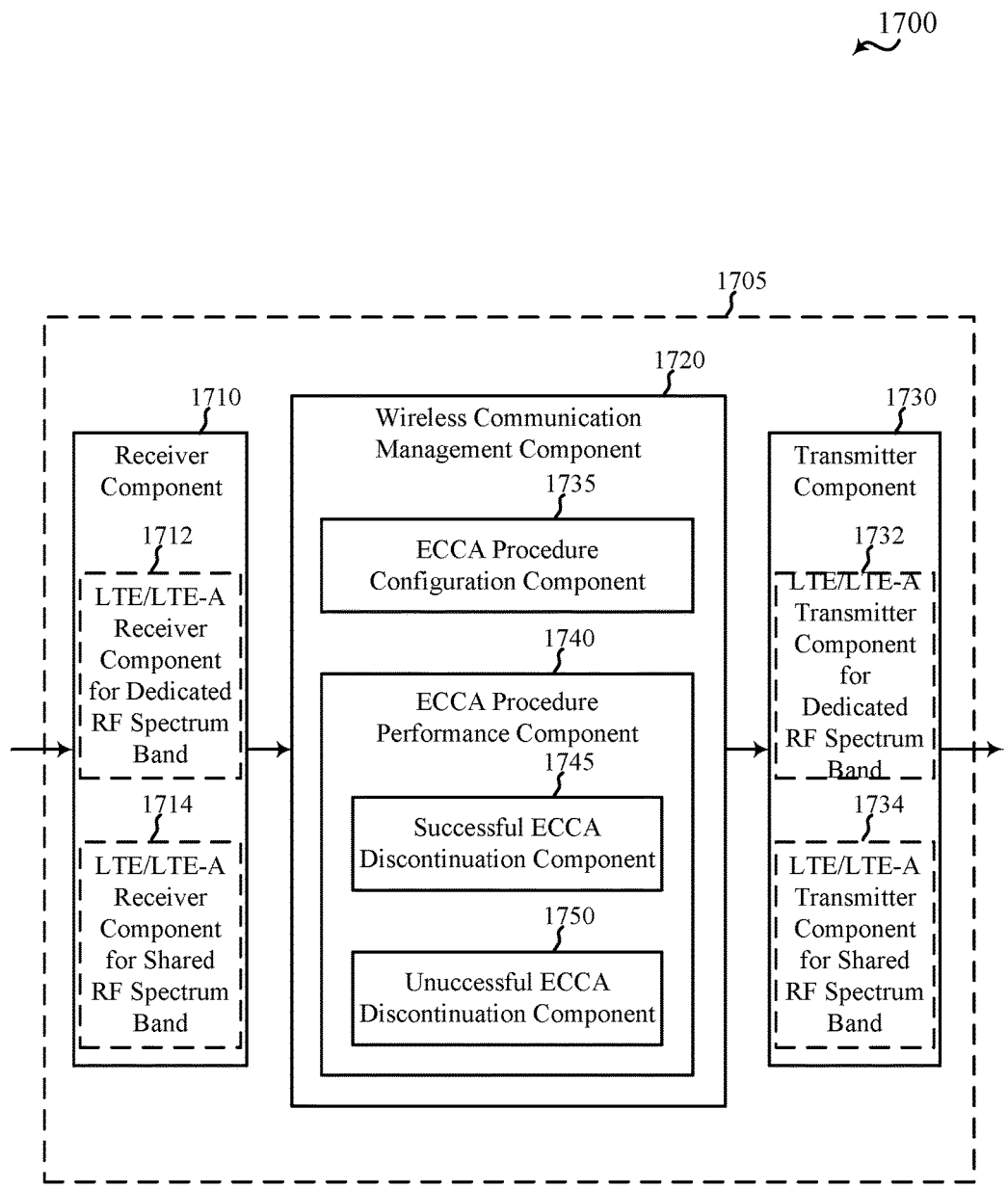
Figure 18:
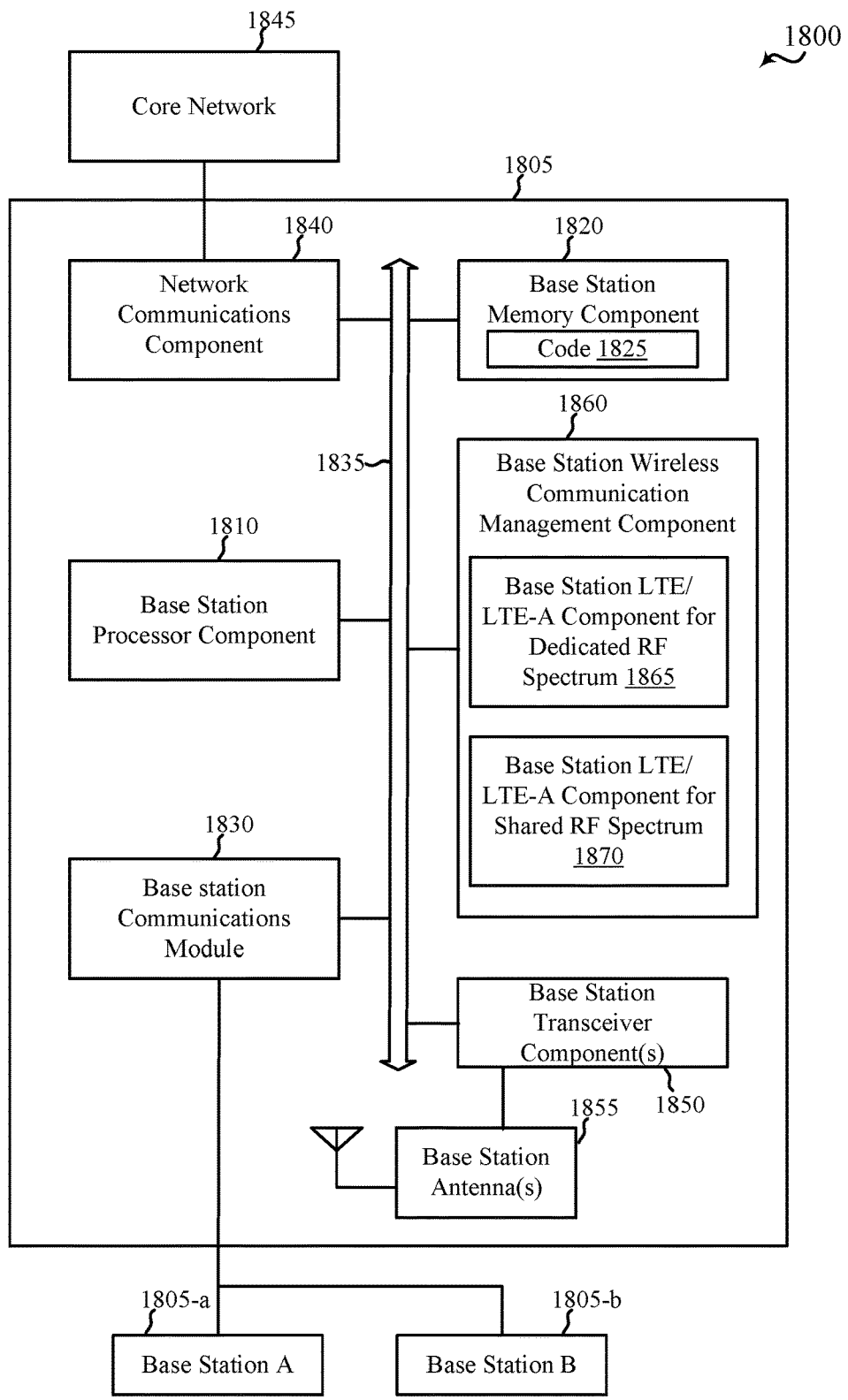
Figure 19:
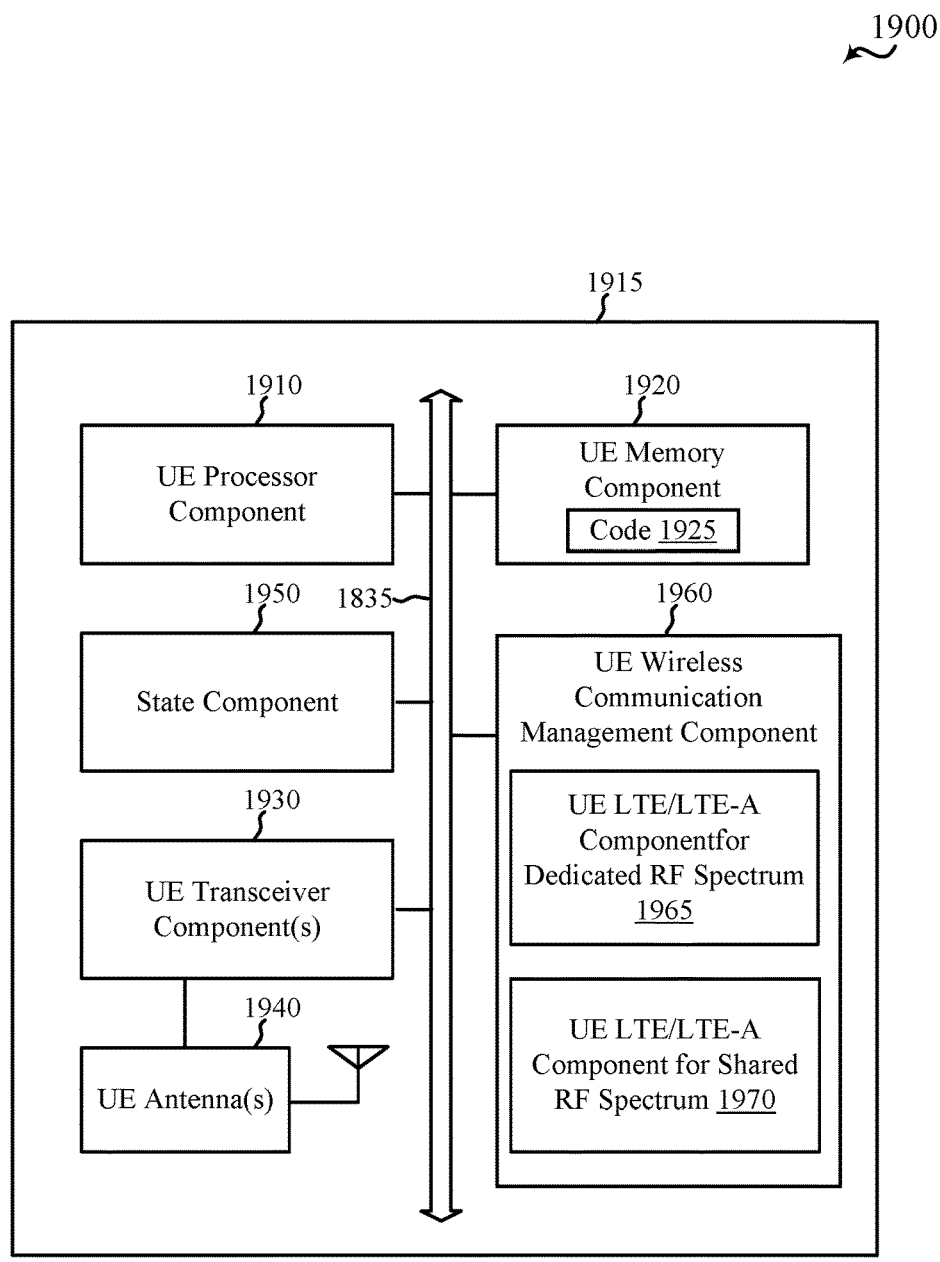
Figure 20:
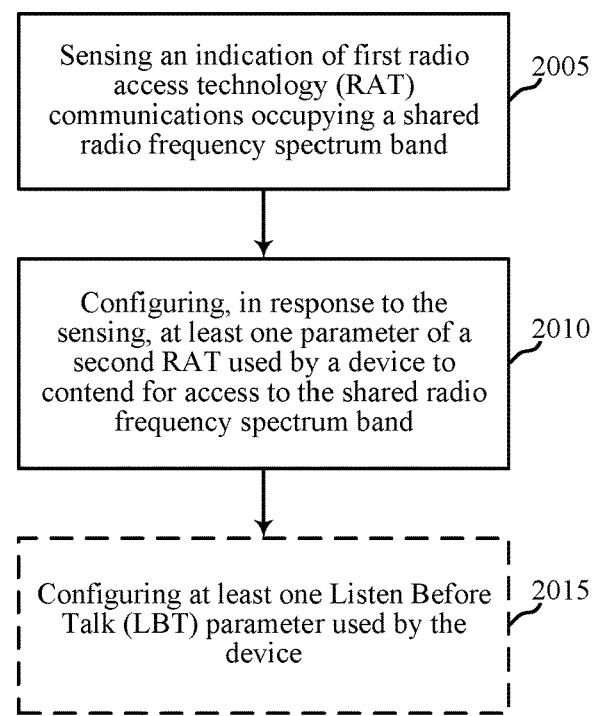
Figure 21:
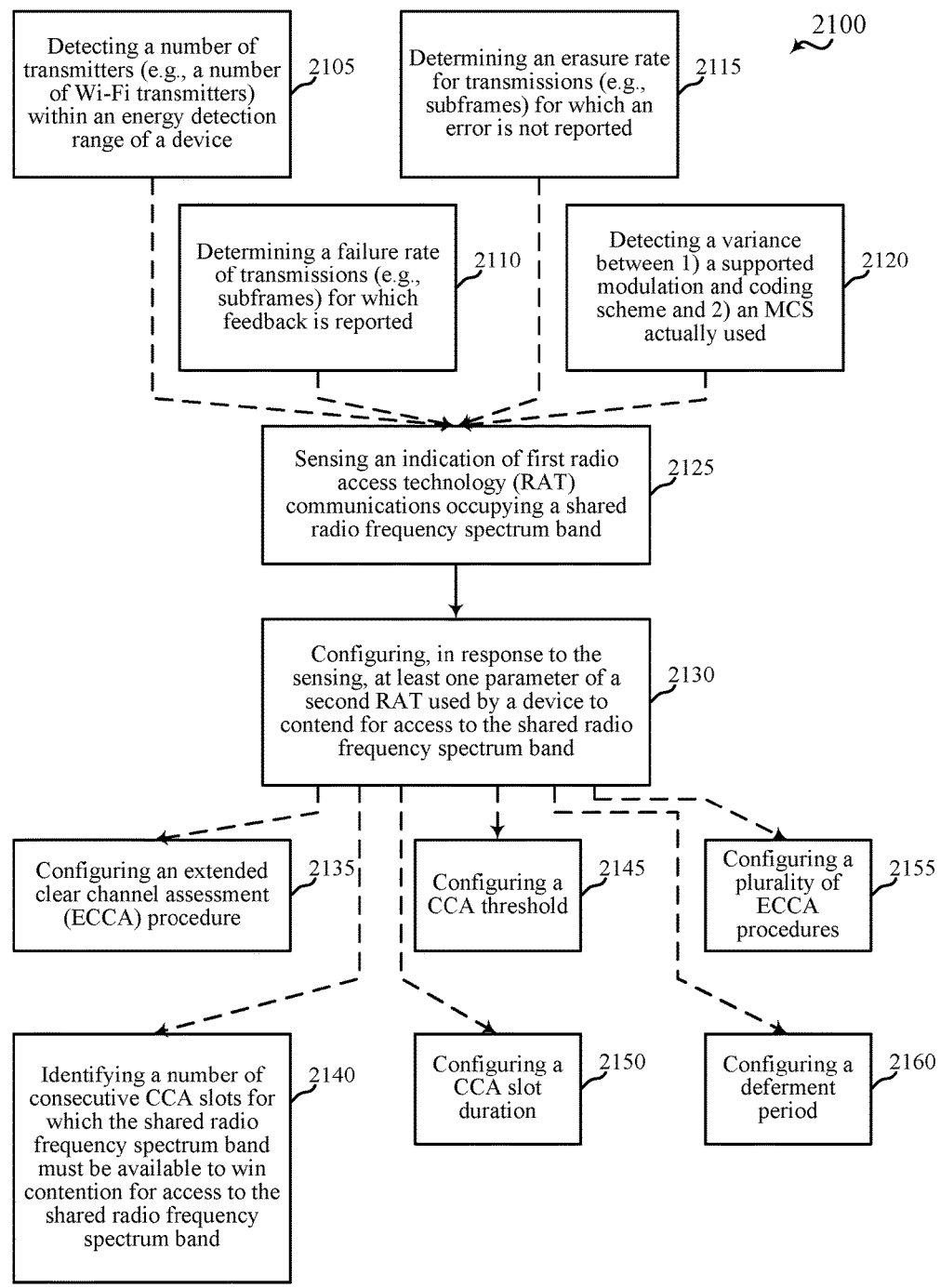
Figure 22:
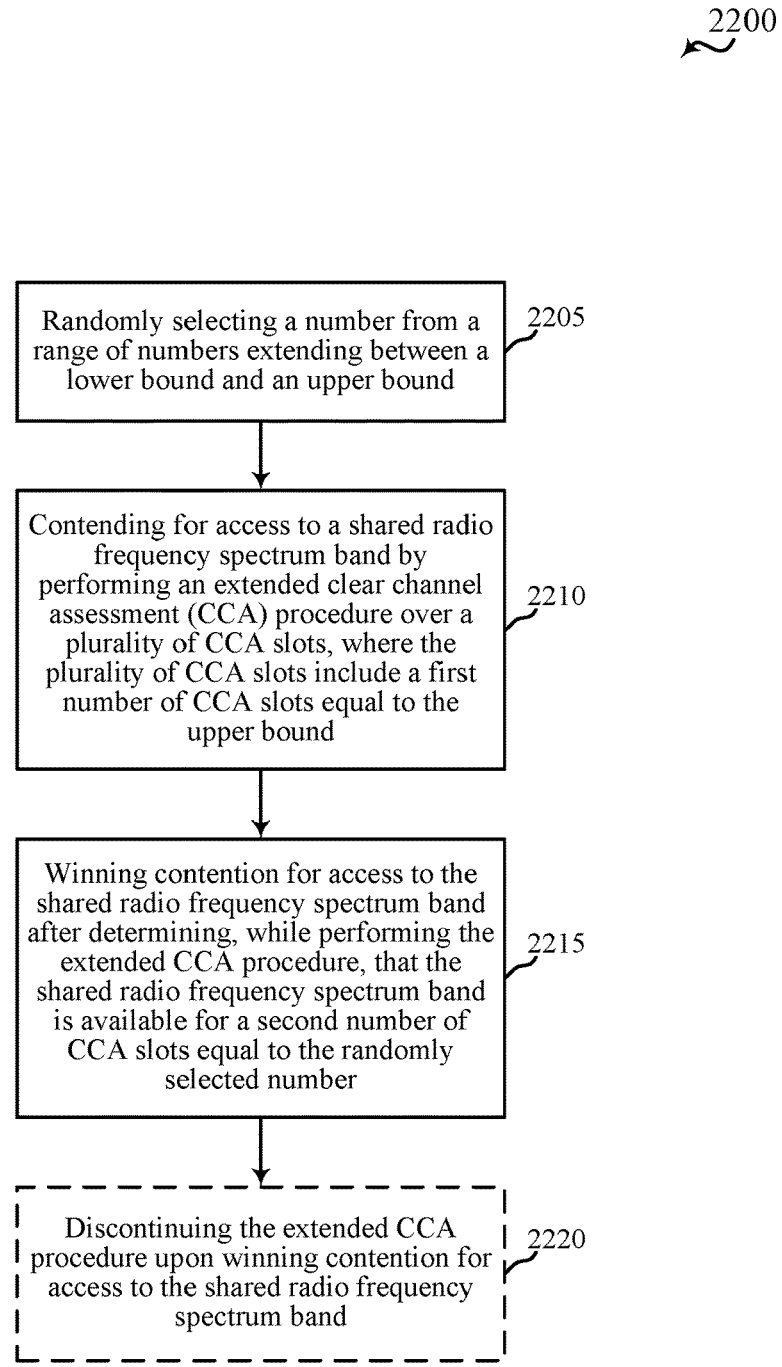
Figure 23:
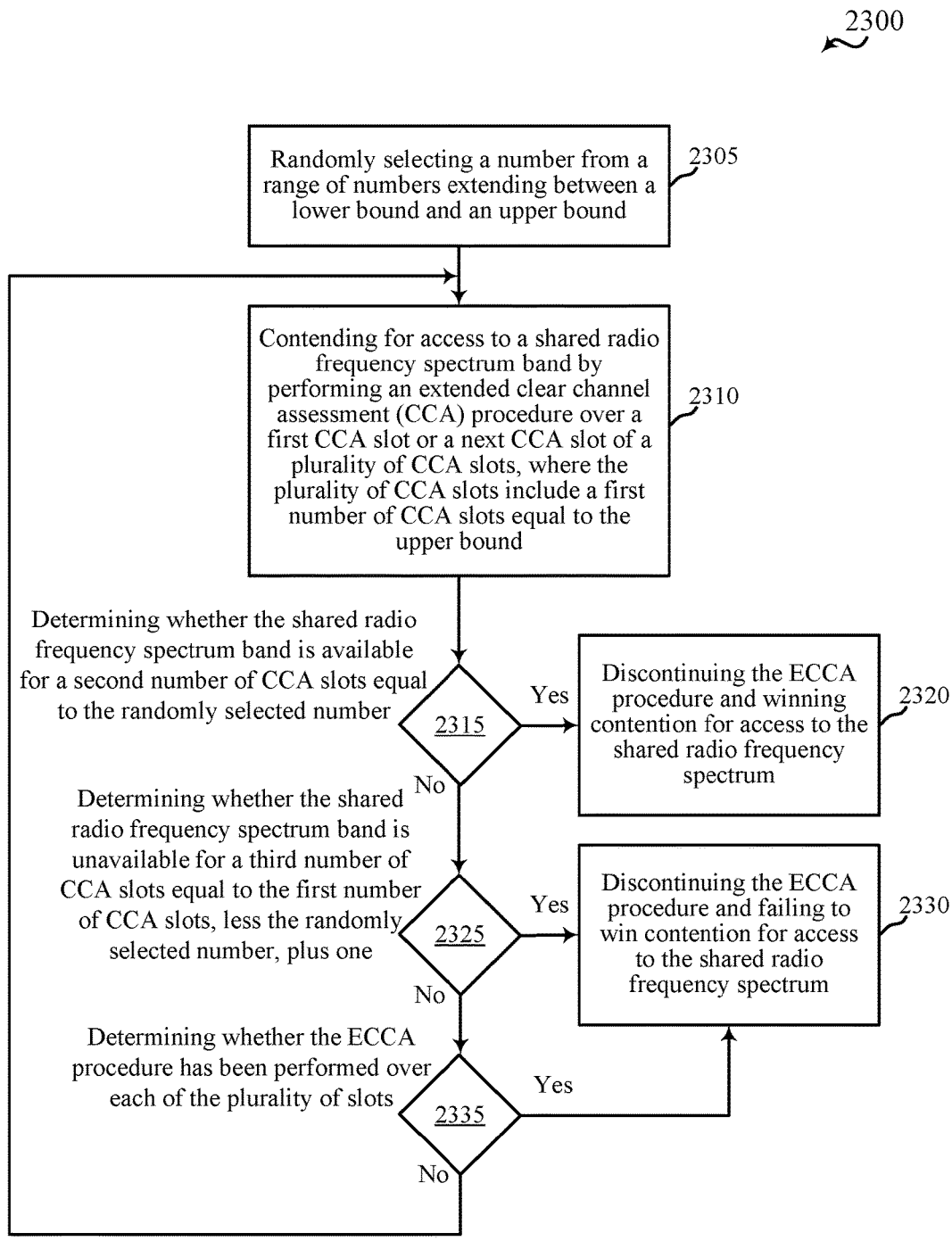

contending for access to a shared radio frequency spectrum band, in accordance with various aspects of the present disclosure;

FIG. 12 shows an exemplary timeline of communications over a shared radio frequency spectrum band, between a Wi-Fi access point and a Wi-Fi station, as an apparatus (e.g., a base station or UE) contends for access to the shared radio frequency spectrum band, in accordance with various aspects of the present disclosure;

FIG. 13 shows an exemplary timeline of CCA slots in which an ECCA procedure may be performed by an apparatus (e.g., a base station or UE) contending for access to a shared radio frequency spectrum band, in accordance with various aspects of the present disclosure;

FIG. 14 shows a block diagram of an apparatus for use in wireless communication, in accordance with various aspects of the present disclosure;

FIG. 15 shows a block diagram of an apparatus for use in wireless communication, in accordance with various aspects of the present disclosure;

FIG. 16 shows a block diagram of an apparatus for use in wireless communication, in accordance with various aspects of the present disclosure;

FIG. 17 shows a block diagram of an apparatus for use in wireless communication, in accordance with various aspects of the present disclosure;

FIG. 18 shows a block diagram of a base station (e.g., a base station forming part or all of an eNB) for use in wireless communication, in accordance with various aspects of the present disclosure;

FIG. 19 shows a block diagram of a UE for use in wireless communication, in accordance with various aspects of the present disclosure;

FIG. 20 is a flow chart illustrating an exemplary method for wireless communication, in accordance with various aspects of the present disclosure;

FIG. 21 is a flow chart illustrating an exemplary method for wireless communication, in accordance with various aspects of the present disclosure;

FIG. 22 is a flow chart illustrating an exemplary method for wireless communication, in accordance with various aspects of the present disclosure; and FIG. 23 is a flow chart illustrating an exemplary method for wireless communication, in accordance with various aspects of the present disclosure.

DETAILED DESCRIPTION

Techniques are described in which a shared radio frequency spectrum band is used for at least a portion of communications over a wireless communication system. In some examples, the shared radio frequency spectrum band may be used for LTE/LTE-A communications. The shared radio frequency spectrum band may be used in combination with, or independent from, a dedicated radio frequency spectrum band. The dedicated radio frequency spectrum band may be a radio frequency spectrum band for which transmitting apparatuses may not contend for access because the radio frequency spectrum band is licensed to particular users, such as a licensed radio frequency spectrum band usable for LTE/LTE-A communications. The shared radio frequency spectrum band may be a radio frequency spectrum band for which a device may need to contend for access (e.g., a radio frequency spectrum band that is available for unlicensed use, such as Wi-Fi use, or a radio frequency spectrum band that is available for use by multiple operators in an equally shared or prioritized manner).

With increasing data traffic in cellular networks that use a dedicated radio frequency spectrum band, offloading of at least some data traffic to a shared radio frequency spectrum band may provide a cellular operator (e.g., an operator of a public land mobile network (PLMN) or a coordinated set of base stations defining a cellular network, such as an LTE/LTE-A network) with opportunities for enhanced data transmission capacity. Use of a shared radio frequency spectrum band may also provide service in areas where access to a dedicated radio frequency spectrum band is unavailable. As noted above, before communicating over a shared radio frequency spectrum band, transmitting apparatuses may perform an LBT procedure to gain access to the medium. Such an LBT procedure may include performing a CCA procedure (or ECCA procedure) to determine whether a channel of the shared radio frequency spectrum band is available. When it is determined that the channel of the shared radio frequency spectrum band is available, a CUBS may be transmitted to reserve the channel. When it is determined that a channel is not available, a CCA procedure (or ECCA procedure) may be performed for the channel again at a later time.

Under some scenarios, the non-use of an exponential backoff mechanism by cellular nodes (e.g., base stations and UEs) may provide the cellular nodes an unfair advantage when contending for access to the shared radio frequency spectrum band. Techniques described in the present disclosure may enable cellular nodes to avoid triggering the exponential backoff mechanisms of Wi-Fi nodes under some conditions.

Under some scenarios, communications between the Wi-Fi access point and Wi-Fi station(s) may be separated by a short interframe spacing (SIFS). A base station or UE contending for access to a shared radio frequency spectrum band over which the Wi-Fi communications are carried may interpret the SIFS as an indication that the shared radio frequency spectrum band is available (e.g., unoccupied). Also, when the Wi-Fi access point or one or more Wi-Fi stations are outside the energy detection range of the base station or UE, the base station or UE may interpret Wi-Fi communications as being complete, and may assume that the shared radio frequency spectrum band is available when it is still needed for completion of a Wi-Fi communication. Techniques described herein may include improved configurations of CCA that may be implemented by cellular nodes.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
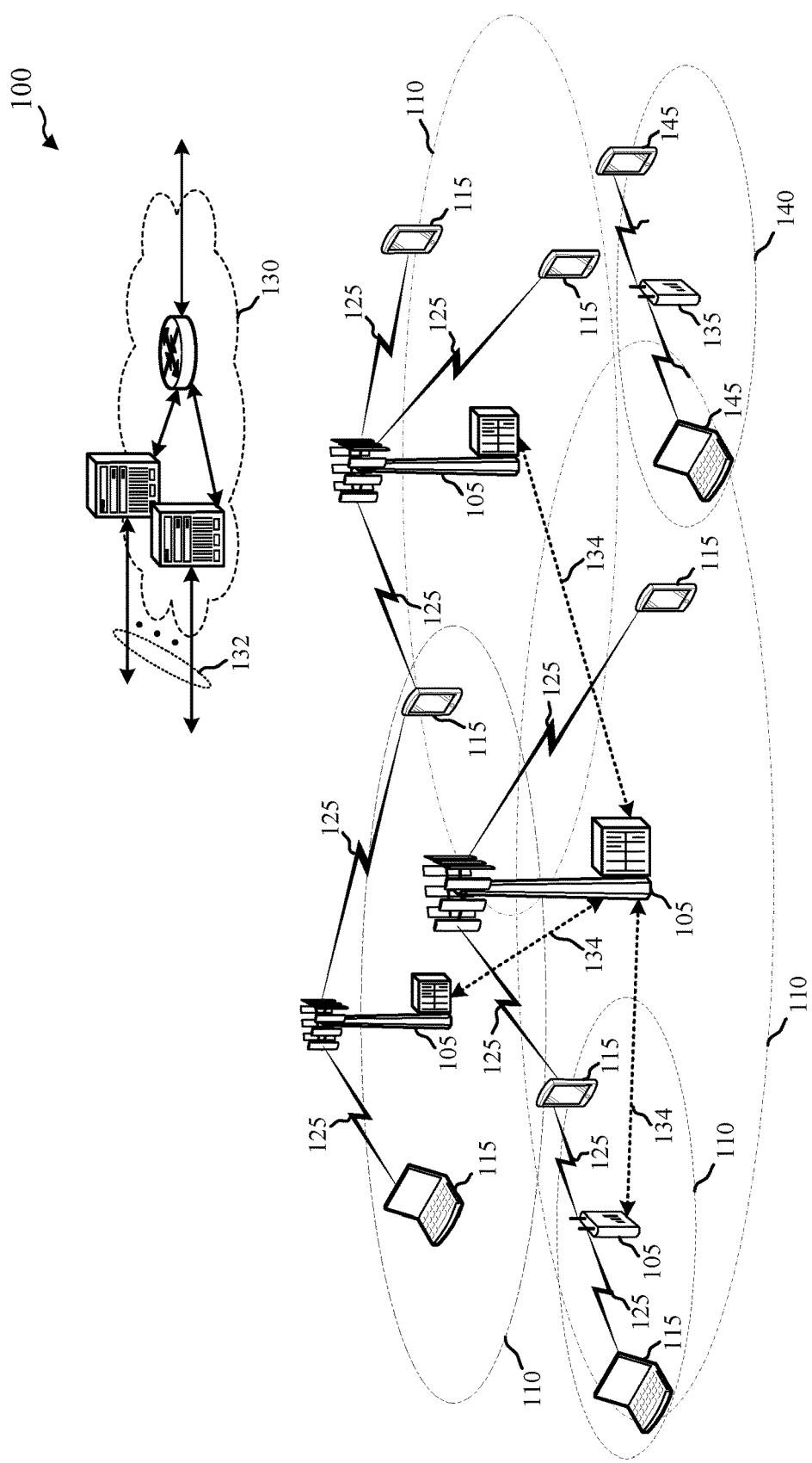
FIG. 1 illustrates an example of a wireless communication system, in accordance with various aspects of the disclosure.

FIG. 1 illustrates an example of a wireless communication system 100, in accordance with various aspects of the disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., dedicated, shared, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions, from a UE 115 to a base station 105. The downlink transmissions may also be called forward link transmissions, while the uplink transmissions may also be called reverse link transmissions.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some examples, the wireless communication system 100 may support operation over a dedicated radio frequency spectrum (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) or a shared radio frequency spectrum band (e.g., a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner)).

The shared radio frequency spectrum band may be shared with nodes communicating in accordance with a different RAT, such as Wi-Fi nodes communicating in accordance with a Wi-Fi RAT. By way of example, FIG. 1 illustrates a Wi-Fi network 140 including a Wi-Fi access point 135 and a number of Wi-Fi stations 145. The Wi-Fi access point 135 and Wi-Fi stations 145 may communicate with one another in the vicinity of the base stations 105 and UEs 115, and under some scenarios, communications between the Wi-Fi access point 135 and Wi-Fi stations 145 may interfere with, or be interfered with, communications between the base stations 105 and UEs 115.

Figure 2:
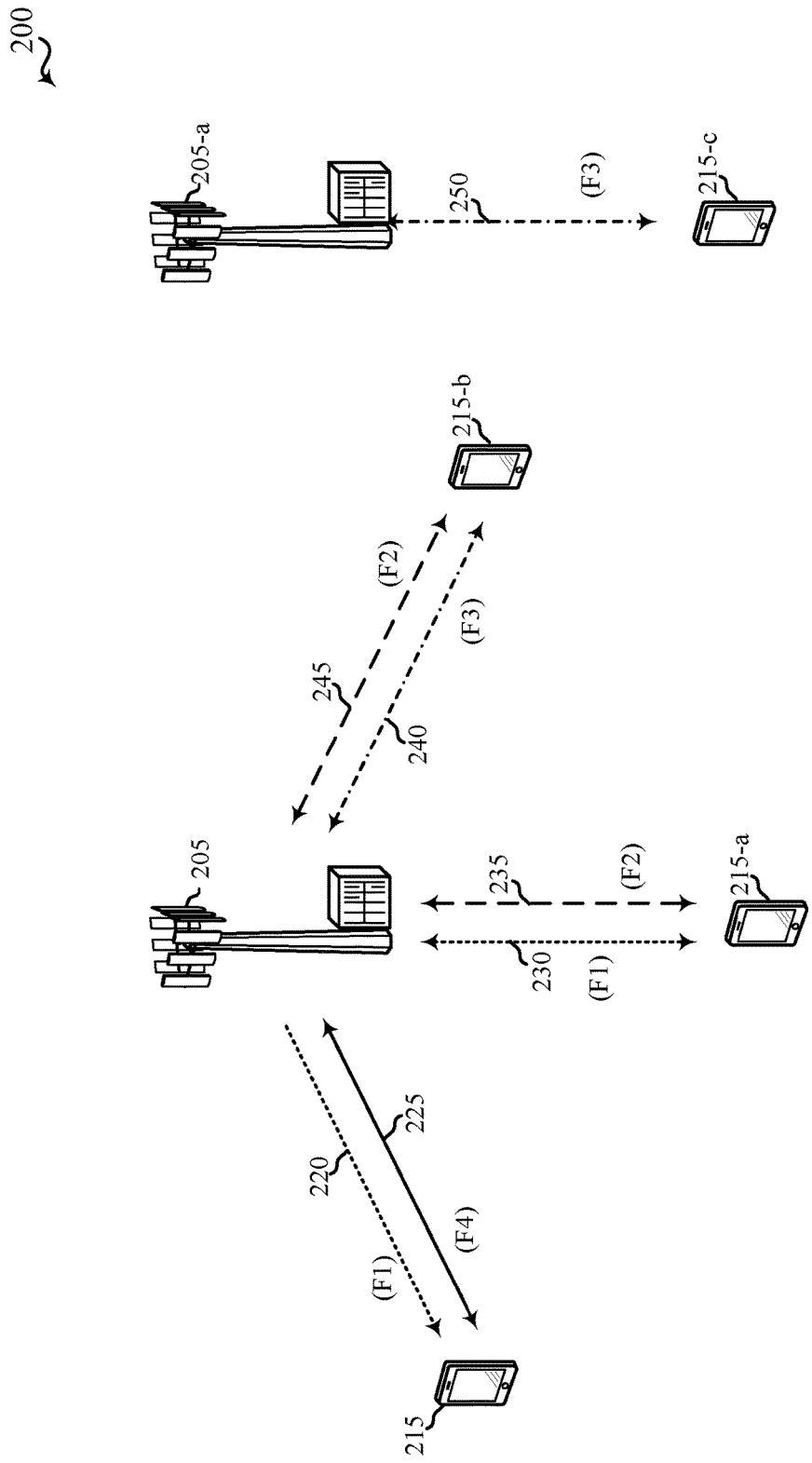
FIG. 2 shows a wireless communication system in which LTE/LTE-A may be deployed under different scenarios using a shared radio frequency spectrum band, in accordance with various aspects of the present disclosure.

FIG. 2 shows a wireless communication system 200 in which LTE/LTE-A may be deployed under different scenarios using a shared radio frequency spectrum band, in accordance with various aspects of the present disclosure. More specifically, FIG. 2 illustrates examples of a supplemental downlink mode (also referred to as a licensed assisted access mode), a carrier aggregation mode, and a standalone mode in which LTE/LTE-A is deployed using a shared radio frequency spectrum band. The wireless communication system 200 may be an example of portions of the wireless communication system 100 described with reference to FIG. 1. Moreover, a first base station 205 and a second base station 205-a may be examples of aspects of one or more of the base stations 105 described with reference to FIG. 1, while a first UE 215, a second UE 215-a, a third UE 215-b, and a fourth UE 215-c may be examples of aspects of one or more of the UEs 115 described with reference to FIG. 1.

In the example of a supplemental downlink mode (e.g., a licensed assisted access mode) in the wireless communication system 200, the first base station 205 may transmit OFDMA waveforms to the first UE 215 using a downlink channel 220. The downlink channel 220 may be associated with a frequency F1 in a shared radio frequency spectrum band. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a dedicated radio frequency spectrum band. The downlink channel 220 in the shared radio frequency spectrum band and the first bidirectional link 225 in the dedicated radio frequency spectrum band may operate contemporaneously. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a mobile network operator (MNO)) that uses a dedicated radio frequency spectrum band and needs to relieve some of the traffic or signaling congestion.

In one example of a carrier aggregation mode in the wireless communication system 200, the first base station 205 may transmit OFDMA waveforms to the second UE 215-a using a second bidirectional link 230 and may receive OFDMA waveforms, SC-FDMA waveforms, or resource block interleaved FDMA waveforms from the second UE 215-a using the second bidirectional link 230. The second bidirectional link 230 may be associated with the frequency F1 in the shared radio frequency spectrum band. The first base station 205 may also transmit OFDMA waveforms to the second UE 215-a using a third bidirectional link 235 and may receive SC-FDMA waveforms from the second UE 215-a using the third bidirectional link 235. The third bidirectional link 235 may be associated with a frequency F2 in a dedicated radio frequency spectrum band. The second bidirectional link 230 may provide a downlink and uplink capacity offload for the first base station 205. Like the supplemental downlink (e.g., the licensed assisted access mode) described above, this scenario may occur with any service provider (e.g., MNO) that uses a dedicated radio frequency spectrum band and needs to relieve some of the traffic or signaling congestion.

In another example of a carrier aggregation mode in the wireless communication system 200, the first base station 205 may transmit OFDMA waveforms to the third UE 215-b using a fourth bidirectional link 240 and may receive OFDMA waveforms, SC-FDMA waveforms, or resource block interleaved waveforms from the third UE 215-b using the fourth bidirectional link 240. The fourth bidirectional link 240 may be associated with a frequency F3 in the shared radio frequency spectrum band. The first base station 205 may also transmit OFDMA waveforms to the third UE 215-b using a fifth bidirectional link 245 and may receive SC-FDMA waveforms from the third UE 215-b using the fifth bidirectional link 245. The fifth bidirectional link 245 may be associated with the frequency F2 in the dedicated radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in a dedicated radio frequency spectrum band and use a shared radio frequency spectrum band for capacity offload.

As described above, one type of service provider that may benefit from the capacity offload offered by using LTE/LTE-A in a shared radio frequency spectrum band is a traditional MNO having access rights to an LTE/LTE-A dedicated radio frequency spectrum band. For these service providers, an operational example may include a bootstrapped mode (e.g., supplemental downlink (e.g., licensed assisted access), carrier aggregation) that uses the LTE/LTE-A primary component carrier (PCC) on the dedicated radio frequency spectrum band and at least one secondary component carrier (SCC) on the shared radio frequency spectrum band.

In the carrier aggregation mode, data and control may, for example, be communicated in the dedicated radio frequency spectrum band (e.g., via first bidirectional link 225, third bidirectional link 235, and fifth bidirectional link 245) while data may, for example, be communicated in the shared radio frequency spectrum band (e.g., via second bidirectional link 230 and fourth bidirectional link 240). The carrier aggregation mechanisms supported when using a shared radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-a may transmit OFDMA waveforms to the fourth UE 215-c using a bidirectional link 250 and may receive OFDMA waveforms, SC-FDMA waveforms, or resource block interleaved FDMA waveforms from the fourth UE 215-c using the bidirectional link 250. The bidirectional link 250 may be associated with the frequency F3 in the shared radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a dedicated radio frequency spectrum band.

In some examples, a transmitting apparatus such as one of the base stations 105, 205, or 205-a described with reference to FIG. 1 or 2, or one of the UEs 115, 215, 215-a, 215-b, or 215-c described with reference to FIG. 1 or 2, may use a gating interval to gain access to a channel of a shared radio frequency spectrum band (e.g., to a physical channel of the shared radio frequency spectrum band). In some examples, the gating interval may be periodic. For example, the periodic gating interval may be synchronized with at least one boundary of an LTE/LTE-A radio interval. The gating interval may define the application of a contention-based protocol, such as an LBT protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure. The outcome of the CCA procedure may indicate to the transmitting apparatus whether a channel of a shared radio frequency spectrum band is available or in use for the gating interval (also referred to as an LBT radio frame). When a CCA procedure indicates that the channel is available for a corresponding LBT radio frame (e.g., "clear" for use), the transmitting apparatus may reserve or use the channel of the shared radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

Figure 3:
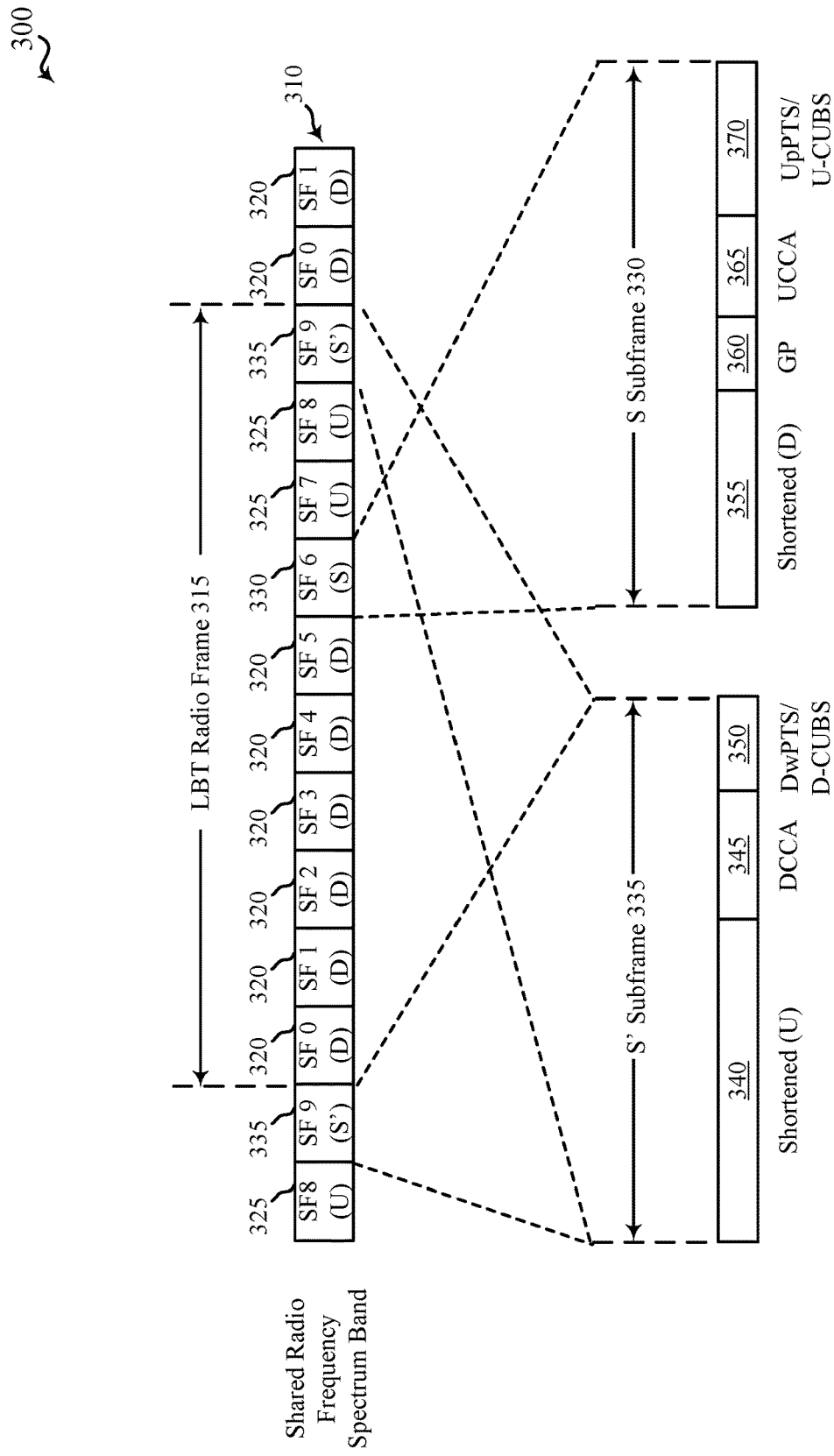
FIG. 3 shows an example of a wireless communication over a shared radio frequency spectrum band, in accordance with various aspects of the present disclosure.

FIG. 3 shows an example 300 of a wireless communication 310 over a shared radio frequency spectrum band, in accordance with various aspects of the present disclosure. In some examples, the wireless communication 310 may include one or more component carriers, which component carrier(s) may be transmitted, for example, as part of a transmission made according to the supplemental downlink mode (e.g., the licensed assisted access mode), the carrier aggregation mode, or the standalone mode described with reference to FIG. 2.

In some examples, an LBT radio frame 315 of the wireless communication 310 may have a duration of ten milliseconds and include a number of downlink (D) subframes 320, a number of uplink (U) subframes 325, and two types of special subframes, an S subframe 330 and an S' subframe 335. The S subframe 330 may provide a transition between downlink subframes 320 and uplink subframes 325, while the S' subframe 335 may provide a transition between uplink subframes 325 and downlink subframes 320 and, in some examples, a transition between LBT radio frames.

During the S' subframe 335, a downlink clear channel assessment (DCCA) procedure 345 may be performed by one or more base stations, such as one or more of the base stations 105, 205, or 205-a described with reference to FIG. 1 or 2, to reserve, for a period of time, a channel of the shared radio frequency spectrum band over which the wireless communication 310 occurs. Following a successful DCCA procedure 345 by a base station, the base station may transmit a channel usage beacon signal (CUBS) (e.g., a downlink CUBS (D-CUBS 350)) to provide an indication to other base stations or apparatuses (e.g., UEs, Wi-Fi access points, etc.) that the base station has reserved the channel. In some examples, a D-CUBS 350 may be transmitted using a plurality of interleaved resource blocks. Transmitting a D-CUBS 350 in this manner may enable the D-CUBS 350 to occupy at least some percentage of the available frequency bandwidth of the shared radio frequency spectrum band and satisfy one or more regulatory requirements (e.g., a requirement that transmissions over the shared radio frequency spectrum band occupy at least 80% of the available frequency bandwidth). The D-CUBS 350 may in some examples take a form similar to that of an LTE/LTE-A cell-specific reference signal (CRS) or a channel state information reference signal (CSI-RS). When the DCCA procedure 345 fails, the D-CUBS 350 may not be transmitted.

The S' subframe 335 may include a plurality of OFDM symbol periods (e.g., 14 OFDM symbol periods). A first portion of the S' subframe 335 may be used by a number of UEs as a shortened uplink (U) period. A second portion of the S' subframe 335 may be used for the DCCA procedure 345. A third portion of the S' subframe 335 may be used by one or more base stations that successfully contend for access to the channel of the shared radio frequency spectrum band as a downlink pilot time slot (DwPTS) or to transmit the D-CUBS 350.

During the S subframe 330, an uplink CCA (UCCA) procedure 365 may be performed by one or more UEs, such as one or more of the UEs 115, 215, 215-a, 215-b, or 215-c described above with reference to FIG. 1 or 2, to reserve, for a period of time, the channel over which the wireless communication 310 occurs. Following a successful UCCA procedure 365 by a UE, the UE may transmit an uplink CUBS (U-CUBS 370) to provide an indication to other UEs or apparatuses (e.g., base stations, Wi-Fi access points, etc.) that the UE has reserved the channel. In some examples, a U-CUBS 370 may be transmitted using a plurality of interleaved resource blocks. Transmitting a U-CUBS 370 in this manner may enable the U-CUBS 370 to occupy at least a certain percentage of the available frequency bandwidth of the shared radio frequency spectrum band and satisfy one or more regulatory requirements (e.g., the requirement that transmissions over the shared radio frequency spectrum band occupy at least 80% of the available frequency bandwidth). The U-CUBS 370 may in some examples take a form similar to that of an LTE/LTE-A CRS or CSI-RS. When the UCCA procedure 365 fails, the U-CUBS 370 may not be transmitted.

The S subframe 330 may include a plurality of OFDM symbol periods (e.g., 14 OFDM symbol periods). A first portion of the S subframe 330 may be used by a number of base stations as a shortened downlink (D) period 355. A second portion of the S subframe 330 may be used as a guard period (GP) 360. A third portion of the S subframe 330 may be used for the UCCA procedure 365. A fourth portion of the S subframe 330 may be used by one or more UEs that successfully contend for access to the channel of the shared radio frequency spectrum band as an uplink pilot time slot (UpPTS) or to transmit the U-CUBS 370.

In some examples, the DCCA procedure 345 or the UCCA procedure 365 may include the performance of a CCA procedure during a single CCA slot. In other examples, the DCCA procedure 345 or the UCCA procedure 365 may include the performance of an extended CCA (ECCA) procedure. The ECCA procedure may be performed over a plurality of CCA slots. The terms DCCA procedure and UCCA procedure are therefore intended to be broad enough to cover the performance of either a CCA procedure or an ECCA procedure. The selection of a CCA procedure or an ECCA procedure, for performance by a base station or a UE during an LBT radio frame, may be based on LBT rules. In some cases, the term CCA procedure may be used in this disclosure, in a general sense, to refer to either a CCA procedure or an ECCA procedure.

By way of example, the LBT radio frame 315 has a DDDDDDSUUS' TDD frame structure. In other examples, an LBT radio frame may have a different TDD frame structure. For example, an LBT radio frame may have one of the TDD frame structures used in enhanced interference mitigation and traffic adaptation (eIMTA).

Figure 4A:
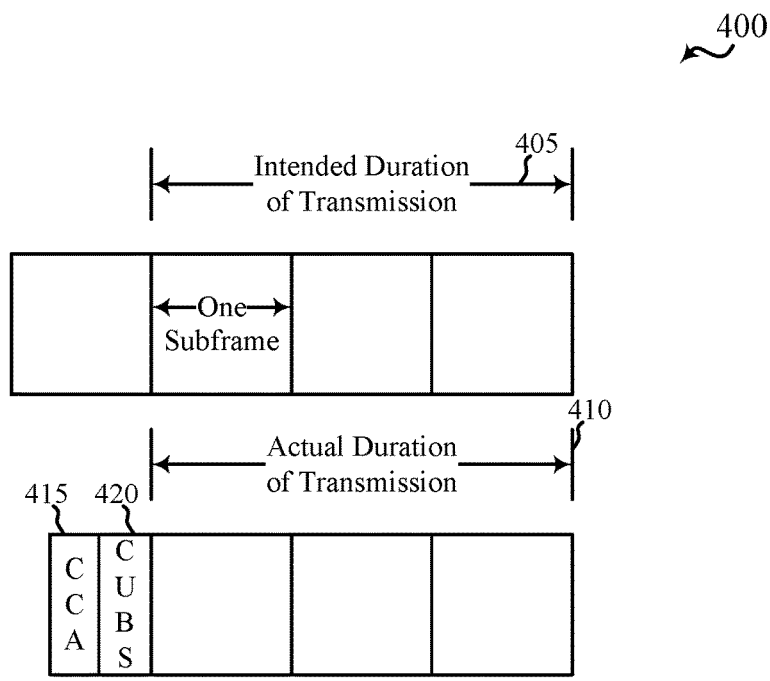
FIG. 4A shows an example of a CCA procedure performed by a transmitting apparatus when contending for access to a shared radio frequency spectrum band, in accordance with various aspects of the present disclosure.

FIG. 4A shows an example 400 of a CCA procedure 415 performed by a transmitting apparatus when contending for access to a shared radio frequency spectrum band, in accordance with various aspects of the present disclosure. In some examples, the CCA procedure 415 may be an example of the DCCA procedure 345 or UCCA procedure 365 described with reference to FIG. 3. The CCA procedure 415 may be performed over a single CCA slot and have a fixed duration. In some examples, the CCA procedure 415 may be performed in accordance with an LBT-frame based equipment (LBT-FBE) protocol (e.g., the LBT-FBE protocol described by EN 301 893). Following the CCA procedure 415, a CUBS 420 may be transmitted, followed by a data transmission (e.g., an uplink transmission or a downlink transmission). By way of example, the data transmission may have an intended duration 405 of three subframes and an actual duration 410 of three subframes.

Figure 4B:
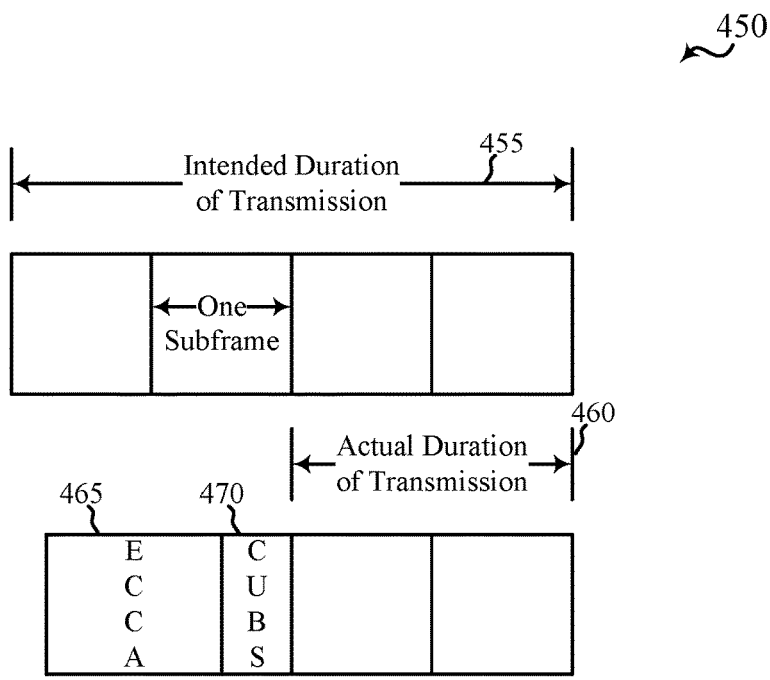
FIG. 4B shows an example of an ECCA procedure performed by a transmitting apparatus when contending for access to an unlicensed radio frequency spectrum band, in accordance with various aspects of the present disclosure.

FIG. 4B shows an example 450 of an ECCA procedure 465 performed by a transmitting apparatus when contending for access to an unlicensed radio frequency spectrum band, in accordance with various aspects of the present disclosure. In some examples, the ECCA procedure 465 may be an example of the DCCA procedure 345 or UCCA procedure 365 described with reference to FIG. 3. The ECCA procedure 465 may be performed over a plurality of q CCA slots, and in some examples may require that the shared radio frequency spectrum band be available during a random number, N, of the q CCA slots before the transmitting apparatus may win contention for access to the shared radio frequency spectrum band. In some examples, the ECCA procedure 465 may be performed after the performance of a CCA procedure 415 (as described with reference to FIG. 4A) is unsuccessful. In some examples, the ECCA procedure 465 may be performed in accordance with an LBT-load based equipment (LBT-LBE) protocol (e.g., the LBT-LBE protocol described by EN 301 893). The ECCA procedure 465 may provide a greater likelihood of winning contention to access the unlicensed radio frequency spectrum band, but at a potential cost of a shorter data transmission. Following the performance of a successful ECCA procedure 465, a CUBS 470 may be transmitted, followed by a data transmission. By way of example, the data transmission may have an intended duration 455 of three subframes and an actual duration 460 of two subframes.

Figure 5:
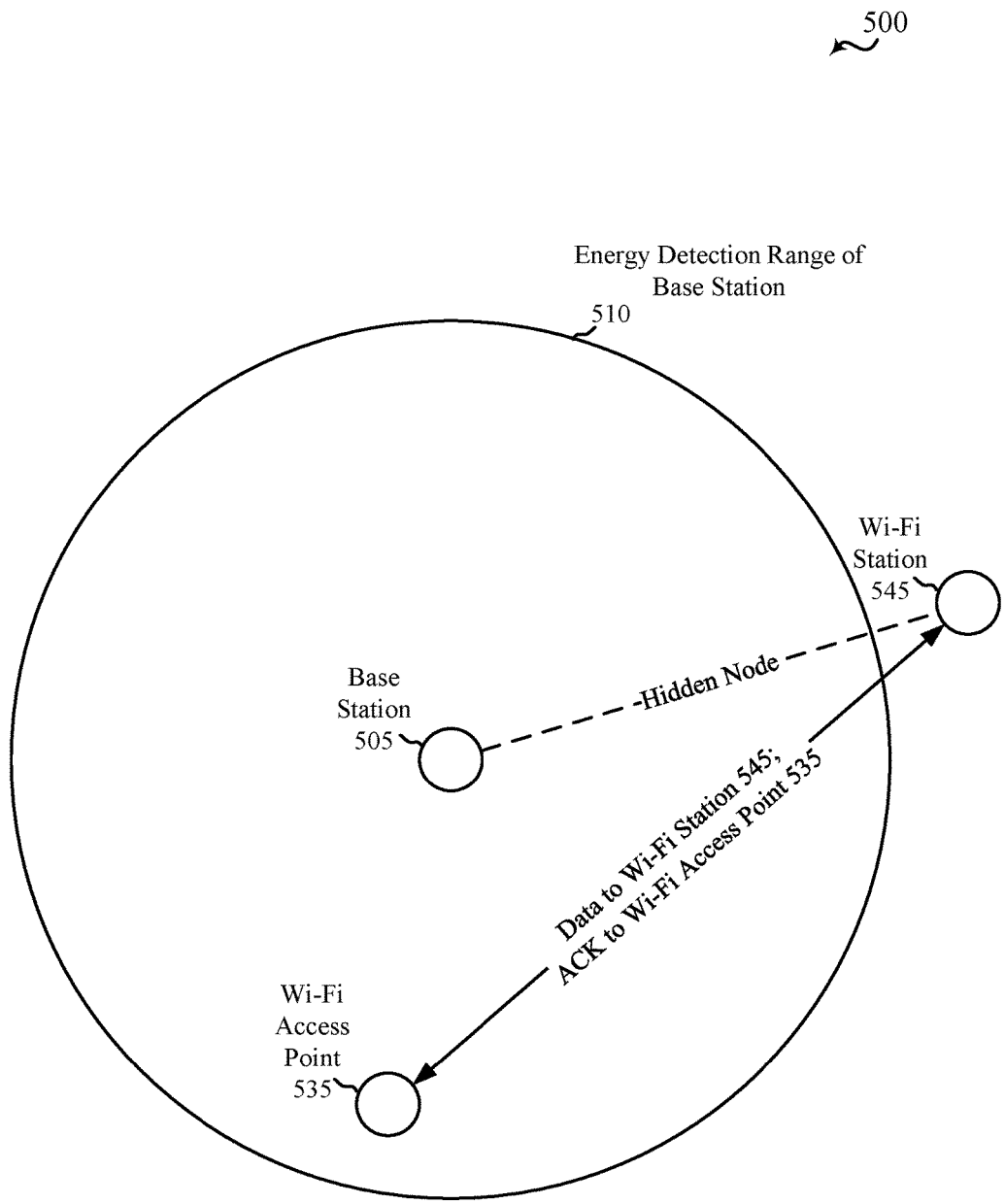
FIG. 5 illustrates communications between a Wi-Fi access point and a Wi-Fi station, in the vicinity of a base station, in accordance with various aspects of the present disclosure.

FIG. 5 illustrates communications between a Wi-Fi access point 535 and a Wi-Fi station 545, in the vicinity of a base station 505, in accordance with various aspects of the present disclosure. The Wi-Fi access point 535 and Wi-Fi station 545 may be respective examples of aspects of the Wi-Fi access point 135 and Wi-Fi station 145 described with reference to FIG. 1. The base station 505 may be an example of aspects of one or more of the base stations 105, 205, or 205-*a* described with reference to FIG. 1 or 2. The base station 505 may have an energy detection range 510.

When contending for access to a radio frequency spectrum band shared by the base station 505, the Wi-Fi access point 535, and the Wi-Fi station 545, the base station 505 may perform an LBT procedure (e.g., a CCA procedure or an ECCA procedure) to contend for access to the shared radio frequency spectrum band. The base station 505 may perform the LBT procedure when the Wi-Fi access point 535 is communicating with the Wi-Fi station 545, and the base station 505 may detect an energy of the Wi-Fi access point's transmissions over the shard radio frequency spectrum band and determine that the shared radio frequency spectrum band is unavailable. However, the base station 505 may perform an LBT procedure when the Wi-Fi station 545 is communicating with the Wi-Fi access point 535, and the base station 505 may not detect an energy of the Wi-Fi station's transmissions over the shared radio frequency spectrum band (e.g., because the Wi-Fi station 545 is outside the energy detection range 510 of the base station 505). Thus, when the Wi-Fi access point 535 and Wi-Fi station 545 take turns communicating in an uplink mode and a downlink mode, scenarios may arise in which the base station 505 contends for access to the shared radio frequency spectrum band while the Wi-Fi station 545 is transmitting, and because the base station 505 cannot detect the energy of the Wi-Fi station's transmissions, the base station 505 may determine that the shared radio frequency spectrum band is available and begin a transmission that interferes with the "in process" communications between the Wi-Fi access point 535 and Wi-Fi station 545. The base station's transmission may also trigger an exponential backoff mode of the Wi-Fi access point 535 or Wi-Fi station 545, which may make it relatively more difficult for the Wi-Fi access point 535 or Wi-Fi station 545 to regain access to the shared radio frequency spectrum band. This may be unfair to the Wi-Fi nodes (e.g., the Wi-Fi access point 535 or the Wi-Fi station 545), and under some conditions may be undesirable.

Figure 6:
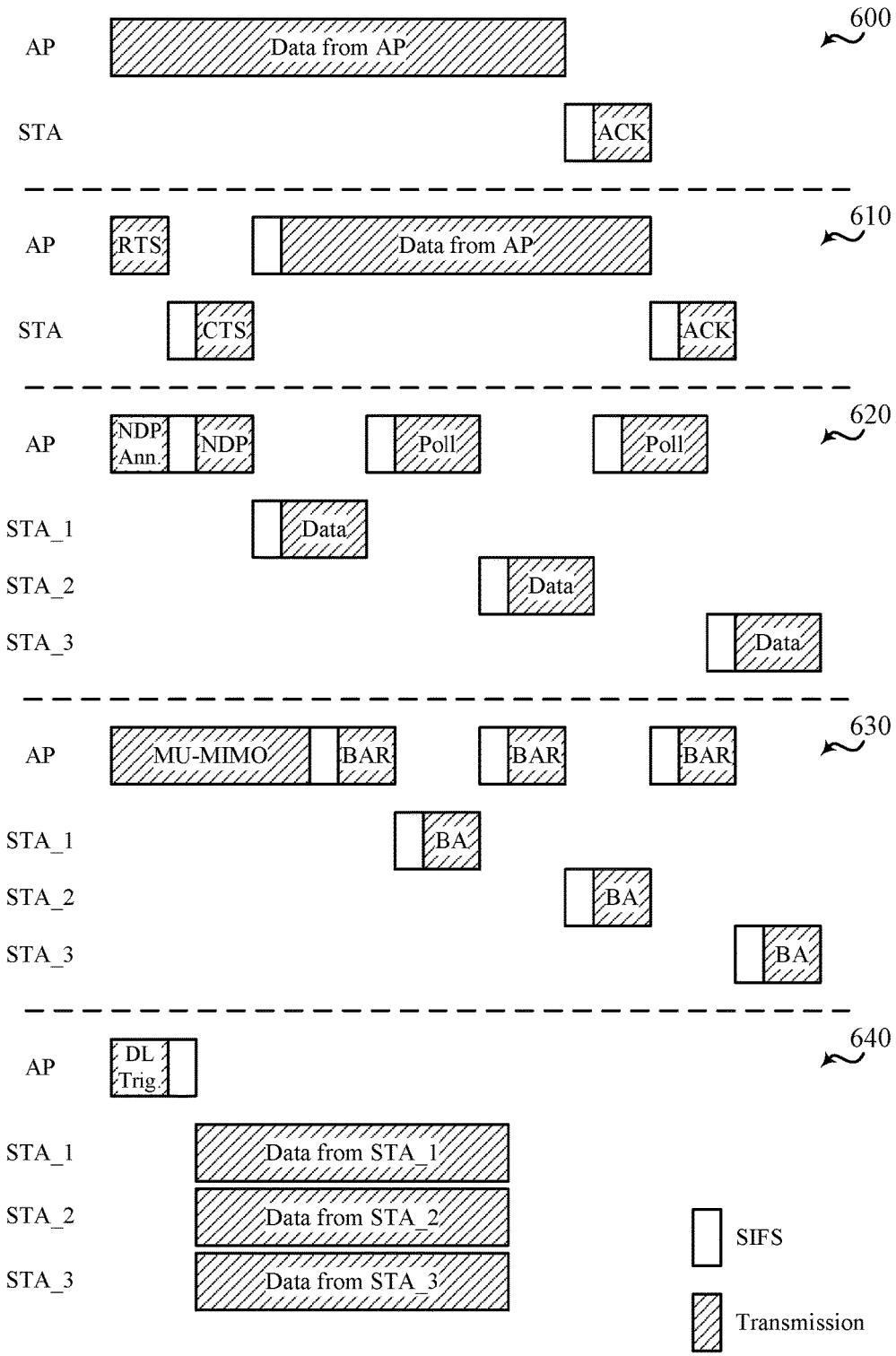
FIG. 6 shows various Wi-Fi transmission formats involving a Wi-Fi access point and a Wi-Fi station, in accordance with various aspects of the present disclosure.

FIG. 6 shows various Wi-Fi transmission formats involving a Wi-Fi access point (AP) and a Wi-Fi station (STA), in accordance with various aspects of the present disclosure. In a first Wi-Fi transmission format 600, a Wi-Fi access point transmits data ("Data") that is acknowledged by a Wi-Fi station (via an "ACK"). In a second Wi-Fi transmission format 610, a Wi-Fi access point transmits a request to send (RTS) signal that is acknowledged by a Wi-Fi station (e.g., via a clear to send (CTS) signal). The Wi-Fi access point may then transmit data ("Data") that is acknowledged by an "ACK". In a third Wi-Fi transmission format 620, a Wi-Fi access point transmits a null data packet (NDP) announcement packet followed by a NDP packet. Each of a first Wi-Fi station (STA_1), a second Wi-Fi station (STA_2), and a third Wi-Fi station (STA_3) may then sequentially transmit a respective compressed beamforming packet ("Data") which is followed by a beamforming poll packet ("Poll") transmitted by the Wi-Fi access point. In a fourth Wi-Fi transmission format 630, a Wi-Fi access point may transmit multi-user MIMO (MU-MIMO) data to a plurality of Wi-Fi stations (e.g., STA_1, STA_2, and STA_3), followed by a sequence of block ACK requests (BARs), as part of a DL MU-MIMO transmission. Each BAR may be acknowledged by one of the Wi-Fi stations in a respective block ACK (BA) transmission. In a fifth Wi-Fi transmission format 640, a Wi-Fi access point may transmit a DL trigger to a plurality of Wi-Fi stations (e.g., STA_1, STA_2, and STA_3), and each of the Wi-Fi stations may respond with a data transmission ("Data") as part of a UL MU-MIMO transmission.

In each of the first Wi-Fi transmission format 600, the second Wi-Fi transmission format 610, the third Wi-Fi transmission format 620, the fourth Wi-Fi transmission format 630, and the fifth Wi-Fi transmission format 640, changes in the direction of communications between the Wi-Fi access point and Wi-Fi station(s) may be separated by a short interframe spacing (SIFS). A base station or UE contending for access to a shared radio frequency spectrum band over which the Wi-Fi communications are carried may interpret the SIFS as an indication that the shared radio frequency spectrum band is available (e.g., idle). Also, when the Wi-Fi access point or one or more Wi-Fi stations are outside the energy detection range of the base station or UE, the base station or UE may interpret Wi-Fi communications as being complete, and may assume that the shared radio frequency spectrum band is available when it is still needed for completion of a Wi-Fi communication.

Figure 7:
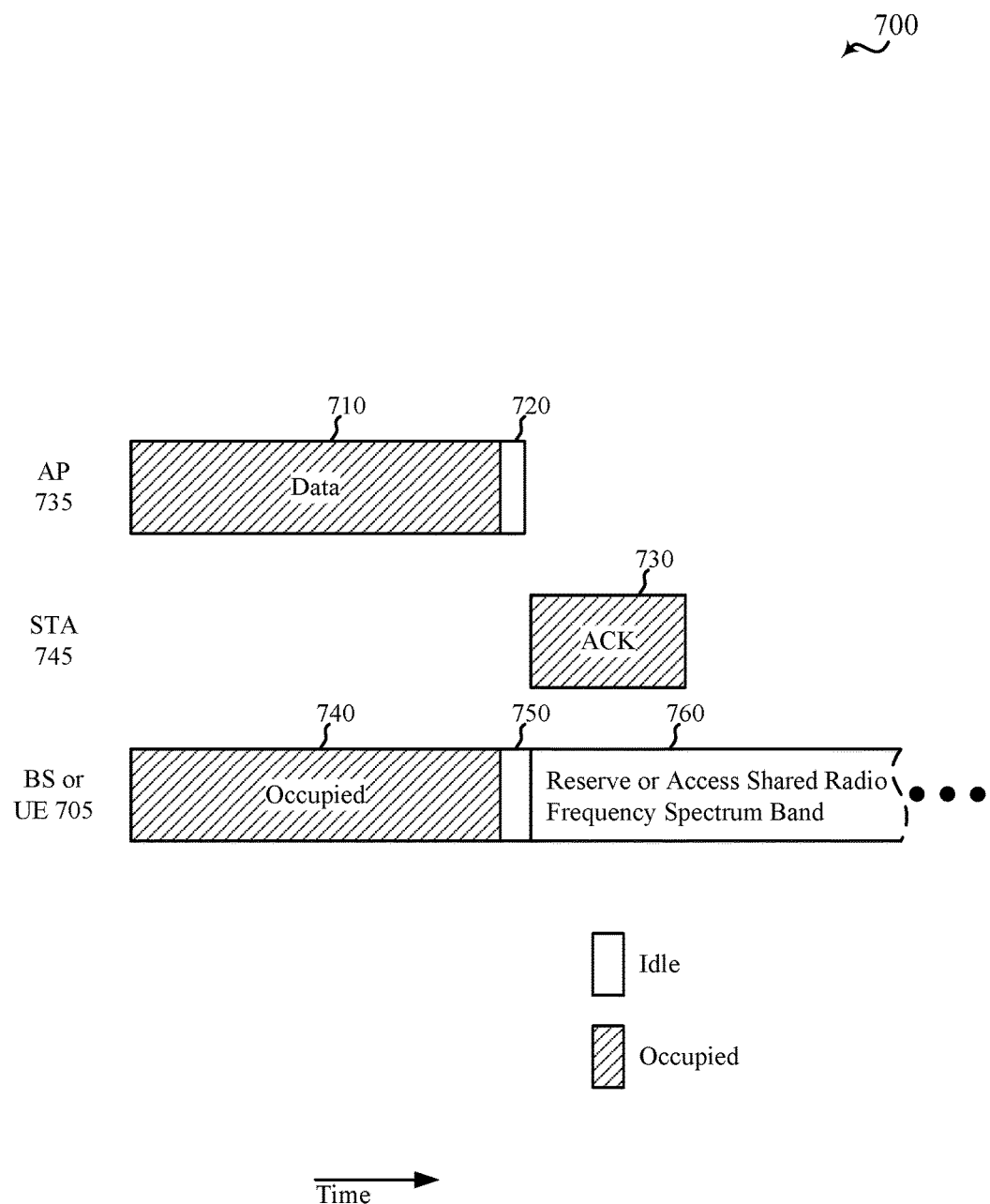
FIG. 7 shows an exemplary timeline of communications over a shared radio frequency spectrum band, between a Wi-Fi access point and a Wi-Fi station, as an apparatus (e.g., a base station or UE) contends for access to the shared radio frequency spectrum band, in accordance with various aspects of the present disclosure.

FIG. 7 shows an exemplary timeline 700 of communications over a shared radio frequency spectrum band, between a Wi-Fi access point (AP) 735 and a Wi-Fi station (STA) 745, as an apparatus 705 (e.g., a base station (BS) or UE) contends for access to the shared radio frequency spectrum band, in accordance with various aspects of the present disclosure. The Wi-Fi access point 735 or the Wi-Fi station 745 may be an example of aspects of one or more of the Wi-Fi access points 135 or 535 or Wi-Fi stations 145 or 545, respectively, as described with reference to FIG. 1 or 5. The apparatus 705 may be an example of aspects of one or more of the base stations 105, 205, 205-a, or 505, or one or more of the UEs 115, 215, 215-a, 215-b, or 215-c, described with reference to FIG. 1, 2, or 5.

The communications between the Wi-Fi access point 735 and the Wi-Fi station 745 may assume, for example, any of the Wi-Fi transmission formats shown in FIG. 6, and may switch between uplink transmissions and downlink transmissions one or more times. By way of example, the communications between the Wi-Fi access point 735 and the Wi-Fi station 745 are shown to assume the first Wi-Fi transmission format 600 shown in FIG. 6, in which data is transmitted from the Wi-Fi access point 735 to the Wi-Fi station 745 during a period 710, and then an ACK is transmitted from the Wi-Fi station 745 to the Wi-Fi access point 735 during a period 730 following a SIFS 720.

When the Wi-Fi access point 735 or the Wi-Fi station 745 is outside of an energy detection range of the apparatus 705 (i.e., when the Wi-Fi access point 735 or the Wi-Fi station 745 is a hidden node with respect to the apparatus 705), the apparatus 705 may not detect the transmissions of the hidden node. By way of example, FIG. 7 assumes that the Wi-Fi access point 735 is within an energy detection range of the apparatus 705 and the Wi-Fi station 745 is a hidden node with respect to the apparatus 705, and thus, the apparatus 705 may detect the data transmission during period 710 and determine that the shared radio frequency spectrum band is occupied during a period 740, but may not detect the ACK transmission by the Wi-Fi station 745 during period 730. As a result, when the apparatus 705 successfully completes an ECCA procedure during period 750, the apparatus 705 may determine that the shared radio frequency spectrum band is available and begin transmitting data during period 760. The apparatus' transmission of the data during period 760 may collide with the Wi-Fi station's transmission of the ACK during period 730 and interfere with the Wi-Fi access point's receipt of the ACK. The Wi-Fi access point's failure to receive or properly decode the ACK may trigger the start or continuation of an exponential backoff by the Wi-Fi access point 735. When in exponential backoff mode, the Wi-Fi access point 735 refrains from contending for access to the shared radio frequency spectrum band for an extended period of time, which period of time lengthens exponentially each time exponential backoff is triggered at the Wi-Fi access point 735.

As another example of an apparatus triggering an exponential backoff by a Wi-Fi access point, consider communications between a Wi-Fi access point and a plurality of Wi-Fi stations according to the fourth Wi-Fi transmission format 630 (e.g., the DL MU-MIMO format) shown in FIG. 6. If any one of the Wi-Fi stations operates as a hidden node with respect to the apparatus, the apparatus may incorrectly determine that the shared radio frequency spectrum band is available (e.g., because it detects an absence of transmissions on the shared radio frequency spectrum band following a BAR transmission of the Wi-Fi access point) and transmit data that interferes with the Wi-Fi access point's receipt of a BA transmission from one of the Wi-Fi stations. When the transmission of the apparatus causes the Wi-Fi access point to not receive or not properly decode the BA transmission, exponential backoff may be triggered at the Wi-Fi access point.

Under some scenarios, exponential backoff by a Wi-Fi node may be triggered in a manner that renders access to the shared radio frequency spectrum band unfair. For example, the triggering of exponential backoff by a Wi-Fi node may enable an apparatus to access the shared radio frequency spectrum band more frequently than the Wi-Fi node. Mechanisms implemented by the apparatus (e.g., HARQ) may also enable the apparatus to complete its transmissions more effectively than the Wi-Fi node.

One technique for managing a plurality of RATs (e.g., a WWAN RAT and a WLAN RAT) to access a shared radio frequency spectrum band, for example, during a perceived gap in transmissions between a first Wi-Fi node within energy detection range and a second Wi-Fi node that operates as a hidden node with respect to the apparatus, is to increase the value of N that determines the random number of N CCA slots for which a shared radio frequency spectrum band needs to be available, when an ECCA is performed by an apparatus, before a base station or UE may win contention for access to a shared radio frequency spectrum band. A lower value of N (e.g., N=1 or 2) may enable an ECCA procedure to succeed after determining that a shared radio frequency spectrum band is available for 1 or 2 CCA slots, despite the shared radio frequency spectrum band being unavailable for q–N CCA slots (e.g., unavailable for 30 or 31 slots when q=32). Such a low ratio of N:q may enable the apparatus to determine the shared radio frequency spectrum band is available based on its availability during a small number of CCA slots representing an incorrectly perceived gap in Wi-Fi transmissions between the first Wi-Fi node and the second Wi-Fi node.

One way to effectively increase the value of N is to configure the range of numbers from which the random number N is selected. Configuring the range of numbers may include, for example, increasing a lower bound of the range of numbers, increasing an upper bound of the range of numbers, or increasing both the lower bound and the upper bound of the range of numbers. For example, instead of selecting N as a random number in the range of [1, q], N may be selected as a random number in the range of [$N_{min}$, q+$N_{min}$], where $N_{min}$>1. Such a configuration may be made per cell or per UE, and may be configured by a base station (for one or more UEs) or a UE.

Figure 8:
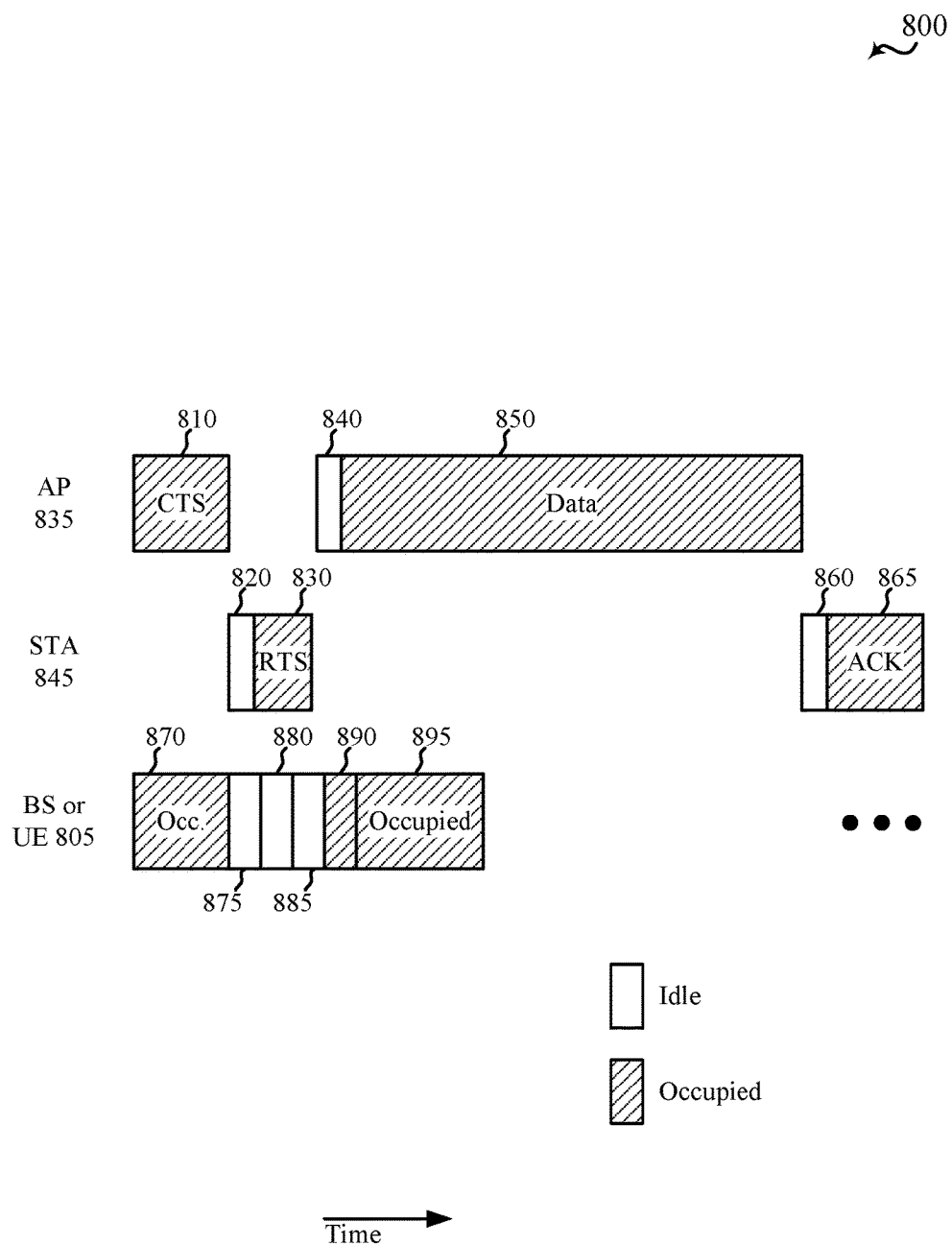
FIG. 8 shows an exemplary timeline of communications over a shared radio frequency spectrum band, between a Wi-Fi access point and a Wi-Fi station, as an apparatus (e.g., a base station or UE) contends for access to the shared radio frequency spectrum band, in accordance with various aspects of the present disclosure.

Another technique for managing a plurality of RATs (e.g., a WWAN RAT and a WLAN RAT) to access a shared radio frequency spectrum band, for example, during a perceived gap in transmissions between a first Wi-Fi node within energy detection range and a second Wi-Fi node that operates as a hidden node with respect to the apparatus, is to configure the apparatus to identify a number of consecutive CCA slots for which the shared radio frequency spectrum band is available before winning contention for access to the shared radio frequency spectrum band, as described further with reference to FIG. 8.

FIG. 8 shows an exemplary timeline 800 of communications over a shared radio frequency spectrum band, between a Wi-Fi access point (AP) 835 and a Wi-Fi station (STA) 845, as an apparatus 805 (e.g., a base station (BS) or UE) contends for access to the shared radio frequency spectrum band, in accordance with various aspects of the present disclosure. The Wi-Fi access point 835 or the Wi-Fi station 845 may be an example of aspects of one or more of the Wi-Fi access points 135, 535, or 735 or Wi-Fi stations 145, 545, or 745, respectively, as described with reference to FIG. 1, 5, or 7. The apparatus 805 may be an example of aspects of one or more of the base stations 105, 205, 205-*a*, or 505, or one or more of the UEs 115, 215, 215-*a*, 215-*b*, or 215-*c*, described with reference to FIG. 1, 2, or 5. The apparatus 805 may also or alternatively be an example of aspects of the apparatus 705 described with reference to FIG. 7.

The communications between the Wi-Fi access point 835 and the Wi-Fi station 845 may assume, for example, any of the Wi-Fi transmission formats shown in FIG. 6, and may switch between uplink transmissions and downlink transmissions one or more times. For example, the communications between the Wi-Fi access point 835 and the Wi-Fi station 845 are shown to assume the second Wi-Fi transmission format 610 shown in FIG. 6, in which a CTS transmission is transmitted from the Wi-Fi access point 835 to the Wi-Fi station 845 during a period 810; an RTS transmission is transmitted from the Wi-Fi station 845 to the Wi-Fi access point 835 during a period 830 following a first SIFS 820; data is transmitted from the Wi-Fi access point 835 to the Wi-Fi station 845 during a period 850 following a second SIFS 840, and an ACK is transmitted from the Wi-Fi station 845 to the Wi-Fi access point 835 during a period 865 following a third SIFS 860.

By way of example, FIG. 8 assumes that the Wi-Fi station 845 is a hidden node with respect to the apparatus 805, and thus, the apparatus 805 may detect the CTS transmission during period 810 and the data transmission during period 850 and determine that the shared radio frequency spectrum band is occupied during the period 870, the CCA slot 890, and the period 895, but may not detect the RTS transmission during period 830 or the ACK transmission during period 865. As a result, when the apparatus 805 successfully completes an ECCA procedure during one of CCA slots 875, 880, 885, or 890, the apparatus 805 may determine that the shared radio frequency spectrum band is available and begin transmitting data that interferes with reception of the RTS transmission, the data transmission, or the ACK transmission by the Wi-Fi access point 835 or Wi-Fi station 845. The Wi-Fi access point's or Wi-Fi station's failure to receive or properly decode a transmission may trigger the start or continuation of an exponential backoff by the Wi-Fi access point 835 or Wi-Fi station 845.

To decrease the chance that the apparatus 805 will successfully complete an ECCA procedure during a perceived gap in the transmissions between the Wi-Fi access point 835 and the Wi-Fi station 845, the apparatus 805 may be configured to identify a number of consecutive CCA slots (e.g., four CCA slots, including a first CCA slot 875, a second CCA slot 880, a third CCA slot 885, and a fourth CCA slot 890) for which the shared radio frequency spectrum band is available before winning contention for access to the shared radio frequency spectrum band. In some examples, the consecutive number of CCA slots may be the last available CCA slots before the apparatus 805 begins transmitting over the shared radio frequency spectrum band. When an ECCA procedure to contend for access to the shared radio frequency spectrum band is commenced before or during the occupied period 870, the number of consecutive CCA slots (e.g., the first CCA slot 875, the second CCA slot 880, the third CCA slot 885, and the fourth CCA slot 890) may be a last available number of CCA slots in which the extended CCA procedure is performed. Alternatively, and when the ECCA procedure to contend for access to the shared radio frequency spectrum band is commenced before or during the occupied period 870, the number of consecutive CCA slots (e.g., the first CCA slot 875, the second CCA slot 880, the third CCA slot 885, and the fourth CCA slot 890) may include at least one of: a last number of CCA slots in which the extended CCA procedure is performed, or a number of CCA slots in which the extended CCA procedure is performed in combination with at least one CCA slot following a last CCA slot in which the extended CCA procedure is performed (e.g., the first CCA slot 875 and the second CCA slot 880 could be CCA slots in which the extended CCA procedure is performed, and because the ECCA procedure concludes before the shared radio frequency spectrum band has been determined available in the identified number of consecutive slots, the ECCA procedure may be continued, or one or more additional CCA procedures may be performed, in the third CCA slot 885 and the fourth CCA slot 890.

When an ECCA procedure to contend for access to the shared radio frequency spectrum band has already been performed and the apparatus 805 is in an idle state with respect to the shared radio frequency spectrum band, the apparatus 805 may be configured to perform one or more CCA procedures in a number of consecutive CCA slots, and determine the shared radio frequency spectrum band is available in each of the CCA slots, before beginning a transmission over the shared radio frequency spectrum band.

As shown in FIG. 8, the number of consecutive CCA slots in which one or more CCA procedures is performed is four consecutive CCA slots. Because the shared radio frequency spectrum band is only available in three of the four consecutive CCA slots, the apparatus 805 may not access the shared radio frequency spectrum band and will not interfere with the Wi-Fi access point's reception of at least the RTS transmission, or the Wi-Fi station's reception of at least the data transmitted by the Wi-Fi access point 835 during period 850. When the apparatus 805 determines that the shared radio frequency spectrum band is occupied (i.e., unavailable) during one or more of the number of consecutive CCA slots, the apparatus 805 may be configured to refrain from accessing the shared radio frequency spectrum band until a next occasion for performing an ECCA procedure.

Figure 9:
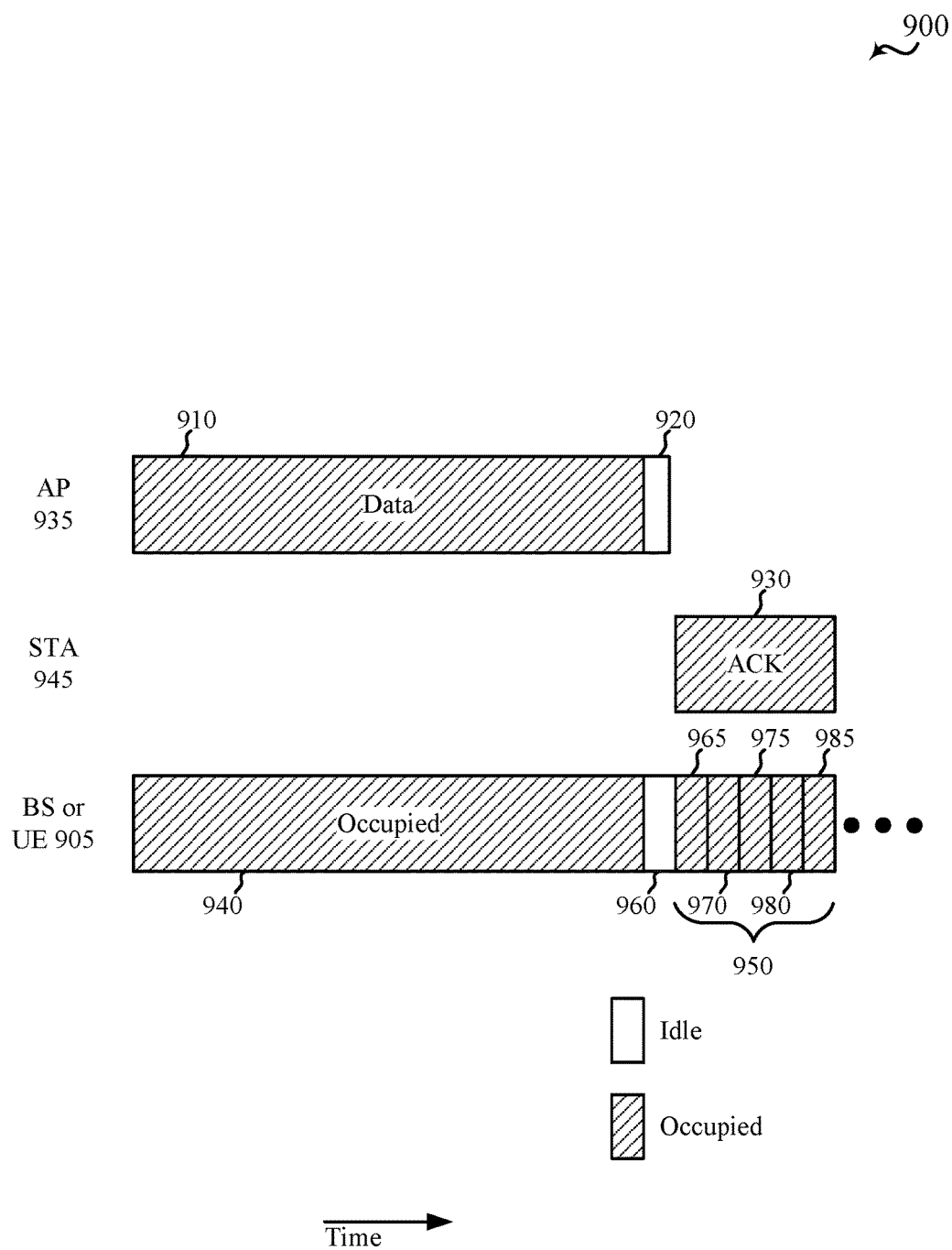
FIG. 9 shows an exemplary timeline of communications over a shared radio frequency spectrum band, between a Wi-Fi access point and a Wi-Fi station, as an apparatus (e.g., a base station or UE) contends for access to the shared radio frequency spectrum band, in accordance with various aspects of the present disclosure.

FIG. 9 shows an exemplary timeline 900 of communications over a shared radio frequency spectrum band, between a Wi-Fi access point (AP) 935 and a Wi-Fi station (STA) 945, as an apparatus 905 (e.g., a base station (BS) or UE) contends for access to the shared radio frequency spectrum band, in accordance with various aspects of the present disclosure. The Wi-Fi access point 935 or the Wi-Fi station 945 may be an example of aspects of one or more of the Wi-Fi access points 135, 535, 735, or 835 or Wi-Fi stations 145, 545, 745, or 845, respectively, as described with reference to FIG. 1, 5, 7, or 8. The apparatus 905 may be an example of aspects of one or more of the base stations 105, 205, 205-*a*, or 505, or one or more of the UEs 115, 215, 215-*a*, 215-*b*, or 215-*c*, described with reference to FIG. 1, 2, or 5. The apparatus 905 may also or alternatively be an example of aspects of one or more of the apparatuses 705 or 805 described with reference to FIG. 7 or 8.

The communications between the Wi-Fi access point 935 and the Wi-Fi station 945 may assume, for example, any of the Wi-Fi transmission formats shown in FIG. 6, and may switch between uplink transmissions and downlink transmissions one or more times. By way of example, the communications between the Wi-Fi access point 935 and the Wi-Fi station 945 are shown to assume the first Wi-Fi transmission format 600 shown in FIG. 6, in which data is transmitted from the Wi-Fi access point 935 to the Wi-Fi station 945 during a period 910, and then an ACK is transmitted from the Wi-Fi station 945 to the Wi-Fi access point 935 during a period 930 following a SIFS 920.

By way of example, FIG. 9 assumes that the Wi-Fi station 945 is a hidden node with respect to the apparatus 905, and thus, the apparatus 905 may detect the data transmission during period 910 and determine that the shared radio frequency spectrum band is occupied during a period 940, but may not detect the ACK transmission by the Wi-Fi station 945 during period 930. As a result, when the apparatus 905 successfully completes an ECCA procedure during one of the CCA slots 950 and/or 960, the apparatus 905 may determine that the shared radio frequency spectrum band is available and begin transmitting data that interferes with reception of the ACK transmission by the Wi-Fi access point 935. The Wi-Fi access point's failure to receive or properly decode the ACK transmission may trigger the start or continuation of an exponential backoff by the Wi-Fi access point 935.

One way to decrease the chance that the apparatus 905 will successfully complete an ECCA procedure, during the perceived gap in the transmissions between the Wi-Fi access point 935 and the Wi-Fi station 945, is to modify a CCA energy detection threshold for at least one CCA slot in which at least one CCA is performed. For example, the apparatus 905 may use a first CCA energy detection threshold to determine whether the shared radio frequency spectrum band is available during CCA slots subsumed in the period 940. Upon determining that the shared radio frequency spectrum is available, based at least in part on the first CCA energy detection threshold for a first CCA slot 960, the apparatus 905 may sense an energy level of the shared radio frequency spectrum band during the first CCA slot 960, and establish a second CCA energy detection threshold (i.e., a dynamic CCA energy detection threshold, wherein the dynamic CCA energy detection threshold may change based at least in part on the energy levels of transmissions using the shared radio frequency spectrum band) based at least in part on the sensed energy level. For example, the sensed energy level may include the energy level of the ACK transmission during period 930.

The apparatus 905 may perform a number of CCA procedures based at least in part on the second CCA energy detection threshold. The number of CCA procedures may be performed in a set of CCA slots (e.g., in a second CCA slot 965, a third CCA slot 970, a fourth CCA slot 975, a fifth CCA slot 980, and a sixth CCA slot 985). In some examples, the number of CCA procedures may include a CCA procedure performed per CCA slot. In some examples, the number of CCA procedures may include an extended CCA procedure performed over (or including) the set of CCA slots. The apparatus 905 may win contention for access to the shared radio frequency spectrum band when the shared radio frequency spectrum band is determined to be available for a subset of CCA slots included in the set of CCA slots (e.g., a subset including one, a plurality of, or all of the CCA slots in the set of CCA slots). In some examples, the second number of one or more CCA slots may include a number of consecutive CCA slots, as described with reference to FIG. 8. In some examples, the set of CCA slots may be a single CCA slot (e.g., the second CCA slot 965). After the second CCA energy detection threshold is used for the number of CCA procedures performed in the set of CCA slots, the CCA energy detection threshold may be restored to the first CCA energy detection threshold for performing a subsequent CCA procedure or ECCA procedure.

Figure 10:
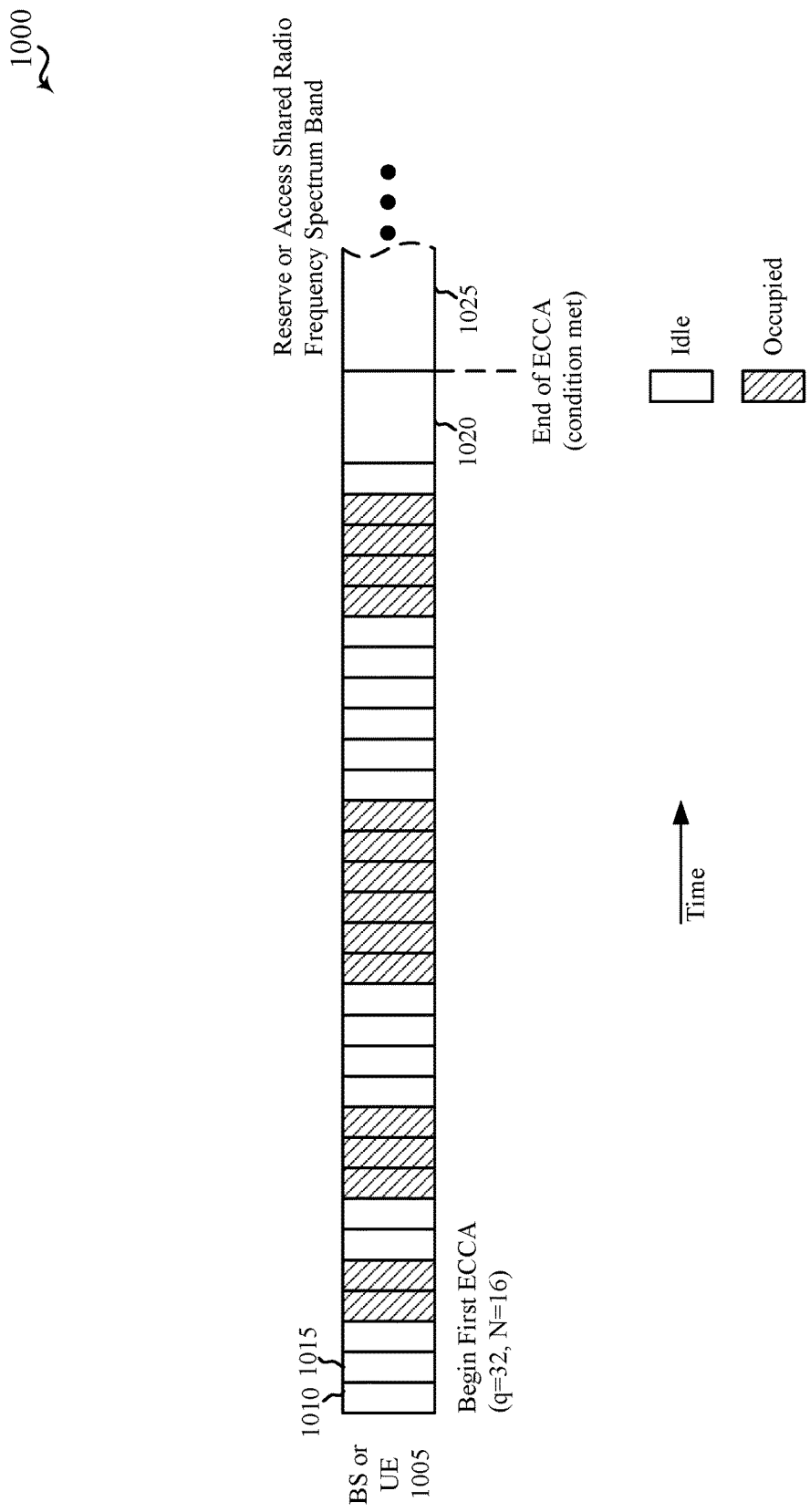
FIG. 10 shows an exemplary timeline of CCA slots in which an ECCA procedure may be performed by an apparatus (e.g., a base station or UE) contending for access to a shared radio frequency spectrum band, in accordance with various aspects of the present disclosure.

FIG. 10 shows an exemplary timeline 1000 of CCA slots (e.g., a first CCA slot 1010, a second CCA slot 1015, etc.) in which an ECCA procedure may be performed by an apparatus 1005 (e.g., a base station (BS) or UE) contending for access to a shared radio frequency spectrum band, in accordance with various aspects of the present disclosure. The apparatus 1005 may be an example of aspects of one or more of the base stations 105, 205, 205-*a*, or 505, or one or more of the UEs 115, 215, 215-*a*, 215-*b*, or 215-*c*, described with reference to FIG. 1, 2, or 5. The apparatus 1005 may also or alternatively be an example of aspects of one or more of the apparatuses 705, 805, or 905 described with reference to FIG. 7, 8, or 9.

One way to decrease the chance that the apparatus 1005 will successfully complete an ECCA procedure, during a perceived gap in transmissions between a Wi-Fi access point and one or more Wi-Fi stations, is to increase a duration of a last CCA slot 1020 in which an extended CCA procedure is performed in the CCA slots (e.g., from 20 microseconds to 40, 50, or 60 microseconds). In some examples, winning contention for access to a shared radio frequency spectrum band may include successfully performing the ECCA procedure (which in FIG. 10 is shown to include a determination that the shared radio frequency spectrum band is available in N=16 of q=32 CCA slots) and successfully performing the ECCA procedure in the last CCA slot 1020 of increased duration. If both conditions are met (as shown), the apparatus 1005 may win contention for access to the shared radio frequency spectrum band during a period 1025 following the last CCA slot 1020. If one or the other condition is not met, the apparatus 1005 may be configured to refrain from accessing the shared radio frequency spectrum band during the period 1025. In some examples, winning contention for access to the shared radio frequency spectrum band may require successfully performing an ECCA procedure in the last CCA slot 1020 and one or more consecutive CCA slots, as described with reference to FIG. 8. In some examples, the duration of the last CCA slot 1020 may be increased and its CCA energy detection threshold may set to a second CCA energy detection threshold as described with reference to FIG. 9. Such a modification (or modifications) to an ECCA procedure may be made per cell or per UE, and may be made by a base station (for one or more UEs) or a UE.

Figure 11:
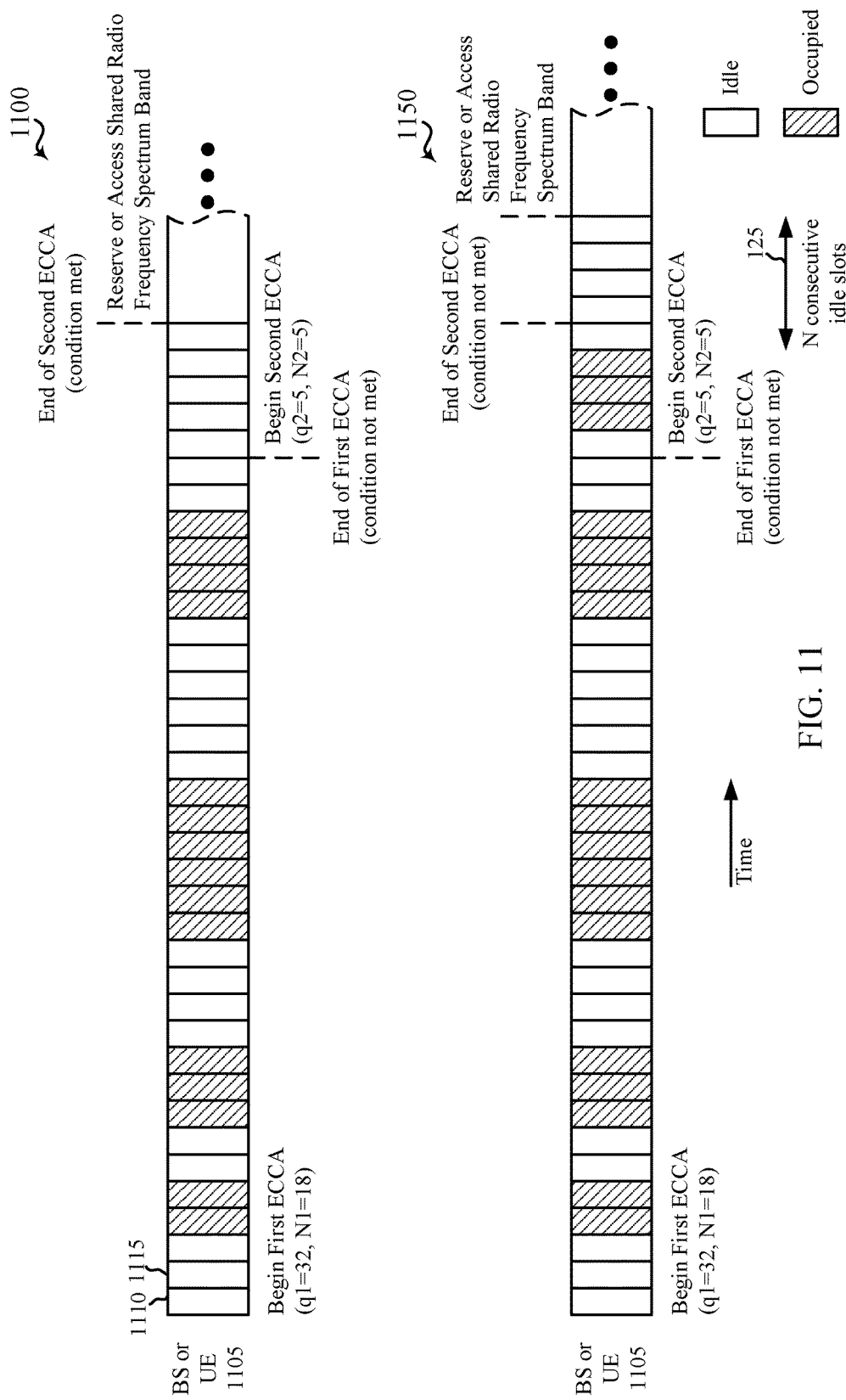
FIG. 11 shows exemplary timelines of CCA slots in which a first ECCA procedure and a second ECCA procedure may be performed by an apparatus (e.g., a base station or UE)

FIG. 11 shows exemplary timelines (e.g., a first timeline 1100, and a second timeline 1150) of CCA slots (e.g., a first CCA slot 1110, a second CCA slot 1115, etc.) in which a first ECCA procedure and a second ECCA procedure may be performed by an apparatus 1105 (e.g., a base station (BS) or UE) contending for access to a shared radio frequency spectrum band, in accordance with various aspects of the present disclosure. The apparatus 1105 may be an example of aspects of one or more of the base stations 105, 205, 205-a, or 505, or one or more of the UEs 115, 215, 215-a, 215-b, or 215-c, described with reference to FIG. 1, 2, or 5. The apparatus 1105 may also or alternatively be an example of aspects of one or more of the apparatuses 705, 805, 905, or 1005 described with reference to FIG. 7, 8, 9, or 10.

One way to decrease the chance that the apparatus 1105 will successfully complete an ECCA procedure, during a perceived gap in transmissions between a Wi-Fi access point and one or more Wi-Fi stations, is to configure the apparatus 1105 to successfully perform a plurality of ECCA procedures before the apparatus 1105 may win contention for access to the shared radio frequency spectrum band. In some examples, the plurality of ECCA procedures may include a first ECCA procedure followed by a second ECCA procedure. In some examples, the first ECCA procedure may be performed over a first number of CCA slots and the second ECCA procedure may be performed over a second number of CCA slots. In some examples, the second number of CCA slots may be less than the first number of CCA slots. In some examples, the first ECCA procedure and the second ECCA procedure may be performed consecutively, or the first number of CCA slots may be contiguous to the second number of CCA slots.

In some examples, successful performance of the first ECCA procedure may be configured to determine the shared radio frequency spectrum band is available for a first random number of CCA slots (e.g., N1 CCA slots), and successful performance of the second ECCA procedure may be configured to determine the shared radio frequency spectrum band is available for a second random number of CCA slots (e.g., N2 CCA slots). The first random number of CCA slots may be selected from a first range of numbers having a first lower bound ($q1_{min}$) and a first upper bound ($q1_{max}$), such that $N1 \in [q1_{min}, q1_{max}]$, and the second random number of CCA slots may be selected from a second range of numbers having a second lower bound ($q2_{min}$) and a second upper bound ($q2_{max}$), such that $N2 \in [q2_{min}, q2_{max}]$. In one example, the first random number and the second random number may be selected such that $N1 \in [6, 32]$ and $N2 \in [1, 5]$. When N1 and N2 are selected from overlapping ranges of numbers, a limitation may be imposed, in some examples, that N2 is less than N1. The first timeline 1100 shows an example in which the first ECCA procedure is not successful, but the second ECCA procedure is successful. The second timeline 1150 shows an example in which the first ECCA procedure is not successful, and the second ECCA procedure is not successful. When the second ECCA procedure is unsuccessful, CCA procedures may be performed in a number of additional CCA slots, and if the CCA procedures are successful in a consecutive number of the CCA slots (e.g., N2=5 slots), access to the shared radio frequency spectrum band may be won.

In some examples, the second ECCA procedure may configured as described with reference to FIG. 8, 9, or 10, with a second CCA energy detection threshold, a last CCA slot of longer duration, etc.

FIG. 12 shows an exemplary timeline 1200 of communications over a shared radio frequency spectrum band, between a Wi-Fi access point (AP) 1235 and a Wi-Fi station (STA) 1245, as an apparatus 1205 (e.g., a base station (BS) or UE) contends for access to the shared radio frequency spectrum band, in accordance with various aspects of the present disclosure. The Wi-Fi access point 1235 or the Wi-Fi station 1245 may be an example of aspects of one or more of the Wi-Fi access points 135, 535, 735, 835, or 935 or Wi-Fi stations 145, 545, 745, 845, or 945, respectively, as described with reference to FIG. 1, 5, 7, 8, or 9. The apparatus 1205 may be an example of aspects of one or more of the base stations 105, 205, 205-a, or 505, or one or more of the UEs 115, 215, 215-a, 215-b, or 215-c, described with reference to FIG. 1, 2, or 5. The apparatus 1205 may also or alternatively be an example of aspects of one or more of the apparatuses 705, 805, 905, 1005, or 1105 described with reference to FIG. 7, 8, 9, 10, or 11.

The communications between the Wi-Fi access point 1235 and the Wi-Fi station 1245 may assume, for example, any of the Wi-Fi transmission formats shown in FIG. 6, and may switch between uplink transmissions and downlink transmissions one or more times. By way of example, the communications between the Wi-Fi access point 1235 and the Wi-Fi station 1245 are shown to assume the first Wi-Fi transmission format shown in FIG. 6, in which data is transmitted from the Wi-Fi access point 1235 to the Wi-Fi station 1245 during a period 1210, and then an ACK is transmitted from the Wi-Fi station 1245 to the Wi-Fi access point 1235 during a period 1230 following a SIFS 1220.

By way of example, FIG. 12 assumes that the Wi-Fi station 1245 is a hidden node with respect to the apparatus 1205, and thus, the apparatus 1205 may detect the data transmission during period 1210 and determine that the shared radio frequency spectrum band is occupied during a period 1240, but may not detect the ACK transmission during period 1230. As a result, if the apparatus 1205 successfully completes an ECCA procedure during the period 1250, the apparatus 1205 may determine that the shared radio frequency spectrum band is available and begin transmitting data that interferes with reception of the ACK transmission by the Wi-Fi access point 1235. The Wi-Fi access point's failure to receive or properly decode the ACK transmission may trigger the start or continuation of an exponential backoff by the Wi-Fi access point 1235.

One way to decrease the chance that the apparatus 1205 will successfully complete an ECCA procedure, during the perceived gap in the transmissions between the Wi-Fi access point 1235 and the Wi-Fi station 1245, is to introduce a deferment period 1255 (e.g., an arbitration interframe spacing (AIFS)) upon determining the shared radio frequency spectrum band is unavailable. The deferment period 1255 may be a period for which the apparatus 1205 waits before performing an additional number of CCA procedures (which additional number of CCA procedures may include one or more CCA procedures, or which additional number of CCA procedures may include an additional number of one or more ECCA procedures). Upon determining the shared radio frequency spectrum band is available for each of the additional number of CCA procedures, the apparatus 1205 may win contention for access to the shared radio frequency spectrum band.

In some examples, the deferment period 1255 may be implemented similarly to a Wi-Fi AIFS and have a duration of a SIFS plus three Wi-Fi slot durations (e.g., 16+3*9=43 microseconds).

Wi-Fi nodes may use one of two mechanisms to reduce collisions over a Wi-Fi network (e.g., over a shared radio frequency spectrum band). The first mechanism is exponential backoff on a per packet basis, and the second mechanism is an adaptation of the contention window minimum length (CW_min) over a period of time. For an apparatus using a shared radio frequency spectrum band, exponential backoff may not be necessary, due to HARQ combining based on re-transmissions and/or fast channel quality indicator (CQI) adaptations. However, adaptation of the maximum number of CCA slots over which an ECCA procedure is performed (e.g., the value "q"), over a period of time, may provide better coexistence between Wi-Fi nodes and cellular nodes. In some examples, the value of q used by one or more apparatuses may be configured in response to an identified potential for interference, which potential for interference may be identified, for example, based at least in part on one or more of: a number of transmitters (e.g., a number of Wi-Fi transmitters) detected within an energy detection range of the apparatus; a failure rate of transmissions (e.g., subframes) for which feedback is reported (e.g., by a UE); an erasure rate for transmissions (e.g., subframes) for which an error is not reported (e.g., because of bursty interference blanking ACKs/NAKs transmitted by a UE); or a variance between a supported modulation and coding scheme (MCS; e.g., an MCS based on a determined reference signal received power (RSRP)) and an MCS actually used (e.g., an MCS based on outer loop HARQ processing).

In some examples, the value of q used by one or more apparatuses may be configured by linearly increasing q or linearly decreasing q over time. In some examples, the value of q used by one or more apparatuses may be configured by multiplicatively increasing q or linearly decreasing q over time. In some examples, the value of q used by one or more apparatuses may be configured by multiplicatively increasing q or multiplicatively decreasing q over time.

FIG. 13 shows an exemplary timeline 1300 of CCA slots (e.g., a first CCA slot 1310, a second CCA slot 1315, a third CCA slot 1320, a fourth CCA slot 1325, etc.) in which an ECCA procedure may be performed by an apparatus 1305 (e.g., a base station or UE) contending for access to a shared radio frequency spectrum band, in accordance with various aspects of the present disclosure. The apparatus 1305 may be an example of aspects of one or more of the base stations 105, 205, 205-*a*, or 505, or one or more of the UEs 115, 215, 215-*a*, 215-*b*, 215-*c*, or 515, described with reference to FIG. 1, 2, or 5. The apparatus 1305 may also or alternatively be an example of aspects of one or more of the apparatuses 705, 805, 905, 1005, 1105, or 1205 described with reference to FIG. 7, 8, 9, 10, 11, or 12.

As shown in a first example of the performance of an ECCA procedure by the apparatus 1305 (i.e., "App. 1305, Ex. 1"), the ECCA procedure may be performed over an observation period of q=16 CCA slots, and the apparatus 1305 may win contention for access to the shared radio frequency spectrum band upon determining the shared radio frequency spectrum band is available (e.g., idle) for N=9 CCA slots. For purposes of the ECCA procedures shown in FIG. 13, the observation periods over which the ECCA procedures are performed may be divided into a plurality of consecutive, nominal time periods (e.g., consecutive time periods of 20 microseconds, including a first time period 1330, a second time period 1335, etc.). An ECCA procedure may then be performed over a plurality of CCA slots (e.g., q=16 CCA slots), where each of the CCA slots may be determined to be an idle slot (I) or an occupied slot (O). An idle CCA slot may correspond to a preconfigured period of time for which the shared radio frequency spectrum band is determined to be available (e.g., one of the consecutive, nominal time periods). An occupied CCA sot may correspond to an entirety of a contiguous period for which the shared radio frequency spectrum band is determined to be unavailable (e.g., the three consecutive nominal time periods 1340, 1345, and 1350).

Continuing with the description of the first example (App. 1305, Ex. 1), and by way of further example, 13 idle CCA slots and 3 occupied CCA slots may be identified during the performance of the ECCA procedure. Thus, the apparatus 1305 may win contention for access to the shared radio frequency spectrum band at time 1355 and thereafter reserve or access the shared radio frequency spectrum band.

As shown in a second example of the performance of an ECCA procedure by the apparatus 1305 (i.e., "App. 1305, Ex. 2"), time may be saved by discontinuing an ECCA procedure after determining that the shared radio frequency spectrum band is available for an indicated number of CCA slots. For example, with q=16 and N=9, and the same channel availability used in the first example (i.e., in "App. 1305, Ex. 1"), the apparatus 1305 may win contention for access to the shared radio frequency spectrum band at time 1360, earlier than time 1355, and discontinue the ECCA procedure. In the second example, the apparatus 1305 may therefore reserve or access the shared radio frequency spectrum band at time 1360, which is earlier than when it could reserve or access the shared radio frequency spectrum band in the first example.

As shown in a third example of the performance of an ECCA procedure by the apparatus 1305 (i.e., "App. 1305, Ex. 3"), time may also be saved by discontinuing a first ECCA procedure after determining that the shared radio frequency spectrum band is unavailable during enough CCA slots that it is no longer possible to meet a condition that the shared radio frequency spectrum band be available N CCA slots. For example, with q=16 and N=14, and the same channel availability used in the first and second examples (i.e., in "App. 1305, Ex. 1" and "App. 1305, Ex. 2"), the apparatus 1305 may determine that it cannot win contention for access to the shared radio frequency spectrum band at time 1365, earlier than time 1355, and discontinue the first ECCA procedure. Upon discontinuing the first ECCA procedure, the apparatus 1305 may begin a second ECCA procedure. The second ECCA procedure may begin immediately after the first ECCA procedure terminates, or after a deferment period, or at a next occasion for contending for access to the shared radio frequency spectrum band. In some examples, the apparatus 1305 may implement an exponential backoff mechanism, such that the second ECCA procedure is performed in the context of a larger value of q or N. In some examples, the value of q may be doubled for each successive ECCA procedure performed. In some examples, the value of q may be incremented in a linear or multiplicative manner. Upon winning contention for access to the shared radio frequency spectrum band, or after a period of time has elapsed, or after the value of q reaches a maximum value (e.g., q=1024), the value of q may be decremented in a linear or multiplicative manner, or the value of q may be reset to an initial value of q (e.g., q=16).

The ECCA procedure(s) described with reference to the second and third examples shown in FIG. 13 (i.e., "App. 1305, Ex. 2" and "App. 1305, Ex. 3") may reduce the chance that different apparatuses contending for the shared radio frequency spectrum band will synchronize with each other and collide in accessing the shared radio frequency spectrum band. The second and third examples shown in FIG. 13 may also reduce the time to access the shared radio frequency spectrum band—especially when q values are relatively large and N values are relatively small.

FIG. 14 shows a block diagram 1400 of an apparatus 1405 for use in wireless communication, in accordance with various aspects of the present disclosure. The apparatus 1405 may be an example of aspects of one or more of the base stations 105, 205, 205-a, or 505, or one or more aspects of the UEs 115, 215, 215-a, 215-b, or 215-c described with reference to FIG. 1, 2, or 5. The apparatus 1405 may also or alternatively be an example of aspects of one or more of the apparatuses 705, 805, 905, 1005, 1105, 1205, or 1305 described with reference to FIG. 7, 8, 9, 10, 11, 12, or 13. The apparatus 1405 may also be or include a processor. The apparatus 1405 may include a receiver component 1410, a wireless communication management component 1420, or a transmitter component 1430. Each of these components may be in communication with each other.

The components of the apparatus 1405 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), a System on Chip (SoC), or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver component 1410 may include at least one radio frequency (RF) receiver, such as at least one RF receiver operable to receive transmissions over a dedicated radio frequency spectrum band or a shared radio frequency spectrum band. The dedicated radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications). The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner). In some examples, the dedicated radio frequency spectrum band or the shared radio frequency spectrum band may be used for LTE/LTE-A communications, as described, for example, with reference to FIG. 1 or 2. The receiver component 1410 may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter component 1430 may include at least one RF transmitter, such as at least one RF transmitter operable to transmit over the dedicated radio frequency spectrum band or the shared radio frequency spectrum band. The transmitter component 1430 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication management component 1420 may be used to manage one or more aspects of wireless communication for the apparatus 1405. In some examples, the wireless communication management component 1420 may include a first RAT communications sensing component 1435 or a second RAT parameter configuration component 1440.

In some examples, the first RAT communications sensing component 1435 may be used to sense an indication of first RAT (e.g., Wi-Fi RAT) communications occupying a shared radio frequency spectrum band. The first RAT communications may or may not be a cause of interfere with transmissions to or from the apparatus 1405 or one or more other apparatuses.

In some examples, the second RAT parameter configuration component 1440 may be used to configure, in response to the sensing, at least one parameter of a second RAT (e.g., a cellular RAT) used by a device to contend for access to the shared radio frequency spectrum band. The device may be the apparatus 1405 or another apparatus. For example, when the apparatus 1405 is a base station, the device for which the at least one parameter of the second RAT is configured may be the apparatus 1405, a single UE, or a plurality of UEs (e.g., all of the UEs of a cell in which the apparatus 1405 operates). When the apparatus 1405 is a UE, the device for which the at least one parameter of the second RAT is configured may be the apparatus 1405.

FIG. 15 shows a block diagram 1500 of an apparatus 1505 for use in wireless communication, in accordance with various aspects of the present disclosure. The apparatus 1505 may be an example of aspects of one or more of the base stations 105, 205, 205-a, or 505, or one or more aspects of the UEs 115, 215, 215-a, 215-b, or 215-c described with reference to FIG. 1, 2, or 5. The apparatus 1505 may also or alternatively be an example of aspects of one or more of the apparatuses 705, 805, 905, 1005, 1105, 1205, 1305, or 1405 described with reference to FIG. 7, 8, 9, 10, 11, 12, 13, or 14. The apparatus 1505 may also be or include a processor. The apparatus 1505 may include a receiver component 1510, a wireless communication management component 1520, or a transmitter component 1530. Each of these components may be in communication with each other.

The components of the apparatus 1505 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver component 1510 may include at least one RF receiver, such as at least one RF receiver operable to receive transmissions over a dedicated radio frequency spectrum band or a shared radio frequency spectrum band. The dedicated radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications). The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner). In some examples, the dedicated radio frequency spectrum band or the shared radio frequency spectrum band may be used for LTE/LTE-A communications, as described, for example, with reference to FIG. 1 or 2. The receiver component 1510 may in some cases include separate receivers for the dedicated radio frequency spectrum band and the shared radio frequency spectrum band. The separate receivers may, in some examples, take the form of an LTE/LTE-A receiver component for communicating over the dedicated radio frequency spectrum band (e.g., LTE/LTE-A receiver component for dedicated RF spectrum band 1512), and an LTE/LTE-A receiver component for communicating over the shared radio frequency spectrum band (e.g., LTE/LTE-A receiver component for shared RF spectrum band 1514). The receiver component 1510, including the LTE/LTE-A receiver component for dedicated RF spectrum band 1512 or the LTE/LTE-A receiver component for shared RF spectrum band 1514, may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter component 1530 may include at least one RF transmitter, such as at least one RF transmitter operable to transmit over the dedicated radio frequency spectrum band or the shared radio frequency spectrum band. The transmitter component 1530 may in some cases include separate transmitters for the dedicated radio frequency spectrum band and the shared radio frequency spectrum band. The separate transmitters may, in some examples, take the form of an LTE/LTE-A transmitter component for communicating over the dedicated radio frequency spectrum band (e.g., LTE/LTE-A transmitter component for dedicated RF spectrum band 1532), and an LTE/LTE-A transmitter component for communicating over the shared radio frequency spectrum band (e.g., LTE/LTE-A transmitter component for shared RF spectrum band 1534). The transmitter component 1530, including the LTE/LTE-A transmitter component for dedicated RF spectrum band 1532 or the LTE/LTE-A transmitter component for shared RF spectrum band 1534, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the first radio frequency spectrum band or the second radio frequency spectrum band.

In some examples, the wireless communication management component 1520 may be used to manage one or more aspects of wireless communication for the apparatus 1505. In some examples, the wireless communication management component 1520 may include a first RAT communications sensing component 1535 or a second RAT parameter configuration component 1540.

In some examples, the first RAT communications sensing component 1535 may be used to sense an indication of first RAT (e.g., Wi-Fi RAT) communications occupying a shared radio frequency spectrum band. In some examples, the first RAT communications sensing component 1535 may include a transmitter detection component 1545, a transmission failure identification component 1550, an erasure rate identification component 1555, or an MCS variation detection component 1560. The transmitter detection component 1545 may be used to detect a number of transmitters (e.g., a number of Wi-Fi transmitters) within an energy detection range of a device (e.g., within range of the apparatus 1505 or one or more other apparatuses). The transmission failure identification component 1550 may be used to determine a failure rate of transmissions (e.g., subframes) for which feedback is reported (e.g., by the apparatus 1505 or by one or more other apparatuses). The erasure rate identification component 1555 may be used to determine an erasure rate for transmissions (e.g., subframes) for which an error is not reported (e.g., because of bursty interference blanking ACKs/NAKs transmitted by the apparatus 1505 or one or more other apparatuses). The MCS variation detection component 1560 may be used to detect a variance between 1) a supported modulation and coding scheme (MCS; e.g., an MCS based on a determined reference signal received power (RSRP)) for the apparatus 1505 or one or more other apparatuses, and 2) an MCS actually used by the apparatus 1505 or one or more other apparatuses (e.g., an MCS based on outer loop HARQ processing). In some examples, the first RAT communications sensing component 1535 may sense the indication of first RAT communications based at least in part on detections or determinations made by one or more of the transmitter detection component 1545, the transmission failure identification component 1550, the erasure rate identification component 1555, or the MCS variation detection component 1560.

In some examples, the second RAT parameter configuration component 1540 may be used to configure, in response to the sensing, at least one parameter of a second RAT (e.g., a cellular RAT) used by a device to contend for access to the shared radio frequency spectrum band. The device may be the apparatus 1505 or another apparatus. For example, when the apparatus 1505 is a base station, the device for which the at least one parameter of the second RAT is configured may be the apparatus 1505, a single UE, or a plurality of UEs (e.g., all of the UEs of a cell in which the apparatus 1505 operates). When the apparatus 1505 is a UE, the device for which the at least one parameter of the second RAT is configured may be the apparatus 1505.

In some examples, the second RAT parameter configuration component 1540 may include an ECCA configuration component 1565, a consecutive CCA slot configuration component 1570, a CCA energy detection threshold configuration component 1575, a CCA slot duration configuration component 1580, an ECCA number configuration component 1585, or a CCA/ECCA deferment period configuration component 1590.

In some examples, the ECCA configuration component 1565 may be used to configure an ECCA procedure for the device, and may include an ECCA range configuration component 1595. The ECCA range configuration component 1595 may be used, in some examples, to configure a range of numbers from which a random number may be selected. The random number may determine a number of CCA slots over which the device performs an ECCA procedure. In some examples, the range of numbers may be configured by at least one of: increasing a lower bound of the range of numbers, or increasing an upper bound of the range of numbers, or a combination thereof.

In some examples, the ECCA range configuration component 1595 may also or alternatively be used to configure a maximum number of CCA slots over which an extended CCA procedure is performed by linearly increasing the maximum number of CCA slots or linearly decreasing the maximum number of CCA slots. In some examples, the ECCA range configuration component 1595 may be used to configure a maximum number of CCA slots over which an ECCA procedure is performed by multiplicatively increasing the number of CCA slots or linearly decreasing the number of CCA slots. In some examples, the ECCA range configuration component 1595 may be used to configure a maximum number of CCA slots over which an ECCA procedure is performed by multiplicatively increasing the number of CCA slots or multiplicatively decreasing the number of CCA slots.

In some examples, the consecutive CCA slot configuration component 1570 may be used to identify a number of consecutive CCA slots for which the shared radio frequency spectrum band is available before the device wins contention for access to the shared radio frequency spectrum band. When the device has not won contention for access to the shared radio frequency spectrum band, the identified number of CCA slots may be a last number of CCA slots in which an ECCA procedure is performed. Alternatively, when the device has not won contention for access to the shared radio frequency spectrum band, the identified number of CCA slots may include at least one of: a last number of CCA slots in which an ECCA procedure is performed, or a number of CCA slots in which the ECCA procedure is performed in combination with at least one CCA slot following a last CCA slot in which the ECCA procedure is performed. When the device has won contention for access to the shared radio frequency spectrum band and is in an idle state with respect to the shared radio frequency spectrum band, the specified number of CCA slots may include CCA slots in which CCA procedures are to be performed.

In some examples, the CCA energy detection threshold configuration component 1575 may be used to configure a first CCA energy detection threshold (e.g., a default CCA energy detection threshold) or a second CCA energy detection threshold (e.g., a dynamic CCA energy detection threshold). The CCA energy detection threshold configuration component 1575 may configure the second CCA energy detection threshold for at least one CCA slot in which at least one CCA procedure is performed. Also or alternatively, the CCA energy detection threshold configuration component 1575 may be used to configure the device to sense an energy level of the shared radio frequency spectrum band following a period in which the shared radio frequency spectrum band is occupied, and to configure the second CCA energy detection threshold based at least in part on the sensed energy. The CCA energy detection threshold configuration component 1575 may also be used to configure the device to perform a number of CCA procedures based at least in part on the second CCA energy detection threshold, in a set of CCA slots, and to configure the device to win contention for access to the shared radio frequency spectrum band when the shared radio frequency spectrum band is determined to be available for a subset of CCA slots included in the set of CCA slots (e.g., a subset including one, a plurality of, or all of the CCA slots in the set of CCA slots). In some examples, the second number of CCA slots may be a number of consecutive CCA slots.

In some examples, the CCA slot duration configuration component 1580 may be used to increase a duration of a last CCA slot in which an ECCA procedure is performed. In some examples, the CCA slot duration configuration component 1580 may cause the CCA energy detection threshold configuration component 1575 to also configure the second CCA energy detection threshold for the last CCA slot in which the ECCA procedure is performed.

In some examples, the ECCA number configuration component 1585 may be used to configure the device to perform a plurality of ECCA procedures to contend for access to the shared radio frequency spectrum band. In some examples, the plurality of ECCA procedures may include a first ECCA procedure followed by a second ECCA procedure. In some examples, the first ECCA procedure may be configured to be performed over a first number of CCA slots and the second ECCA procedure may be configured to be performed over a second number of CCA slots. The second number may be less than the first number. In some examples, the ECCA number configuration component 1585 may cause the consecutive CCA slot configuration component 1570 to configure the device to identify a number of consecutive CCA slots for which the shared radio frequency spectrum band is available, during or after the second ECCA, before the device wins contention for access to the shared radio frequency spectrum band.

In some examples, the CCA/ECCA deferment period configuration component 1590 may be used to configure a deferment period for the device. The deferment period may cause the device to wait for the deferment period, upon determining the shared radio frequency spectrum band is unavailable, before performing an additional number of CCA procedures (which in some cases may include a number of ECCA procedures).

FIG. 16 shows a block diagram 1600 of an apparatus 1605 for use in wireless communication, in accordance with various aspects of the present disclosure. The apparatus 1605 may be an example of aspects of one or more of the base stations 105, 205, 205-a, or 505, or one or more aspects of the UEs 115, 215, 215-a, 215-b, or 215-c described with reference to FIG. 1, 2, or 5. The apparatus 1605 may also or alternatively be an example of aspects of one or more of the apparatuses 705, 805, 905, 1005, 1105, 1205, 1305, 1405, or 1505 described with reference to FIG. 7, 8, 9, 10, 11, 12, 13, 14, or 15. The apparatus 1605 may also be or include a processor. The apparatus 1605 may include a receiver component 1610, a wireless communication management component 1620, or a transmitter component 1630. Each of these components may be in communication with each other.

The components of the apparatus 1605 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver component 1610 may include at least one radio frequency (RF) receiver, such as at least one RF receiver operable to receive transmissions over a dedicated radio frequency spectrum band or a shared radio frequency spectrum band. The dedicated radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications). The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner). In some examples, the dedicated radio frequency spectrum band or the shared radio frequency spectrum band may be used for LTE/LTE-A communications, as described, for example, with reference to FIG. 1 or 2. The receiver component 1610 may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter component 1630 may include at least one RF transmitter, such as at least one RF transmitter operable to transmit over the dedicated radio frequency spectrum band or the shared radio frequency spectrum band. The transmitter component 1630 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication management component 1620 may be used to manage one or more aspects of wireless communication for the apparatus 1605. In some examples, the wireless communication management component 1620 may include an ECCA procedure configuration component 1635 or an ECCA procedure performance component 1640.

In some examples, the ECCA procedure configuration component 1635 may be used to configure an ECCA procedure. In some examples, configuring the ECCA procedure may include randomly selecting a number from a range of numbers extending between a lower bound and an upper bound. The number may determine how many CCA slots a shared radio frequency spectrum band must be determined "available," during the performance of an ECCA procedure, before an apparatus performing the ECCA procedure can win contention for access to the shared radio frequency spectrum band.

In some examples, the ECCA procedure performance component 1640 may be used to perform the configured ECCA procedure. Performing the ECCA procedure may include contending for access to a shared radio frequency spectrum band by performing the ECCA procedure over a plurality of CCA slots. The plurality of CCA slots may include a first number of CCA slots equal to the upper bound of the range of numbers. The ECCA procedure performance component 1640 may determine that contention for access to the shared radio frequency spectrum band has been won after determining, while the ECCA procedure is being performed, that the shared radio frequency spectrum band is available for a second number of CCA slots equal to the randomly selected number. In some examples, the ECCA procedure performance component 1640 may include a successful ECCA discontinuation component 1645. The successful ECCA discontinuation component 1645 may discontinue the ECCA procedure upon determining that contention for access to the shared radio frequency spectrum band has been won.

In some examples, each of the CCA slots over which the ECCA procedure is performed may include a preconfigured period of time for which the shared radio frequency spectrum band is available, or an entirety of a contiguous period for which the shared radio frequency spectrum band is unavailable. In other examples, each of the CCA slots over which the ECCA procedure is performed may include a preconfigured period of time.

FIG. 17 shows a block diagram 1700 of an apparatus 1705 for use in wireless communication, in accordance with various aspects of the present disclosure. The apparatus 1705 may be an example of aspects of one or more of the base stations 105, 205, 205-*a*, or 505, or one or more aspects of the UEs 115, 215, 215-*a*, 215-*b*, or 215-*c* described with reference to FIG. 1, 2, or 5. The apparatus 1705 may also or alternatively be an example of aspects of one or more of the apparatuses 705, 805, 905, 1005, 1105, 1205, 1305, 1405, 1505, or 1605 described with reference to FIG. 7, 8, 9, 10, 11, 12, 13, 14, 15, or 16. The apparatus 1705 may also be or include a processor. The apparatus 1705 may include a receiver component 1710, a wireless communication management component 1720, or a transmitter component 1730. Each of these components may be in communication with each other.

The components of the apparatus 1705 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver component 1710 may include at least one RF receiver, such as at least one RF receiver operable to receive transmissions over a dedicated radio frequency spectrum band or a shared radio frequency spectrum band. The dedicated radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications).

The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner). In some examples, the dedicated radio frequency spectrum band or the shared radio frequency spectrum band may be used for LTE/LTE-A communications, as described, for example, with reference to FIG. 1 or 2. The receiver component 1710 may in some cases include separate receivers for the dedicated radio frequency spectrum band and the shared radio frequency spectrum band. The separate receivers may, in some examples, take the form of an LTE/LTE-A receiver component for communicating over the dedicated radio frequency spectrum band (e.g., LTE/LTE-A receiver component for dedicated RF spectrum band 1712), and an LTE/LTE-A receiver component for communicating over the shared radio frequency spectrum band (e.g., LTE/LTE-A receiver component for shared RF spectrum band 1714). The receiver component 1710, including the LTE/LTE-A receiver component for dedicated RF spectrum band 1712 or the LTE/LTE-A receiver component for shared RF spectrum band 1714, may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter component 1730 may include at least one RF transmitter, such as at least one RF transmitter operable to transmit over the dedicated radio frequency spectrum band or the shared radio frequency spectrum band. The transmitter component 1730 may in some cases include separate transmitters for the dedicated radio frequency spectrum band and the shared radio frequency spectrum band. The separate transmitters may, in some examples, take the form of an LTE/LTE-A transmitter component for communicating over the dedicated radio frequency spectrum band (e.g., LTE/LTE-A transmitter component for dedicated RF spectrum band 1732), and an LTE/LTE-A transmitter component for communicating over the shared radio frequency spectrum band (e.g., LTE/LTE-A transmitter component for shared RF spectrum band 1734). The transmitter component 1730, including the LTE/LTE-A transmitter component for dedicated RF spectrum band 1732 or the LTE/LTE-A transmitter component for shared RF spectrum band 1734, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the first radio frequency spectrum band or the second radio frequency spectrum band.

In some examples, the wireless communication management component 1720 may be used to manage one or more aspects of wireless communication for the apparatus 1705. In some examples, the wireless communication management component 1720 may include an ECCA procedure configuration component 1735 or an ECCA procedure performance component 1740.

In some examples, the ECCA procedure configuration component 1735 may be used to configure an ECCA procedure. In some examples, configuring the ECCA procedure may include randomly selecting a number from a range of numbers extending between a lower bound and an upper bound. The number may determine how many CCA slots a shared radio frequency spectrum band must be determined "available," during the performance of an ECCA procedure, before an apparatus performing the ECCA procedure can win contention for access to the shared radio frequency spectrum band.

In some examples, the ECCA procedure performance component 1740 may be used to perform the configured ECCA procedure. Performing the ECCA procedure may include contending for access to a shared radio frequency spectrum band by performing the ECCA procedure over a plurality of CCA slots. The plurality of CCA slots may include a first number of CCA slots equal to the upper bound of the range of numbers. The ECCA procedure performance component 1740 may determine that contention for access to the shared radio frequency spectrum band has been won after determining, while the ECCA procedure is being performed, that the shared radio frequency spectrum band is available for a second number of CCA slots equal to the randomly selected number. The ECCA procedure performance component 1740 may also determine that contention for access to the shared radio frequency spectrum band has failed after determining, while the ECCA procedure is being performed, that the shared radio frequency spectrum band is unavailable for a third number of CCA slots equal to the first number of CCA slots, less the randomly selected number, plus one. In some examples, the ECCA procedure performance component 1740 may include a successful ECCA discontinuation component 1745 or an unsuccessful ECCA discontinuation component 1750. The successful ECCA discontinuation component 1745 may discontinue the ECCA procedure upon determining that contention for access to the shared radio frequency spectrum band has been won. The unsuccessful ECCA discontinuation component 1750 may discontinue the ECCA procedure upon determining that contention for access to the shared radio frequency spectrum band has failed.

In some examples, each of the CCA slots over which the ECCA procedure is performed may include a preconfigured period of time for which the shared radio frequency spectrum band is available, or an entirety of a contiguous period for which the shared radio frequency spectrum band is unavailable. In other examples, each of the CCA slots over which the ECCA procedure is performed may include a preconfigured period of time.

FIG. 18 shows a block diagram 1800 of a base station 1805 (e.g., a base station forming part or all of an eNB) for use in wireless communication, in accordance with various aspects of the present disclosure. In some examples, the base station 1805 may be an example of one or more aspects of the base station 105, 205, 205-a, or 505 described with reference to FIG. 1, 2, or 5, or aspects of one or more of the apparatuses 705, 805, 905, 1005, 1105, 1205, 1305, 1405, 1505, or 1605 described with reference to FIG. 7, 8, 9, 10, 11, 12, 13, 14, 15, 16, or 17. The base station 1805 may be configured to implement or facilitate at least some of the base station features and functions described with reference to FIG. 1, 2, 3, 4, 5, 6, 7, 8, 9, 10, 11, 12, 13, 14, 15, 16, or 17.

The base station 1805 may include a base station processor component 1810, a base station memory component 1820, at least one base station transceiver component (represented by base station transceiver component(s) 1850), at least one base station antenna (represented by base station antenna(s) 1855), or a base station wireless communication management component 1860. The base station 1805 may also include one or more of a base station communications component 1830 or a network communications component 1840. Each of these components may be in communication with each other, directly or indirectly, over one or more buses 1835.

The base station memory component 1820 may include random access memory (RAM) or read-only memory (ROM). The base station memory component 1820 may store computer-readable, computer-executable code 1825 containing instructions that are configured to, when executed, cause the base station processor component 1810 to perform various functions described herein related to sensing an indication of first RAT (e.g., a Wi-Fi RAT) communications; configuring, in response to the sensing, at least one parameter of a second RAT (e.g., a cellular RAT) used by a device (e.g., the base station 1805 or one or more UEs) to contend for access to a shared radio frequency spectrum band; or contending for access to the shared radio frequency spectrum band. Alternatively, the code 1825 may not be directly executable by the base station processor component 1810 but be configured to cause the base station 1805 (e.g., when compiled and executed) to perform various of the functions described herein.

The base station processor component 1810 may include an intelligent hardware device, e.g., a central processing unit (CPU), a microcontroller, an ASIC, etc. The base station processor component 1810 may process information received through the base station transceiver component(s) 1850, the base station communications component 1830, or the network communications component 1840. The base station processor component 1810 may also process information to be sent to the transceiver component(s) 1850 for transmission through the antenna(s) 1855, to the base station communications component 1830, for transmission to one or more other base stations 1805-*a* and 1805-*b*, or to the network communications component 1840 for transmission to a core network 1845, which may be an example of one or more aspects of the core network 130 described with reference to FIG. 1. The base station processor component 1810 may handle, alone or in connection with the base station wireless communication management component 1860, various aspects of communicating over (or managing communications over) a dedicated radio frequency spectrum band or the shared radio frequency spectrum band. The dedicated radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications). The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner).

The base station transceiver component(s) 1850 may include a modem configured to modulate packets and provide the modulated packets to the base station antenna(s) 1855 for transmission, and to demodulate packets received from the base station antenna(s) 1855. The base station transceiver component(s) 1850 may, in some examples, be implemented as one or more base station transmitter components and one or more separate base station receiver components. The base station transceiver component(s) 1850 may support communications in the dedicated radio frequency spectrum band or the shared radio frequency spectrum band. The base station transceiver component(s) 1850 may be configured to communicate bi-directionally, via the antenna(s) 1855, with one or more UEs or apparatuses, such as one or more of the UEs 115, 215, 215-*a*, 215-*b*, or 215-*c* described with reference to FIG. 1, 2, or 5. The base station 1805 may, for example, include multiple base station antennas 1855 (e.g., an antenna array). The base station 1805 may communicate with the core network 1845 through the network communications component 1840. The base station 1805 may also communicate with other base stations, such as the base stations 1805-*a* and 1805-*b*, using the base station communications component 1830.

The base station wireless communication management component 1860 may be configured to perform or control some or all of the features or functions described with reference to FIG. 1, 2, 3, 4, 5, 6, 7, 8, 9, 10, 11, 12, 13, 14, 15, 16, 17, or 18 related to wireless communication over the dedicated radio frequency spectrum band or the shared radio frequency spectrum band. For example, the base station wireless communication management component 1860 may be configured to support a supplemental downlink mode (e.g., a licensed assisted access mode), a carrier aggregation mode, or a standalone mode using the dedicated radio frequency spectrum band or the shared radio frequency spectrum band. The base station wireless communication management component 1860 may include a base station LTE/LTE-A component for dedicated RF spectrum band 1865 configured to handle LTE/LTE-A communications in the dedicated radio frequency spectrum band, and a base station LTE/LTE-A component for shared RF spectrum band 1870 configured to handle LTE/LTE-A communications in the shared radio frequency spectrum band. The base station wireless communication management component 1860, or portions of it, may include a processor, or some or all of the functions of the base station wireless communication management component 1860 may be performed by the base station processor component 1810 or in connection with the base station processor component 1810. In some examples, the base station wireless communication management component 1860 may be an example of the wireless communication management component 1420, 1520, 1620, or 1720 described with reference to FIG. 14, 15, 16, or 17.

FIG. 19 shows a block diagram 1900 of a UE 1915 for use in wireless communication, in accordance with various aspects of the present disclosure. The UE 1915 may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 1915 may, in some examples, have an internal power supply (not shown), such as a small battery, to facilitate mobile operation. In some examples, the UE 1915 may be an example of aspects of one or more of the UEs 115, 215, 215-*a*, 215-*b*, or 215-*c* described with reference to FIG. 1 or 2, or aspects of one or more of the apparatuses 705, 805, 905, 1005, 1105, 1205, 1305, 1405, 1505, 1605, or 1705 described with reference to FIG. 7, 8, 9, 10, 11, 12, 13, 14, 15, 16, or 17. The UE 1915 may be configured to implement at least some of the UE or apparatus features and functions described with reference to FIG. 1, 2, 3, 4, 5, 6, 7, 8, 9, 10, 11, 12, 13, 14, 15, 16, or 17.

The UE 1915 may include a UE processor component 1910, a UE memory component 1920, at least one UE transceiver component (represented by UE transceiver component(s) 1930), at least one UE antenna (represented by UE antenna(s) 1940), or a UE wireless communication management component 1960. Each of these components may be in communication with each other, directly or indirectly, over one or more buses 1935.

The UE memory component 1920 may include RAM or ROM. The UE memory component 1920 may store computer-readable, computer-executable code 1925 containing instructions that are configured to, when executed, cause the UE processor component 1910 to perform various functions described herein related to sensing an indication of first RAT (e.g., a Wi-Fi RAT) communications; configuring, in response to the sensing, at least one parameter of a second RAT (e.g., a cellular RAT) used by a device (e.g., the UE 1915) to contend for access to a shared radio frequency spectrum band; or contending for access to the shared radio frequency spectrum band.

The UE processor component 1910 may include an intelligent hardware device, e.g., a CPU, a microcontroller, an ASIC, etc. The UE processor component 1910 may process information received through the UE transceiver component(s) 1930 or information to be sent to the UE transceiver component(s) 1930 for transmission through the UE antenna(s) 1940. The UE processor component 1910 may handle, alone or in connection with the UE wireless communication management component 1960, various aspects of communicating over (or managing communications over) a dedicated radio frequency spectrum band or the shared radio frequency spectrum band. The dedicated radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications). The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner).

The UE transceiver component(s) 1930 may include a modem configured to modulate packets and provide the modulated packets to the UE antenna(s) 1940 for transmission, and to demodulate packets received from the UE antenna(s) 1940. The UE transceiver component(s) 1930 may, in some examples, be implemented as one or more UE transmitter components and one or more separate UE receiver components. The UE transceiver component(s) 1930 may support communications in the licensed radio frequency spectrum band or the unlicensed radio frequency spectrum band. The UE transceiver component(s) 1930 may be configured to communicate bi-directionally, via the UE antenna(s) 1940, with one or more of the base stations 105, 205, 205-*a*, 505, or 1805 described with reference to FIG. 1, 2, 5, or 18. While the UE 1915 may include a single UE antenna, there may be examples in which the UE 1915 may include multiple UE antennas 1940.

The UE state component 1950 may be used, for example, to manage transitions of the UE 1915 between an RRC idle state and an RRC connected state, and may be in communication with other components of the UE 1915, directly or indirectly, over the one or more buses 1935. The UE state component 1950, or portions of it, may include a processor, or some or all of the functions of the UE state component 1950 may be performed by the UE processor component 1910 or in connection with the UE processor component 1910.

The UE wireless communication management component 1960 may be configured to perform or control some or all of the UE or apparatus features or functions described with reference to FIG. 1, 2, 3, 4, 5, 6, 7, 8, 9, 10, 11, 12, 13, 14, 15, 16, or 17 related to wireless communication over the dedicated radio frequency spectrum band or the shared radio frequency spectrum band. For example, the UE wireless communication management component 1960 may be configured to support a supplemental downlink mode (e.g., a licensed assisted access mode), a carrier aggregation mode, or a standalone mode using the dedicated radio frequency spectrum band or the shared radio frequency spectrum band. The UE wireless communication management component 1960 may include a UE LTE/LTE-A component for dedicated RF spectrum band 1965 configured to handle LTE/LTE-A communications in the dedicated radio frequency spectrum band, and a UE LTE/LTE-A component for shared RF spectrum band 1970 configured to handle LTE/LTE-A communications in the shared radio frequency spectrum band. The UE wireless communication management component 1960, or portions of it, may include a processor, or some or all of the functions of the UE wireless communication management component 1960 may be performed by the UE processor component 1910 or in connection with the UE processor component 1910. In some examples, the UE wireless communication management component 1960 may be an example of the wireless communication management component 1420, 1520, 1620, or 1720 described with reference to FIG. 14, 15, 16, or 17.

FIG. 20 is a flow chart illustrating an exemplary method 2000 for wireless communication, in accordance with various aspects of the present disclosure. For clarity, the method 2000 is described below with reference to aspects of one or more of the base stations 105, 205, 205-*a*, 505, or 1805 described with reference to FIG. 1, 2, 5, or 18, aspects of one or more of the UEs 115, 215, 215-*a*, 215-*b*, 215-*c*, or 1915 described with reference to FIG. 1, 2, or 19, or aspects of one or more of the apparatuses 705, 805, 905, 1005, 1105, 1205, 1305, 1405, 1505, 1605, or 1705 described with reference to FIG. 7, 8, 9, 10, 11, 12, 13, 14, 15, 16, or 17. In some examples, a base station, UE, or apparatus may execute one or more sets of codes to control the functional elements of the base station, UE, or apparatus to perform the functions described below. Additionally or alternatively, the base station, UE, or apparatus may perform one or more of the functions described below using special-purpose hardware.

At block 2005, the method 2000 may include sensing an indication of first RAT (e.g., a Wi-Fi RAT) communications occupying a shared radio frequency spectrum band. The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner). The operation(s) at block 2005 may be performed using the wireless communication management component 1420, 1520, 1620, 1720, 1860, or 1960 described with reference to FIG. 14, 15, 16, 17, 18, or 19, or the first RAT communications sensing component 1435 or 1535 described with reference to FIG. 14 or 15.

At block 2010, the method 2000 may include configuring, in response to the sensing performed at block 2005, at least one parameter of a second RAT (e.g., a cellular RAT) used by a device to contend for access to the shared radio frequency spectrum band. The operation(s) at block 2010 may be performed using the wireless communication management component 1420, 1520, 1620, 1720, 1860, or 1960 described with reference to FIG. 14, 15, 16, 17, 18, or 19, or the second RAT parameter configuration component 1440 or 1540 described with reference to FIG. 14 or 15.

At block 2015, and as part of (e.g., as an example of), or in combination with, the operation(s) performed at block 2010, the method 2000 may optionally include configuring at least one LBT parameter used by a device (e.g., a parameter of a CCA procedure or ECCA procedure used by a base station or one or more UEs).

In some examples, the method 2000 may be performed by a base station or a UE. When the method 2000 is performed by a base station, the device for which the at least one parameter of the second RAT is configured may be the base station, a single UE, or a plurality of UEs (e.g., all of the UEs of a cell in which the base station operates). When the method 2000 is performed by a UE, the device for which the at least one parameter of the second RAT is configured may be the UE.

Thus, the method 2000 may provide for wireless communication. It should be noted that the method 2000 is just one implementation and that the operations of the method 2000 may be rearranged or otherwise modified such that other implementations are possible.

FIG. 21 is a flow chart illustrating an exemplary method 2100 for wireless communication, in accordance with various aspects of the present disclosure. For clarity, the method 2100 is described below with reference to aspects of one or more of the base stations 105, 205, 205-*a*, 505, or 1805 described with reference to FIG. 1, 2, 5, or 18, aspects of one or more of the UEs 115, 215, 215-*a*, 215-*b*, 215-*c*, or 1915 described with reference to FIG. 1, 2, or 19, or aspects of one or more of the apparatuses 705, 805, 905, 1005, 1105, 1205, 1305, 1405, 1505, 1605, or 1705 described with reference to FIG. 7, 8, 9, 10, 11, 12, 13, 14, 15, 16, or 17. In some examples, a base station, UE, or apparatus may execute one or more sets of codes to control the functional elements of the base station, UE, or apparatus to perform the functions described below. Additionally or alternatively, the base station, UE, or apparatus may perform one or more of the functions described below using special-purpose hardware.

At block 2105, the method 2100 may include detecting a number of transmitters (e.g., a number of Wi-Fi transmitters) within an energy detection range of a device (e.g., within range of a base station, UE, or other apparatus). The operation(s) at block 2105 may be performed using the wireless communication management component 1420, 1520, 1620, 1720, 1860, or 1960 described with reference to FIG. 14, 15, 16, 17, 18, or 19, the first RAT communications sensing component 1435 or 1535 described with reference to FIG. 14 or 15, or the transmitter detection component 1545 described with reference to FIG. 15.

At block 2110, the method 2100 may include determining a failure rate of transmissions (e.g., subframes) for which feedback is reported (e.g., to a base station or other apparatus). The operation(s) at block 2105 may be performed using the wireless communication management component 1420, 1520, 1620, 1720, 1860, or 1960 described with reference to FIG. 14, 15, 16, 17, 18, or 19, the first RAT communications sensing component 1435 or 1535 described with reference to FIG. 14 or 15, or the transmission failure identification component 1550 described with reference to FIG. 15.

At block 2115, the method 2100 may include determining an erasure rate for transmissions (e.g., subframes) for which an error is not reported (e.g., to a base station or other apparatus, because of bursty interference blanking ACKs/NAKs). The operation(s) at block 2105 may be performed using the wireless communication management component 1420, 1520, 1620, 1720, 1860, or 1960 described with reference to FIG. 14, 15, 16, 17, 18, or 19, the first RAT communications sensing component 1435 or 1535 described with reference to FIG. 14 or 15, or the erasure rate identification component 1555 described with reference to FIG. 15.

At block 2120, the method 2100 may include detecting a variance between 1) a supported modulation and coding scheme (e.g., an MCS based on a determined RSRP) and 2) an MCS actually used (e.g., an MCS based on outer loop HARQ processing). The operation(s) at block 2105 may be performed using the wireless communication management component 1420, 1520, 1620, 1720, 1860, or 1960 described with reference to FIG. 14, 15, 16, 17, 18, or 19, the first RAT communications sensing component 1435 or 1535 described with reference to FIG. 14 or 15, or the MCS variation detection component 1560 described with reference to FIG. 15.

At block 2125, the method 2100 may include sensing an indication of first RAT (e.g., a Wi-Fi RAT) communications occupying a shared radio frequency spectrum band, based at least in part on one or more of the detections or determinations made in block 2105, 2110, 2115, or 2120 (or on one or more additional or alternative factors). The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner). The operation(s) at block 2125 may be performed using the wireless communication management component 1420, 1520, 1620, 1720, 1860, or 1960 described with reference to FIG. 14, 15, 16, 17, 18, or 19, or the first RAT communications sensing component 1435 or 1535 described with reference to FIG. 14 or 15.

At block 2130, the method 2100 may include configuring, in response to the sensing performed at block 2125, at least one parameter of a second RAT (e.g., a cellular RAT) used by a device to contend for access to the shared radio frequency spectrum band. The operation(s) at block 2130 may be performed using the wireless communication management component 1420, 1520, 1620, 1720, 1860, or 1960 described with reference to FIG. 14, 15, 16, 17, 18, or 19, or the second RAT parameter configuration component 1440 or 1540 described with reference to FIG. 14 or 15.

Blocks 2135, 2140, 2145, 2150, 2155, and 2160 illustrate various optional configuration operations that may be performed as part of (e.g., examples of), or in combination with, the operation(s) performed at block 2130.

At block 2135, the method 2100 may include configuring an ECCA procedure for a device (e.g., a base station or one or more UEs). In some examples, the operation(s) at block may include configuring a range of numbers from which a random number is selected. The random number may determine a number of CCA slots over which a device performs an ECCA procedure. In some examples, the range of numbers may be configured by at least one of: increasing a lower bound of the range of numbers, or increasing an upper bound of the range of numbers, or a combination thereof. In some examples, the operation(s) at block 2135 may also or alternatively include configuring a maximum number of CCA slots over which an ECCA procedure is performed. In some examples, the maximum number of CCA slots may be configured, for example, by linearly increasing the maximum number of CCA slots or linearly decreasing the maximum number of CCA slots. In some examples, the maximum number of CCA slots may be configured by multiplicatively increasing the number of CCA slots or linearly decreasing the number of CCA slots. In some examples, the maximum number of CCA slots may be configured by multiplicatively increasing the number of CCA slots or multiplicatively decreasing the number of CCA slots. The operation(s) at block 2135 may be performed using the wireless communication management component 1420, 1520, 1620, 1720, 1860, or 1960 described with reference to FIG. 14, 15, 16, 17, 18, or 19, the second RAT parameter configuration component 1440 or 1540 described with reference to FIG. 14 or 15, or the ECCA configuration component 1565 or ECCA range configuration component 1595 described with reference to FIG. 15.

At block 2140, the method 2100 may include identifying a number of consecutive CCA slots for which the shared radio frequency spectrum band is available before a device wins contention for access to the shared radio frequency spectrum band. When a device has not won contention for access to the shared radio frequency spectrum band, the identified number of CCA slots may be a last number of CCA slots in which an ECCA procedure is performed. Alternatively, when the device has not won contention for access to the shared radio frequency spectrum band, the identified number of CCA slots may include at least one of: a last number of CCA slots in which an ECCA procedure is performed, or a number of CCA slots in which the ECCA procedure is performed in combination with at least one CCA slot following a last CCA slot in which the ECCA procedure is performed. When the device has won contention for access to the shared radio frequency spectrum band and is in an idle state with respect to the shared radio frequency spectrum band, the specified number of CCA slots may include CCA slots in which CCA procedures are to be performed. The operation(s) at block 2140 may be performed using the wireless communication management component 1420, 1520, 1620, 1720, 1860, or 1960 described with reference to FIG. 14, 15, 16, 17, 18, or 19, the second RAT parameter configuration component 1440 or 1540 described with reference to FIG. 14 or 15, or the consecutive CCA slot configuration component 1570 described with reference to FIG. 15.

At block 2145, the method 2100 may include configuring a CCA energy detection threshold for at least one CCA slot in which at least one CCA procedure is performed. Also or alternatively, the operation(s) performed at block 2145 may include configuring the device to sense an energy level of the shared radio frequency spectrum band following a period in which the shared radio frequency spectrum band is occupied, and configuring a CCA energy detection threshold based at least in part on the sensed energy. The operation(s) may also include configuring the device to perform a number of CCA procedures based at least in part on the CCA energy detection threshold, in a set of CCA slots, and configuring the device to win contention for access to the shared radio frequency spectrum band when the shared radio frequency spectrum band is determined to be available for a subset of CCA slots included in the set of CCA slots (e.g., a subset including one, a plurality of, or all of the CCA slots in the set of CCA slots). In some examples, the second number of CCA slots may be a number of consecutive CCA slots. The operation(s) at block 2145 may be performed using the wireless communication management component 1420, 1520, 1620, 1720, 1860, or 1960 described with reference to FIG. 14, 15, 16, 17, 18, or 19, the second RAT parameter configuration component 1440 or 1540 described with reference to FIG. 14 or 15, or the CCA energy detection threshold configuration component 1575 described with reference to FIG. 15.

At block 2150, the method 2100 may include increasing a duration of a last CCA slot in which an ECCA procedure is performed. In some examples, the operation(s) at block 2150 may also include configuring a CCA energy detection threshold for the last CCA slot. The operation(s) at block 2150 may be performed using the wireless communication management component 1420, 1520, 1620, 1720, 1860, or 1960 described with reference to FIG. 14, 15, 16, 17, 18, or 19, the second RAT parameter configuration component 1440 or 1540 described with reference to FIG. 14 or 15, or the CCA slot duration configuration component 1580 described with reference to FIG. 15.

At block 2155, the method 2100 may include configuring the device to perform a plurality of ECCA procedures to contend for access to the shared radio frequency spectrum band. In some examples, the plurality of ECCA procedures may include a first ECCA procedure followed by a second ECCA procedure. In some examples, the first ECCA procedure may be configured to be performed over a first number of CCA slots and the second ECCA procedure may be configured to be performed over a second number of CCA slots. The second number may be less than the first number. In some examples, the operation(s) at block 2155 may also include configuring the device to identify a number of consecutive CCA slots for which the shared radio frequency spectrum band is available, during or after the second ECCA, before the device wins contention for access to the shared radio frequency spectrum band. The operation(s) at block 2155 may be performed using the wireless communication management component 1420, 1520, 1620, 1720, 1860, or 1960 described with reference to FIG. 14, 15, 16, 17, 18, or 19, the second RAT parameter configuration component 1440 or 1540 described with reference to FIG. 14 or 15, or the ECCA number configuration component 1585 described with reference to FIG. 15.

At block 2160, the method 2100 may include configuring a deferment period for a device. The deferment period may cause the device to wait for the deferment period, upon determining the shared radio frequency spectrum band is unavailable, before performing an additional number of CCA procedures (which in some cases may include a number of ECCA procedures). The operation(s) at block 2160 may be performed using the wireless communication management component 1420, 1520, 1620, 1720, 1860, or 1960 described with reference to FIG. 14, 15, 16, 17, 18, or 19, the second RAT parameter configuration component 1440 or 1540 described with reference to FIG. 14 or 15, or the CCA/ECCA deferment period configuration component 1590 described with reference to FIG. 15.

In some examples, the method 2100 may be performed by a base station or a UE. When the method 2100 is performed by a base station, the device for which the at least one parameter of the second RAT is configured may be the base station, a single UE, or a plurality of UEs (e.g., all of the UEs of a cell in which the base station operates). When the method 2100 is performed by a UE, the device for which the at least one parameter of the second RAT is configured may be the UE.

Thus, the method 2100 may provide for wireless communication. It should be noted that the method 2100 is just one implementation and that the operations of the method 2100 may be rearranged or otherwise modified such that other implementations are possible.

In some examples, aspects of the methods 2000 and 2100 described with reference to FIGS. 20 and 21 may be combined.

FIG. 22 is a flow chart illustrating an exemplary method 2200 for wireless communication, in accordance with various aspects of the present disclosure. For clarity, the method 2200 is described below with reference to aspects of one or more of the base stations 105, 205, 205-a, 505, or 1805 described with reference to FIG. 1, 2, 5, or 18, aspects of one or more of the UEs 115, 215, 215-a, 215-b, 215-c, or 1915 described with reference to FIG. 1, 2, or 19, or aspects of one or more of the apparatuses 705, 805, 905, 1005, 1105, 1205, 1305, 1405, 1505, 1605, or 1705 described with reference to FIG. 7, 8, 9, 10, 11, 12, 13, 14, 15, 16, or 17. In some examples, a base station, UE, or apparatus may execute one or more sets of codes to control the functional elements of the base station, UE, or apparatus to perform the functions described below. Additionally or alternatively, the base station, UE, or apparatus may perform one or more of the functions described below using special-purpose hardware.

In some examples, the method 2200 may include configuring an ECCA procedure. For examples, at block 2205, the method 2200 may include randomly selecting a number from a range of numbers extending between a lower bound and an upper bound. The number may determine how many CCA slots a shared radio frequency spectrum band must be determined "available," during the performance of an ECCA procedure, before an apparatus performing the ECCA procedure can win contention for access to the shared radio frequency spectrum band. The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner). The operation(s) at block 2205 may be performed using the wireless communication management component 1420, 1520, 1620, 1720, 1860, or 1960 described with reference to FIG. 14, 15, 16, 17, 18, or 19, or the ECCA procedure configuration component 1635 or 1735 described with reference to FIG. 16 or 17.

At block 2210, the method 2200 may include contending for access to a shared radio frequency spectrum band by performing an ECCA procedure over a plurality of CCA slots. The plurality of CCA slots may include a first number of CCA slots equal to the upper bound. The operation(s) at block 2210 may be performed using the wireless communication management component 1420, 1520, 1620, 1720, 1860, or 1960 described with reference to FIG. 14, 15, 16, 17, 18, or 19, or the ECCA procedure performance component 1640 or 1740 described with reference to FIG. 16 or 17.

At block 2215, the method 2200 may include winning contention for access to the shared radio frequency spectrum band after determining, while performing the ECCA procedure, that the shared radio frequency spectrum band is available for a second number of CCA slots equal to the randomly selected number. The operation(s) at block 2215 may be performed using the wireless communication management component 1420, 1520, 1620, 1720, 1860, or 1960 described with reference to FIG. 14, 15, 16, 17, 18, or 19, or the ECCA procedure performance component 1640 or 1740 described with reference to FIG. 16 or 17.

At block 2220, the method 2200 may optionally include discontinuing the extended CCA procedure upon winning contention for access to the shared radio frequency spectrum band. The operation(s) at block 2215 may be performed using the wireless communication management component 1420, 1520, 1620, 1720, 1860, or 1960 described with reference to FIG. 14, 15, 16, 17, 18, or 19, or the ECCA procedure performance component 1640 or 1740 or successful ECCA discontinuation component 1645 or 1745 described with reference to FIG. 16 or 17.

In some examples, each of the CCA slots over which the ECCA procedure is performed may include a preconfigured period of time for which the shared radio frequency spectrum band is available, or an entirety of a contiguous period for which the shared radio frequency spectrum band is unavailable. In other examples, each of the CCA slots over which the ECCA procedure is performed may include a preconfigured period of time.

Thus, the method 2200 may provide for wireless communication. It should be noted that the method 2200 is just one implementation and that the operations of the method 2200 may be rearranged or otherwise modified such that other implementations are possible.

FIG. 23 is a flow chart illustrating an exemplary method 2300 for wireless communication, in accordance with various aspects of the present disclosure. For clarity, the method 2300 is described below with reference to aspects of one or more of the base stations 105, 205, 205-a, 505, or 1805 described with reference to FIG. 1, 2, 5, or 18, aspects of one or more of the UEs 115, 215, 215-a, 215-b, 215-c, or 1915 described with reference to FIG. 1, 2, or 19, or aspects of one or more of the apparatuses 705, 805, 905, 1005, 1105, 1205, 1305, 1405, 1505, 1605, or 1705 described with reference to FIG. 7, 8, 9, 10, 11, 12, 13, 14, 15, 16, or 17. In some examples, a base station, UE, or apparatus may execute one or more sets of codes to control the functional elements of the base station, UE, or apparatus to perform the functions described below. Additionally or alternatively, the base station, UE, or apparatus may perform one or more of the functions described below using special-purpose hardware.

In some examples, the method 2300 may include configuring an ECCA procedure. For examples, at block 2305, the method 2300 may include randomly selecting a number from a range of numbers extending between a lower bound and an upper bound. The number may determine how many CCA slots a shared radio frequency spectrum band must be determined "available," during the performance of an ECCA procedure, before an apparatus performing the ECCA procedure can win contention for access to the shared radio frequency spectrum band. The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner). The operation(s) at block 2305 may be performed using the wireless communication management component 1420, 1520, 1620, 1720, 1860, or 1960 described with reference to FIG. 14, 15, 16, 17, 18, or 19, or the ECCA procedure configuration component 1635 or 1735 described with reference to FIG. 16 or 17.

At block 2310, the method 2300 may include contending for access to a shared radio frequency spectrum band by performing an ECCA procedure over a first CCA slot or a next CCA slot of a plurality of CCA slots. The plurality of CCA slots may include a first number of CCA slots equal to the upper bound. The operation(s) at block 2310 may be performed using the wireless communication management component 1420, 1520, 1620, 1720, 1860, or 1960 described with reference to FIG. 14, 15, 16, 17, 18, or 19, or the ECCA procedure performance component 1640 or 1740 described with reference to FIG. 16 or 17.

At block 2315, and while performing the ECCA procedure, the method 2300 may include determining whether the shared radio frequency spectrum band is available for a second number of CCA slots equal to the randomly selected number. When the shared radio frequency spectrum band is available for the second number of CCA slots, the method 2300 may continue at block 2320. When the shared radio frequency spectrum band is not available for the second number of CCA slots, the method 2300 may continue at block 2325. The operation(s) at block 2315 may be performed using the wireless communication management component 1420, 1520, 1620, 1720, 1860, or 1960 described with reference to FIG. 14, 15, 16, 17, 18, or 19, or the ECCA procedure performance component 1640 or 1740 described with reference to FIG. 16 or 17.

At block 2320, the method 2300 may include discontinuing the ECCA procedure and winning contention for access to the shared radio frequency spectrum. The operation(s) at block 2320 may be performed using the wireless communication management component 1420, 1520, 1620, 1720, 1860, or 1960 described with reference to FIG. 14, 15, 16, 17, 18, or 19, or the ECCA procedure performance component 1640 or 1740 or successful ECCA discontinuation component 1645 or 1745 described with reference to FIG. 16 or 17.

At block 2325, and while performing the ECCA procedure, the method 2300 may include determining whether the shared radio frequency spectrum band is unavailable for a third number of CCA slots equal to the first number of CCA slots, less the randomly selected number, plus one. When the shared radio frequency spectrum band is unavailable for the third number of CCA slots, the method 2300 may continue at block 2330. When the shared radio frequency spectrum band is not unavailable for the third number of CCA slots, the method 2300 may continue at block 2335. The operation(s) at block 2325 may be performed using the wireless communication management component 1420, 1520, 1620, 1720, 1860, or 1960 described with reference to FIG. 14, 15, 16, 17, 18, or 19, or the ECCA procedure performance component 1640 or 1740 described with reference to FIG. 16 or 17.

At block 2330, the method 2300 may include discontinuing the ECCA procedure and failing to win contention for access to the shared radio frequency spectrum. The operation(s) at block 2330 may be performed using the wireless communication management component 1420, 1520, 1620, 1720, 1860, or 1960 described with reference to FIG. 14, 15, 16, 17, 18, or 19, the ECCA procedure performance component 1640 or 1740 described with reference to FIG. 16 or 17, or the unsuccessful ECCA discontinuation component 1750 described with reference to FIG. 17.

At block 2335, the method 2300 may include determining whether the ECCA procedure has been performed over each of the plurality of slots. When the ECCA procedure has been performed over each of the plurality of slots, the method 2300 may continue at block 2330. When the ECCA procedure has not been performed over each of the plurality of slots, the method 2300 may continue at block 2310. The operation(s) at block 2335 may be performed using the wireless communication management component 1420, 1520, 1620, 1720, 1860, or 1960 described with reference to FIG. 14, 15, 16, 17, 18, or 19, or the ECCA procedure performance component 1640 or 1740 described with reference to FIG. 16 or 17.

In some examples, each of the CCA slots over which the ECCA procedure is performed may include a preconfigured period of time for which the shared radio frequency spectrum band is available, or an entirety of a contiguous period for which the shared radio frequency spectrum band is unavailable. In other examples, each of the CCA slots over which the ECCA procedure is performed may include a preconfigured period of time.

Thus, the method 2300 may provide for wireless communication. It should be noted that the method 2300 is just one implementation and that the operations of the method 2300 may be rearranged or otherwise modified such that other implementations are possible.

In some examples, aspects of the methods 2200 and 2300 described with reference to FIGS. 22 and 23 may be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can include RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
    determining, by a first device associated with a first radio access technology (RAT), that a shared radio frequency spectrum is shared with a second device of a second RAT;
    determining, based at least in part on the determination that the shared radio frequency spectrum is shared, an energy detection threshold for a clear channel assessment (CCA);
    identifying a number of CCA slots for which the shared radio frequency spectrum is available before the first device accesses the shared radio frequency spectrum; and
    performing the CCA using the determined energy detection threshold and the identified number of CCA slots.

2. The method of claim 1, wherein determining the energy detection threshold comprises:
    determining the energy detection threshold to be a first energy detection threshold based at least in part on determining that the shared radio frequency spectrum is shared with the second device of the second RAT, and wherein the first energy detection threshold is higher than a second energy detection threshold, the second energy detection threshold based at least in part on the shared radio frequency spectrum being available.

3. The method of claim 1, wherein the first RAT comprises a cellular RAT and the second RAT comprises a Wi-Fi RAT.

4. The method of claim 1, wherein the CCA is performed using the determined energy detection threshold to detect transmissions associated with the first RAT and the second RAT.

5. The method of claim 1, wherein the identified number of CCA slots is a last number of the CCA slots in which the CCA is performed when the first device has not accessed the shared radio frequency spectrum.

6. The method of claim 1, wherein determining the energy detection threshold:
    determining the energy detection threshold for at least one CCA slot.

7. The method of claim 6, further comprising:
performing a number of CCAs based at least in part on the determined energy detection threshold, wherein the number of CCAs are performed in a set of CCA slots.

8. The method of claim 1, further comprising:
configuring the first device to determine the energy level of the shared radio frequency spectrum following a period in which the shared radio frequency spectrum is shared.

9. The method of claim 1, further comprising:
configuring a range of numbers from which a random number is selected, wherein the random number determines a number of CCA slots over which the first device performs at least one of a plurality of extended CCAs.

10. The method of claim 9, wherein configuring the range of numbers comprises at least one of:
increasing a lower bound of the range of numbers, or increasing an upper bound of the range of numbers, or a combination thereof.

11. The method of claim 10, further comprising:
increasing a duration of a last CCA slot of the random number of CCA slots in which the at least one of the plurality of extended CCAs is performed.

12. The method of claim 11, wherein the plurality of extended CCAs comprises a first extended CCA followed by a second extended CCA.

13. The method of claim 12, wherein the first extended CCA is configured to be performed over a first number of CCA slots and the second extended CCA is configured to be performed over a second number of CCA slots.

14. The method of claim 1, further comprising:
configuring a deferment period for the first device to wait, upon determining that the shared radio frequency spectrum is shared, before performing an additional number of CCAs; and
configuring the first device to win contention for access to the shared radio frequency spectrum upon determining the shared radio frequency spectrum is available for each of the additional number of CCAs.

15. The method of claim 1, wherein:
determining that the shared radio frequency spectrum is shared is based at least in part on a number of transmitters detected within an energy detection range of the first device.

16. The method of claim 1, wherein:
determining that the shared radio frequency spectrum is shared is based at least in part on a failure rate of transmissions for which feedback is reported.

17. The method of claim 1, wherein:
determining that the shared radio frequency spectrum is shared is based at least in part on an erasure rate for transmissions for which an error is not reported.

18. The method of claim 1, wherein:
determining that the shared radio frequency spectrum is shared is based at least in part on a variance between a supported modulation and coding scheme (MCS) and an MCS actually used.

19. The method of claim 1, wherein the first device comprises one of a base station or a user equipment (UE), and wherein the respective one of the base station or the UE determines the energy detection threshold and performs the CCA.

20. An apparatus for wireless communication, comprising:
a processor,
memory coupled to the processor; and
instructions stored in the memory and executable by the processor to cause the apparatus to:
determine, by a first device associated with a first radio access technology (RAT), that a shared radio frequency spectrum is shared with a second device of a second RAT;
determine, based at least in part on the determination that the shared radio frequency spectrum is shared, an energy detection threshold for a clear channel assessment (CCA);
identify a number of CCA slots for which the shared radio frequency spectrum is available before the first device accesses the shared radio frequency spectrum; and
perform the CCA using the determined energy detection threshold and the identified number of CCA slots.

21. The apparatus of claim 20, wherein the instructions to determine the energy detection threshold are executable by the processor to cause the apparatus to:
determine the energy detection threshold to be a first energy detection threshold based at least in part on determining that the shared radio frequency spectrum is shared with the second device of the second RAT, and wherein the first energy detection threshold is higher than a second energy detection threshold, the second energy detection threshold based at least in part on the shared radio frequency spectrum being available.

22. The apparatus of claim 20, wherein the first RAT comprises a cellular RAT and the second RAT comprises a Wi-Fi RAT.

23. The apparatus of claim 20, wherein the identified number of CCA slots is a last number of the CCA slots in which the CCA is performed when the first device has not accessed the shared radio frequency spectrum.

24. The apparatus of claim 20, wherein determining the energy detection threshold determining the energy detection threshold for at least one CCA slot.

25. The apparatus of claim 20, wherein the instructions are further executable by the processor to cause the apparatus to:
configure the first device to determine the energy level of the shared radio frequency spectrum following a period in which the shared radio frequency spectrum is shared; and
perform a number of CCAs based at least in part on the determined energy detection threshold, wherein the number of CCAs are performed in a set of CCA slots.

26. The apparatus of claim 20, wherein determining that the shared radio frequency spectrum is shared is based at least in part on: a number of transmitters detected within an energy detection range of the first device, a failure rate of transmissions for which feedback is reported, an erasure rate for transmissions for which an error is not reported, a variance between a supported modulation and coding scheme (MCS) and an MCS actually used, or a combination thereof.

27. An apparatus for wireless communication, comprising:
means for determining, by a first device associated with a first radio access technology (RAT), that a shared radio frequency spectrum is shared with a second device of a second RAT;

means for determining, based at least in part on the determination that the shared radio frequency spectrum is shared, an energy detection threshold for a clear channel assessment (CCA);
means for identifying a number of CCA slots for which the shared radio frequency spectrum is available before the first device accesses the shared radio frequency spectrum; and
means for performing the CCA using the determined energy detection threshold and the identified number of CCA slots.

28. A non-transitory computer readable medium storing code for wireless communication, the code comprising instructions executable by a processor to:
determine, by a first device associated with a first radio access technology (RAT), that a shared radio frequency spectrum is shared with a second device of a second RAT;
determine, based at least in part on the determination that the shared radio frequency spectrum is shared, an energy detection threshold for a clear channel assessment (CCA);
identify a number of CCA slots for which the shared radio frequency spectrum is available before the first device accesses the shared radio frequency spectrum; and
perform the CCA using the determined energy detection threshold and the identified number of CCA slots.

* * * * *